(12) United States Patent
Pleasants et al.

(10) Patent No.: US 12,435,535 B2
(45) Date of Patent: Oct. 7, 2025

(54) ADAPTABLE ROOFTOP TENT SYSTEM

(71) Applicant: Thule Sweden AB, Hillerstorp (SE)

(72) Inventors: Parke Pleasants, Louisville, CO (US); David Ardmar, Bankeryd (SE); Jord Alma, Öxnevalla (SE); Pontus Vargvik, Jönköping (SE)

(73) Assignee: Thule Sweden AB, Hillerstorp (SE)

( * ) Notice: Subject to any disclaimer, the term of this patent is extended or adjusted under 35 U.S.C. 154(b) by 402 days.

(21) Appl. No.: 18/051,212

(22) Filed: Oct. 31, 2022

(65) Prior Publication Data

US 2023/0132858 A1 May 4, 2023

Related U.S. Application Data

(60) Provisional application No. 63/337,394, filed on May 2, 2022, provisional application No. 63/300,502, filed
(Continued)

(51) Int. Cl.
*E04H 15/06* (2006.01)
*B60P 3/34* (2006.01)
(Continued)

(52) U.S. Cl.
CPC ............. *E04H 15/54* (2013.01); *B60P 3/34* (2013.01); *B60P 3/341* (2013.01); *E04H 15/06* (2013.01);
(Continued)

(58) Field of Classification Search
CPC ......... E04H 15/54; E04H 15/06; E04H 15/48; E04H 15/56; E04H 15/58; E04H 15/64; B60P 3/34; B60P 3/341; B60P 3/38
(Continued)

(56) References Cited

U.S. PATENT DOCUMENTS 2,570,361 A * 10/1951 Mejia ................... A61G 17/034
135/96
3,278,953 A 10/1966 Willis
(Continued)

FOREIGN PATENT DOCUMENTS

CA 2886590 A1 9/2015
CH 384150 A 11/1964
(Continued)

OTHER PUBLICATIONS

International Search Report for PCT/IB2022/060497, mailed on Mar. 15, 2023, 5 pages.
(Continued)

*Primary Examiner* — Robert Canfield
(74) *Attorney, Agent, or Firm* — Sterne, Kessler, Goldstein &Fox P.L.L.C.

(57) ABSTRACT

A tent system includes a base, a canopy, and a frame system. The base is configured to mount to a vehicle. The frame system is coupled to the base and configured to expand and collapse the canopy. The frame system includes a first frame member, a second frame member, a third frame member, and a fourth frame member. The first frame member includes a first support and a first leg, the first leg configured to pivot about the first support. The second frame member includes a second support and a second leg, the second leg configured to pivot about the second support. The tent system can provide a folding mechanism to easily and efficiently open and close the canopy, increase an internal volume of the canopy, increase rigidity of the canopy, decrease setup time of the canopy, decrease a height of the base, and provide an automatic self-folding canopy.

20 Claims, 48 Drawing Sheets

Related U.S. Application Data on Jan. 18, 2022, provisional application No. 63/275,723, filed on Nov. 4, 2021.

(51) Int. Cl.
| | |
|---|---|
| *E04H 15/48* | (2006.01) |
| *E04H 15/54* | (2006.01) |
| *E04H 15/56* | (2006.01) |
| *E04H 15/58* | (2006.01) |
| *E04H 15/64* | (2006.01) |

(52) U.S. Cl.
CPC ............. *E04H 15/48* (2013.01); *E04H 15/56* (2013.01); *E04H 15/58* (2013.01); *E04H 15/64* (2013.01)

(58) Field of Classification Search
USPC ......... 135/88–13, 88.17, 132–134, 137, 143, 135/148, 149, 117, 119, 120.1; 296/160, 296/161
See application file for complete search history.

(56) References Cited

U.S. PATENT DOCUMENTS

| | | | | |
|---|---|---|---|---|
| 3,375,836 | A * | 4/1968 | Domeneghetti | E04H 15/06 135/132 |
| 3,534,750 | A | 10/1970 | Kolozsvary | |
| 3,670,747 | A * | 6/1972 | Pohl | E04H 15/00 135/156 |
| 3,712,315 | A | 1/1973 | Franzen | |
| 3,802,450 | A | 4/1974 | Huddle | |
| 3,917,337 | A | 11/1975 | Couix | |
| 3,970,096 | A * | 7/1976 | Nicolai | E04H 15/14 135/117 |
| 4,165,757 | A * | 8/1979 | Marks | E04H 15/32 135/93 |
| 4,188,963 | A | 2/1980 | Janoe et al. | |
| 4,294,484 | A | 10/1981 | Robertson | |
| 4,396,030 | A * | 8/1983 | Ferguson | E04H 15/06 135/88.17 |
| 4,465,087 | A | 8/1984 | Ferguson | |
| 4,522,441 | A * | 6/1985 | Allison | B60P 3/38 135/88.17 |
| 4,709,718 | A * | 12/1987 | Nichols | E04H 15/40 135/97 |
| 4,722,655 | A | 2/1988 | Bonerb | |
| 4,827,958 | A | 5/1989 | Cantwell et al. | |
| 4,830,036 | A * | 5/1989 | Sanders | E04H 15/06 135/132 |
| 5,067,505 | A * | 11/1991 | Cantwell | E04H 15/40 135/125 |
| 5,421,355 | A * | 6/1995 | Cantwell | E04H 15/425 135/120.3 |
| 6,035,875 | A * | 3/2000 | Chen | E04H 15/06 135/88.07 |
| 6,349,732 | B1 * | 2/2002 | Cooper | E04H 6/04 135/148 |
| D465,004 | S * | 10/2002 | Funk | E04H 15/36 D21/834 |
| 6,470,901 | B1 | 10/2002 | Scherer | |
| 6,871,896 | B1 | 3/2005 | Owen | |
| 7,140,377 | B1 | 11/2006 | Dahulich | |
| 8,701,688 | B2 * | 4/2014 | Vaughn | E04H 15/16 135/94 |
| 8,910,648 | B2 | 12/2014 | Jin | |
| 9,340,995 | B2 | 5/2016 | Jin | |
| 10,119,296 | B2 * | 11/2018 | Deal | E04H 15/38 |
| 10,125,517 | B2 * | 11/2018 | Xu | B60P 3/34 |
| 10,676,957 | B1 * | 6/2020 | Park | E04H 15/64 |
| 10,890,010 | B1 * | 1/2021 | Chang | E04H 15/20 |
| 10,914,096 | B1 * | 2/2021 | Hovagimian-Beck | E04H 15/42 |
| 11,028,613 | B2 * | 6/2021 | Harrison | B60P 3/341 |
| D998,078 | S * | 9/2023 | Lafoux | D21/834 |
| 11,761,229 | B1 * | 9/2023 | Hale | E04H 15/54 135/115 |
| 2001/0050098 | A1 | 12/2001 | Lee | |
| 2006/0272695 | A1 * | 12/2006 | Mettavant | E04H 15/56 135/126 |
| 2010/0243014 | A1 * | 9/2010 | Shires | E04H 15/42 135/124 |
| 2013/0229029 | A1 * | 9/2013 | Pierce | B60P 3/34 296/176 |
| 2016/0289996 | A1 * | 10/2016 | Kendrick | E04H 15/34 |
| 2020/0048926 | A1 * | 2/2020 | Reeder | E04H 15/48 |
| 2021/0040765 | A1 * | 2/2021 | Brensinger | E04H 15/06 |
| 2022/0098893 | A1 * | 3/2022 | Chen | B60P 3/341 |
| 2022/0243496 | A1 * | 8/2022 | Zhou | B60P 3/341 |
| 2023/0121447 | A1 * | 4/2023 | Lafoux | E04H 15/54 135/88.07 |
| 2023/0349189 | A1 * | 11/2023 | Payne | E04H 15/42 |
| 2024/0076897 | A1 * | 3/2024 | Bennett | E04H 15/06 |
| 2024/0084616 | A1 * | 3/2024 | Wang | E06C 5/04 |
| 2024/0200356 | A1 * | 6/2024 | Dong | E04H 15/56 |
| 2024/0287829 | A1 * | 8/2024 | Park | B60P 3/34 |
| 2024/0360688 | A1 * | 10/2024 | Ardmar | E04H 15/06 |

FOREIGN PATENT DOCUMENTS

| | | |
|---|---|---|
| CN | 103195290 A | 7/2013 |
| CN | 203113891 U | 8/2013 |
| CN | 203113892 U | 8/2013 |
| CN | 203247935 U | 10/2013 |
| CN | 204040600 U | 12/2014 |
| CN | 104594701 A | 5/2015 |
| CN | 204457053 U | 7/2015 |
| CN | 205688943 U | 11/2016 |
| CN | 206468097 U | 9/2017 |
| CN | 108999460 A | 12/2018 |
| CN | 109469401 A | 3/2019 |
| CN | 208564146 U | 3/2019 |
| CN | 210685572 U | 6/2020 |
| CN | 211166692 U | 8/2020 |
| CN | 211422044 U | 9/2020 |
| CN | 213297388 | 5/2021 |
| EP | 1 617 016 A1 | 1/2006 |
| FR | 2380753 A1 | 9/1978 |
| GB | 2029778 A | 3/1980 |
| GB | 2460391 A | 12/2009 |
| KR | 20040063880 A | 7/2004 |
| KR | 101260794 B1 | 5/2013 |
| KR | 200467077 Y1 | 5/2013 |
| KR | 101339725 B1 | 12/2013 |
| RU | 204714 U1 | 6/2021 |

OTHER PUBLICATIONS

"Raptor Series 100000-126800 Offgrid Voyager Truck SUV Camping Rooftop Tent with Ladder, Black," retrieved from https://www.amazon.com/dp/B07R444H9V?tag=cja00-20&linkCode=ogi&th=1&psc=1 on Nov. 2, 2022; 9 pages.

"Darche Hi-View 1600 Rooftop Tent," Snowys Outdoors, retrieved from https://www.snowys.comau/hi-view-1600-rooftop-tent on Nov. 2, 2022; 3 pages.

"2022 Hot Sale Camping Hard Shell Car Roof Top Tent for Traveling," retrieved from https://www.alibaba.com/product-detail/2018-hot-sale-camping-hard-shell_60782723342.html on Nov. 2, 2022; 5 pages.

"7 Rooftop Tents for a Summer of Road Trips and Memories," retrieved from https://www.bestproducts.com/fitness/equipment/g2581/car-roof-top-tents/, Jun. 1, 2022; 27 pages.

"James Baroud Vision 180 Rooftop Tent [71INx87IN]," retrieved from https://www.mainlineoverland.com/products/james-baroud-vision-180-rooftop-tent on Nov. 2, 2022; 13 pages.

"6 Rooftop Tents With Skywindow You Never Heard of . . . | Skylight, Skyview and Stargazing," 10TS Tents, retrieved from https://10ts-tents.com/rooftop-tents-with-skywindow-skyview-stargazing/ on Nov. 2, 2022; 15 pages.

(56) References Cited

OTHER PUBLICATIONS

"GT Sky Loft: The largest roof tent in the world," InceptiveMind, retrieved from http://www.inceptivemind.com/gt-sky-loft-largest-roof-tent-world/7814/ on Nov. 2, 2022; 5 pages.

* cited by examiner

ADAPTABLE ROOFTOP TENT SYSTEM

CROSS REFERENCE TO RELATED APPLICATIONS

This application claims priority to U.S. provisional application No. 63/275,723 filed Nov. 4, 2021, U.S. provisional application No. 63/300,502 filed Jan. 18, 2022, and U.S. provisional application No. 63/337,394 filed May 2, 2022, the contents of these are hereby incorporated by reference in their entirety.

BACKGROUND

Field

The present disclosure relates to tent apparatuses, systems, and methods, for example, adaptable rooftop tent apparatuses, systems, and methods having a folding mechanism for manual or automatic deployment.

Background

Current rooftop tents can utilize a plurality of tent poles attached to a base to support a main tent canopy and create an internal volume for a user. However, static tent poles have drawbacks including that they must be inserted into various portions of the tent, they increase an overall height of the base (e.g., in a closed configuration), and they cannot stretch the main tent canopy, which can result in sagging and moisture buildup. Further, it can be difficult and time consuming to setup and deploy the plurality of tent poles around the main tent canopy, especially during harsh weather conditions.

BRIEF SUMMARY

Accordingly, there is a need to, for example, provide a tent having a folding mechanism (e.g., manual, automatic, self-tensioning) to easily and efficiently open (e.g., expand, deploy) and close (e.g., collapse, retract) the tent, increase an internal volume of the tent, increase rigidity of the main tent canopy, decrease setup time of the tent, decrease condensation, decrease moisture, increase insulation, decrease weight, decrease a height of the base, provide a single interior frame system, and/or provide a self-folding tent.

In some aspects, a tent system includes a base, a canopy, and a frame system. In some aspects, the base can be configured to mount to a vehicle. In some aspects, the canopy can include a plurality of canopy sleeves. In some aspects, the frame system can be coupled to the base. In some aspects, the frame system can include a plurality of frame members configured to support the canopy. In some aspects, the frame members can be disposed in the canopy sleeves such that the frame members are disposed interior to the canopy. In some aspects, the frame system can be integrated with the plurality of canopy sleeves such that the frame system is interior to the canopy.

In some aspects, the frame system can be disposed entirely interior to the canopy. In some aspects, the plurality of canopy sleeves can extend above an upper exterior surface of the canopy between each of the plurality of canopy sleeves.

In some aspects, each of the plurality of canopy sleeves can include a frame fastener configured to secure a frame member within a recess of the canopy sleeve. In some aspects, the frame fastener can include a zipper. In some aspects, the frame fastener can include a hook-and-loop fastener. In some aspects, the frame fastener can include a snap. In some aspects, the frame fastener can include a button. In some aspects, the frame fastener can include a hook. In some aspects, the frame fastener can include a clasp. In some aspects, the frame fastener can include a friction lock.

In some aspects, the canopy can include a plurality of windows. In some aspects, in an open configuration, each of the plurality of windows can extend continuously from a top surface to a side surface of the canopy.

In some aspects, the tent system can further include a rain fly. In some aspects, in an open configuration, the rain fly can be coupled to the canopy. In some aspects, the rain fly can be configured to provide weather protection (e.g., rain, sun, heat, wind, snow, cold, etc.). In some aspects, the rain fly can contact at least one of the plurality of canopy sleeves. In some aspects, the rain fly can contact the plurality of canopy sleeves. In some aspects, the rain fly can be supported by at least one of the plurality of canopy sleeves. In some aspects, the rain fly can be supported by the plurality of canopy sleeves. In some aspects, the rain fly can be directly coupled to the canopy. In some aspects, the rain fly can be indirectly coupled to the canopy.

In some aspects, a buffer can be disposed between the rain fly and at least one of the plurality of canopy sleeves. In some aspects, the buffer can be configured to separate the rain fly from the at least one of the plurality of canopy sleeves. In some aspects, the buffer can include a foam, a fabric, a standoff, a spacer, and/or any other material capable of separating the rain fly from the at least one of the plurality of canopy sleeves.

In some aspects, a gap can be formed between the rain fly and an upper exterior surface of the canopy between each of the plurality of canopy sleeves. In some aspects, the gap is about 1 cm to about 15 cm. In some aspects, the gap is about 2 cm to about 10 cm. In some aspects, the gap is about 4 cm to about 5 cm.

In some aspects, the rain fly can include a plurality of windows.

In some aspects, a tent system includes a base, a canopy, a frame system, and a rain fly. In some aspects, the base can be configured to mount to a vehicle. In some aspects, the canopy can include a plurality of canopy sleeves. In some aspects, the frame system can be coupled to the base and configured to support the canopy. In some aspects, the rain fly can be coupled to the canopy. In some aspects, in an open configuration, the rain fly can be supported by at least one of the plurality of canopy sleeves.

In some aspects, in a first configuration, the rain fly can be fully deployed and supported by the plurality of canopy sleeves and a plurality of spring rods coupled to the base system.

In some aspects, in a second configuration, the rain fly can be semi-stowed and fixed by one or more rain fly fasteners on the canopy to expose a transverse section of the canopy.

In some aspects, in a third configuration, the rain fly can be stowed and fixed by a plurality of rain fly fasteners on the canopy to expose a plurality of transverse sections of the canopy.

In some aspects, in a fourth configuration, the rain fly can be semi-stowed and fixed by one or more rain fly fasteners on the canopy to expose a longitudinal section of the canopy.

In some aspects, in a fifth configuration, the rain fly can be stowed and fixed by a plurality of rain fly fasteners on the canopy to expose a plurality of longitudinal sections of the canopy.

In some aspects, in a sixth configuration, the rain fly can be fully deployed and supported by the plurality of canopy sleeves.

In some aspects, a tent system can include a base, a canopy, and a frame system. In some aspects, the base can be configured to mount to a vehicle. In some aspects, the canopy can include a plurality of windows. In some aspects, the frame system can be coupled to the base and configured to support the canopy.

In some aspects, each of the plurality of windows is between each of the plurality of canopy sleeves.

In some aspects, in an open configuration, the first window can extend continuously from a top surface to a side surface of the canopy. In some aspects, in an open configuration, each of the plurality of windows can extend continuously from a top surface to a side surface of the canopy.

In some aspects, in an open configuration, the plurality of windows can be arranged symmetrically. In some aspects, in an open configuration, the plurality of windows can be arranged symmetrically about a longitudinal axis and a transverse axis of the canopy. In some aspects, each of the plurality of windows can be disposed in a quadrant of the canopy formed by a top longitudinal panel and a top transverse panel of the canopy.

In some aspects, in an open configuration, a longitudinal cross-section of the canopy can be hexagonal. In some aspects, in an open configuration, an internal volume of the canopy can be a hexagonal prism.

In some aspects, each of the plurality of windows can include an irregular quadrilateral shape. In some aspects, in an open configuration, a side of the irregular quadrilateral shape can include an arc extending from a top surface to a side surface of the canopy.

In some aspects, each of the plurality of windows can include a window area of about $0.5$ $m^2$ to about $0.85$ $m^2$. In some aspects, each of the plurality of windows can include a window area of about $0.6$ $m^2$ to about $0.7$ $m^2$.

In some aspects, the canopy can include a plurality of canopy sleeves. In some aspects, a first window can be disposed between a first pair of canopy sleeves. In some aspects, a second window can be disposed between a second pair of canopy sleeves.

In some aspects, a tent system can include a base, a canopy, and a frame system. In some aspects, the base can be configured to mount to a vehicle. In some aspects, the frame system can be coupled to the base and be configured to expand and collapse the canopy. In some aspects, the frame system can include a first frame member, a second frame member, a third frame member, and a fourth frame member. In some aspects, the first frame member can include a first support and a first leg. In some aspects, the first leg can be configured to pivot about the first support. In some aspects, the second frame member can include a second support and a second leg. In some aspects, the second leg can be configured to pivot about the second support. In some aspects, the third frame member can include a first arm. In some aspects, the fourth frame member can include a second arm.

In some aspects, the third and fourth frame members can be disposed between the first and second frame members in an open configuration. In some aspects, the first and second frame members can be disposed between the third and fourth frame members in a collapsed configuration.

In some aspects, the frame system can include a first linkage coupling the first frame member to the third frame member. In some aspects, the first linkage can include an elastic material. In some aspects, the first linkage can be coupled to a distal end of the first leg. In some aspects, the first linkage can be coupled to a distal end of the first support. In some aspects, the frame system can include a first linkage coupled to the first frame member, the base, and the third frame member.

In some aspects, the frame system can include a second linkage coupling the second frame member to the fourth frame member.

In some aspects, the tent system can further include a linkage lock coupled to the first linkage. In some aspects, the linkage lock can be configured to adjust a tension of the first linkage. In some aspects, the linkage lock can include a spring and teeth configured to secure the first linkage.

In some aspects, a tent system can include a base, a canopy, and a frame system. In some aspects, the base can be configured to mount to a vehicle. In some aspects, the frame system can be coupled to the base and configured to automatically (e.g., self-tensioned) expand the canopy. In some aspects, the frame system can include a first frame member and a second frame member opposite the first frame member and arranged about a center of the tent system. In some aspects, the frame system can be configured to automatically (e.g., self-tensioned) expand and automatically (e.g., self-tensioned) collapse the canopy.

In some aspects, the tent system can further include a connecting member coupled to the first frame member and the base. In some aspects, the connecting member can be configured to apply an inward force to the first frame member toward a center of the tent system.

In some aspects, the connecting member can include an elastic linkage. In some aspects, the elastic linkage can be coupled to a distal end of a first leg of the first frame member and a hinge of the base.

In some aspects, the connecting member can include a torsion spring. In some aspects, the torsion spring can be coupled to a distal end of a first support of the first frame member and the base.

In some aspects, the first frame member can include a first support coupled to the base and a first leg coupled to the first support. In some aspects, the first leg can be configured to pivot about the first support. In some aspects, the connecting member can be coupled to a distal end of the first leg. In some aspects, the connecting member can be coupled to a distal end of the first support.

In some aspects, the tent system can further include a second connecting member coupled to the second frame member and the base. In some aspects, the second connecting member can be configured to apply a second inward force to the second frame member toward the center of the tent system.

In some aspects, a tent system can include a base, a canopy, and a frame system. In some aspects, the base can be configured to mount to a vehicle. In some aspects, the frame system can be coupled to the base. In some aspects, the frame system can be configured to expand and collapse the canopy. In some aspects, the frame system can include a frame member and a linkage. In some aspects, the frame member can include a support and a leg. In some aspects, the leg can be configured to pivot about the support. In some aspects, the linkage can be coupled to the frame member. In some aspects, the linkage can be configured to apply a force to the frame member.

In some aspects, the linkage can include an elastic material. In some aspects, the linkage can be coupled to a distal end of the leg. In some aspects, the linkage can be coupled to a distal end of the support. In some aspects, the linkage can be coupled to the base.

In some aspects, the tent system can further include a linkage lock coupled to the linkage. In some aspects, the linkage lock can be configured to adjust a tension of the linkage. In some aspects, the linkage lock can include a spring and teeth configured to secure the linkage.

In some aspects, the linkage can include a torsion spring. In some aspects, the torsion spring can be coupled to a distal end of the support of the frame member and the base.

In some aspects, the frame system can further include a second frame member, a third frame member, and a fourth frame member. In some aspects, the second frame member can include a second support and a second leg. In some aspects, the second leg can be configured to pivot about the second support. In some aspects, a second linkage can be coupled to the second frame member. In some aspects, the second linkage can be configured to apply a second force to the second frame member. In some aspects, the third frame member can include an arm. In some aspects, the fourth frame member can include a second arm.

In some aspects, the third and fourth frame members can be disposed between the frame member and the second frame member in an open configuration. In some aspects, the frame member and the second frame member can be disposed between the third and fourth frame members in a collapsed configuration.

In some aspects, the linkage couples the frame member to the third frame member. In some aspects, the second linkage couples the second frame member to the fourth frame member.

In some aspects, a tent system can include a base, a canopy, and a frame system. In some aspects, the base can be configured to mount to a vehicle. In some aspects, the frame system can be coupled to the base. In some aspects, the frame system can be configured to self-tension the canopy. In some aspects, the frame system can include a frame member and a connecting member. In some aspects, the frame member can include a support and a leg. In some aspects, the leg can be configured to pivot about the support. In some aspects, the connecting member can be coupled to the frame member and the base. In some aspects, the connecting member can be configured to apply a pulling force to the frame member.

In some aspects, the connecting member can be configured to apply an outward pulling force to the frame member toward a perimeter of the tent system. In some aspects, the connecting member can be configured to apply an inward pulling force to the frame member toward a center of the tent system.

In some aspects, the connecting member can include an elastic linkage. In some aspects, the elastic linkage can be coupled to a distal end of the leg of the frame member and the base.

In some aspects, the connecting member can include a torsion spring. In some aspects, the torsion spring can be coupled to a distal end of the support of the frame member and the base.

In some aspects, the support can be coupled to the base. In some aspects, the leg can be coupled to the support. In some aspects, the leg can be coupled to the canopy. In some aspects, the connecting member can be coupled to a distal end of the leg. In some aspects, the connecting member can be coupled to a distal end of the support.

In some aspects, the tent system can further include a second frame member and a second connecting member. In some aspects, the second frame member can include a second support and a second leg. In some aspects, the second leg can be configured to pivot about the second support. In some aspects, the second connecting member can be coupled to the second frame member and the base. In some aspects, the second connecting member can be configured to apply a second pulling force to the second frame member.

In some aspects, the second connecting member can be coupled to a distal end of the second leg of the second frame member and a hinge of the base.

In some aspects, a method of self-tensioning a tent system can include opening a first base member of a base thereby self-tensioning a frame system coupled to the base and expanding a canopy supported by the frame system. In some aspects, the method can further include closing the first base member of the base thereby self-tensioning the frame system and collapsing the canopy.

In some aspects, the opening can include moving the first base member relative to a second base member coupled to the first base member.

In some aspects, the opening can include applying an outward force to the frame system toward a perimeter of the tent system. In some aspects, applying the outward force can include applying an elastic restoring force between the frame system and the base. In some aspects, applying the outward force can include applying a torsional spring force between the frame system and the base.

In some aspects, applying the outward force can include applying a first outward force to a first frame member of the frame system toward a first edge of the tent system. In some aspects, applying the outward force can include applying a second outward force to a second frame member opposite the first frame member of the frame system toward a second edge opposite the first edge of the tent system.

In some aspects, the closing can include applying an inward force to the frame system toward a center of the tent system. In some aspects, applying the inward force can include applying an elastic restoring force between the frame system and a hinge of the base. In some aspects, applying the inward force can include applying a torsional spring force between the frame system and the base.

In some aspects, applying the inward force can include applying a first inward force to a first frame member of the frame system toward the center of the tent system. In some aspects, applying the inward force can include applying a second inward force to a second frame member opposite the first frame member of the frame system toward the center of the tent system.

In some aspects, a tent system can include a base system, a canopy, and a frame system.

In some aspects, the base system can include a first base member configured to mount to a vehicle, a second base member, and a hinge coupling the first base member to the second base member. In some aspects, the frame system can couple to the base system and be configured to support the canopy in an open configuration. In some aspects, the frame system can include a frame member coupled to the first base member, a fastener coupled to the second base member, and a connecting member. In some aspects, the frame member can include a support and a leg, the leg configured to pivot about the support. In some aspects, the connecting member can be coupled to the support of the frame member and the fastener. In some aspects, the connecting member can be configured to apply a pulling force to the frame member.

In some aspects, the frame system can further include a guide coupled to the first base member, the connecting member configured to pass through the guide. In some aspects, the guide can include an aperture. In some aspects, in a closed configuration, the connecting member can apply a pulling force to the frame member based on a relative distance between the fastener and the guide. In some aspects, in the open configuration, the connecting member is loose and no pulling force is applied to the frame member based on a relative distance between the fastener and the guide.

In some aspects, a method of folding a tent system can include closing a second base member of a base thereby applying a pulling force to a connecting member coupled to a fastener on the second base member and a support on a first base member. In some aspects, applying the pulling force includes increasing a relative distance between the fastener on the second base member and a guide on the first base member, the connecting member configured to pass through the guide. In some aspects, increasing the relative distance includes pivoting the second base member about the first base member thereby tightening the connecting member.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and advantages of the disclosure, as well as the structure and operation of various aspects of the disclosure, are described in detail below with reference to the accompanying drawings. It is noted that the disclosure is not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate the aspects and, together with the description, further serve to explain the principles and to enable a person skilled in the relevant art(s) to make and use the aspects. Objects and advantages of illustrative, non-limiting aspects will become more apparent by describing them in detail with reference to the attached drawings.

Figure 1:
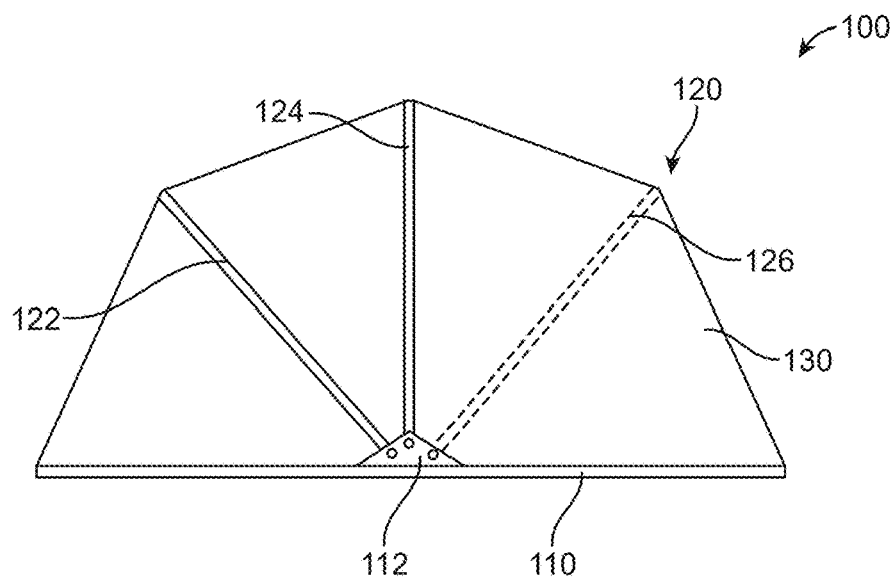
FIG. 1 illustrates a side view of a tent, according to an aspect.

The features and advantages of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Aspects of the present disclosure are described in detail with reference to aspects thereof as illustrated in the accompanying drawings. References to "one aspect," "an aspect," "some aspects," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

The term "self-tension" or "self-tensioned" or "self-tensioning" as used herein indicates a built-in force (e.g., restoring force, elastic force, pulling force, etc.) or tension of a tent from one or more linkages or connections coupled to one or more portions of a frame system of the tent to expand (e.g., open) and/or collapse (e.g., close) the tent. In some aspects, the built-in force or tension applies a pulling force (e.g., outward force) to the frame system toward a perimeter or exterior of the tent (e.g., a corner of a base system) to expand (e.g., open) the tent (e.g., a canopy system). In some aspects, the built-in force or tension applies a pulling force (e.g., inward force) to the frame system toward a center of the tent (e.g., a hinge of a base system) to collapse (e.g., close) the tent (e.g., a canopy system). In some aspects, the built-in force or tension expands and collapses the tent as the tent (e.g., a base system) is opened and closed (e.g., by a user), respectively.

Before describing such aspects in more detail, however, it is instructive to present example environments in which aspects of the present disclosure may be implemented.

Example Tent

FIG. 1 is a side illustration of tent 100, according to an aspect. Tent 100 can be configured to be secured to a rooftop of a vehicle. As shown in FIG. 1, tent 100 can include base 110, frame 120, and canopy 130. Base 110 can include hinge 112 coupled to frame 120 and configured to collapse base 110 in a closed configuration. Frame 120 can include first frame member 122, second frame member 124, and third frame member 126. Canopy 130 can be coupled to base 110 and frame 120. In some aspects, in an open configuration (e.g., expanded), first frame member 122, second frame member 124, and third frame member 126 can contact an interior surface of canopy 130 to expand canopy 130 and form an internal space (e.g., volume) of tent 100. In some aspects, as shown in FIG. 1, first frame member 122, second frame member 124, and third frame member 126 of frame 120 can be coupled (e.g., connected) to hinge 112 of base 110. In some aspects, as shown in FIG. 1, a cross-section (e.g., longitudinal) of canopy 130 can be pentagonal (e.g., 5-sided).

Example Tent System

As discussed above, current rooftop tents (e.g., tent 100 shown in FIG. 1) can utilize a rain fly to cover the main tent canopy for some weather protection. The rain fly can be supported by additional tent poles, separate from the main tent poles, to generate space between the rain fly and main tent canopy, for example, to prevent moisture (e.g., moisture inside the main tent canopy caused by saturation of the canopy exterior surface). Further, unlike ground tents, rooftop tents can utilize tent poles interior to the tent canopy to maximize an internal volume within the tent canopy. When expanding from a collapsed configuration to an expanded configuration, tent poles of rooftop tents can apply an internal force (e.g., outward force) to create tension in the tent canopy, unlike ground tents which receive an external force (e.g., inward force) from a user outside of the tent canopy to create the tension. However, it can be difficult and time consuming to mount additional tent poles over the main tent canopy, especially during harsh weather conditions, and maintain tension in the main tent canopy to form the internal volume.

Further, there is a need to provide a more user-friendly and rapidly deployed tent system to quickly and easily mount, expand, secure, and utilize a tent canopy for weather protection (e.g., rain, sun, heat, wind, snow, cold, etc.). In addition, there is a need to provide a tent system with an optional suspended rain fly above part or all of the tent canopy for additional weather protection and/or weather control, and easier transitions between different coverage configurations (e.g., closed window, open window, fully deployed, semi-stowed, stowed, etc.). Additionally, there is a need to provide an accessible, nearby optional rain fly for different coverage configurations (e.g., fully deployed, semi-stowed, stowed, etc.) to adjust weather interactions (e.g., light, ventilation, visibility, rain, etc.) with the tent system. Moreover, there is a need to provide a single interior frame system for both the tent canopy and the optional suspended rain fly to form a space (e.g., a gap) between the tent canopy and the rain fly for ease of use, manufacturing efficiency, and cost efficiency, and avoid the use of a separate rain fly frame system mounted atop the tent canopy.

Aspects of tent apparatuses, systems, and methods as discussed below can provide a tent having a canopy with a plurality of canopy sleeves to suspend a rain fly above the canopy, increase ventilation, increase visibility, decrease condensation, decrease moisture, increase insulation, increase manufacturing efficiency, decrease weight, and/or provide a single interior frame system.

Figure 2B:
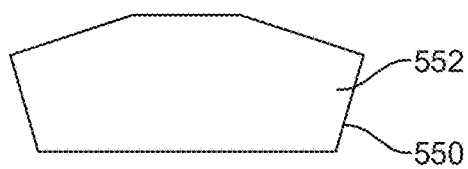
FIG. 2B illustrates a schematic cross-section view of the tent system shown in FIG. 2A.
Figure 2A:
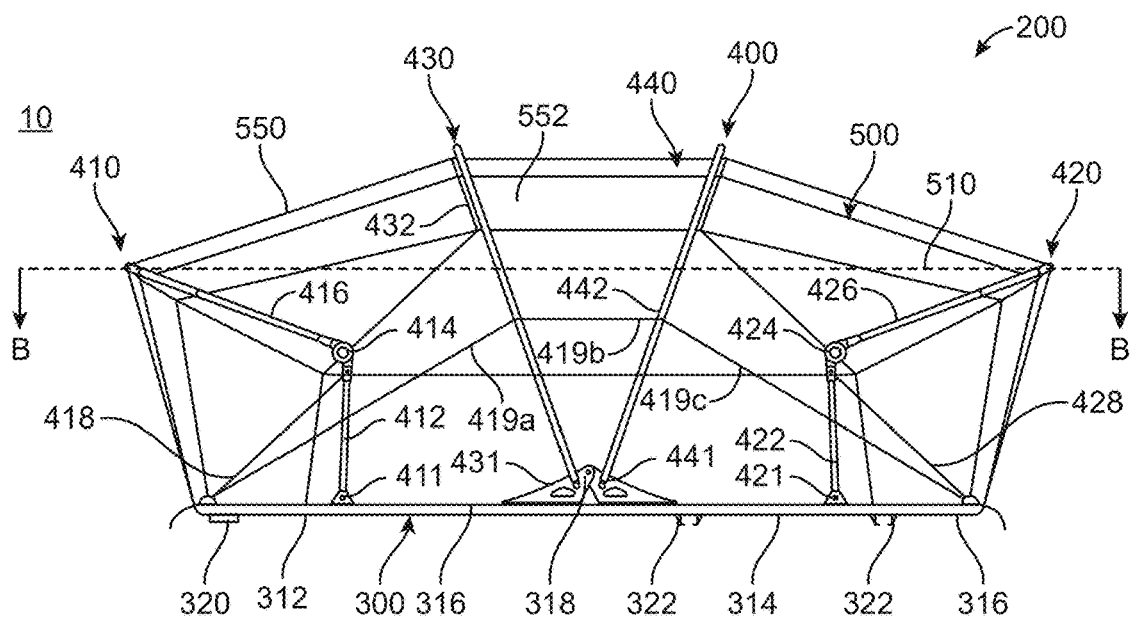
FIG. 2A illustrates a side view of a tent system in an open configuration, according to an aspect.
Figure 5A:
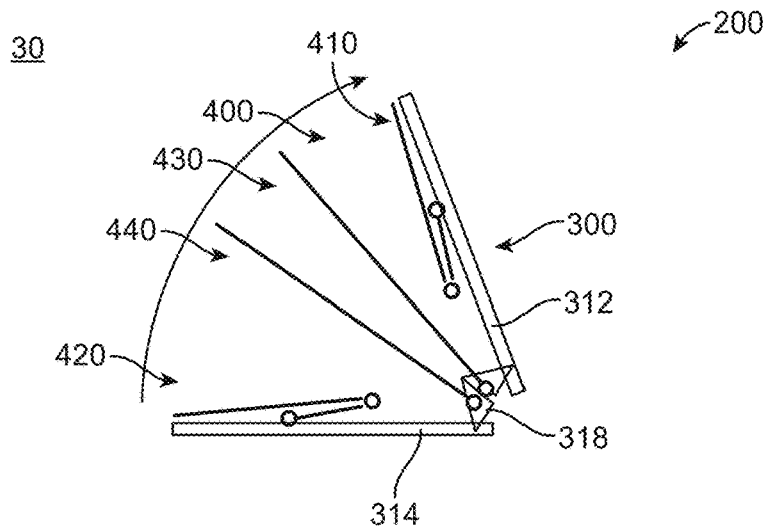
FIG. 5A illustrates a side view of the tent system shown in FIG. 3 in a semi-open configuration, according to an aspect.
Figure 5B:
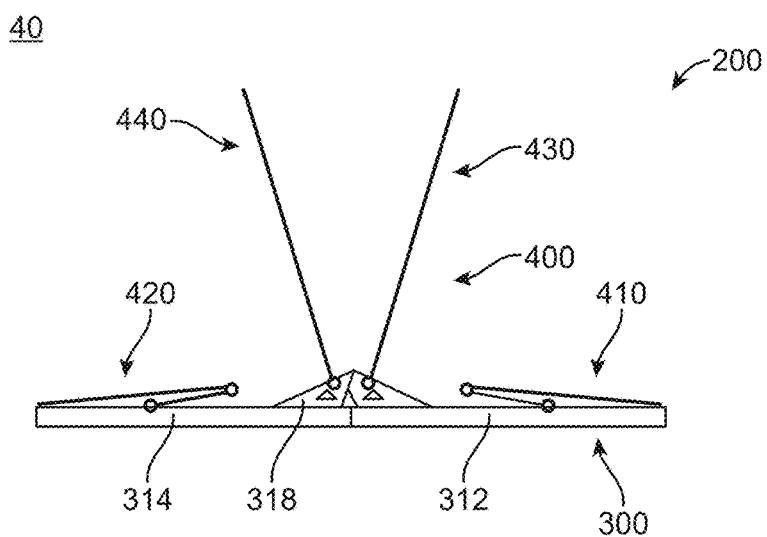
FIG. 5B illustrates a side view of the tent system shown in FIG. 3 in an unfolded configuration, according to an aspect.
Figure 5C:
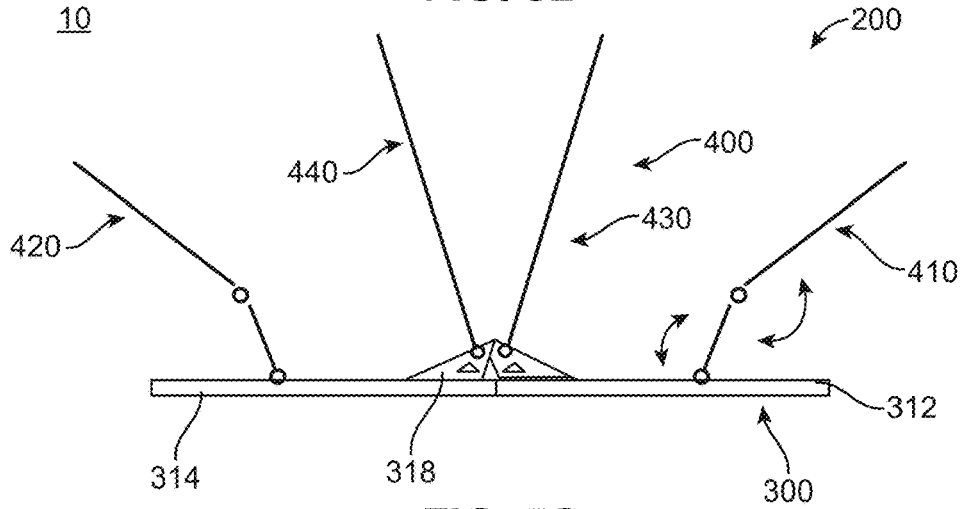
FIG. 5C illustrates a side view of the tent system shown in FIG. 3 in the open configuration.
Figure 6:
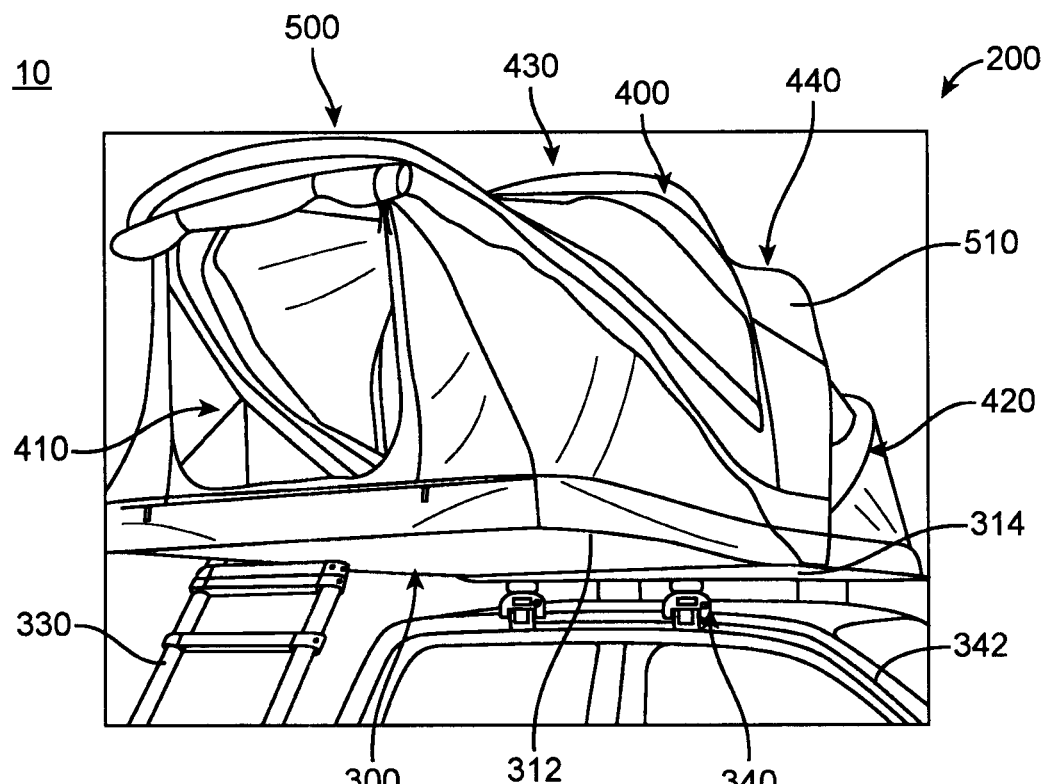
FIG. 6 illustrates a front perspective view of the tent system shown in FIG. 2A mounted on a vehicle, according to an aspect.
Figure 7:
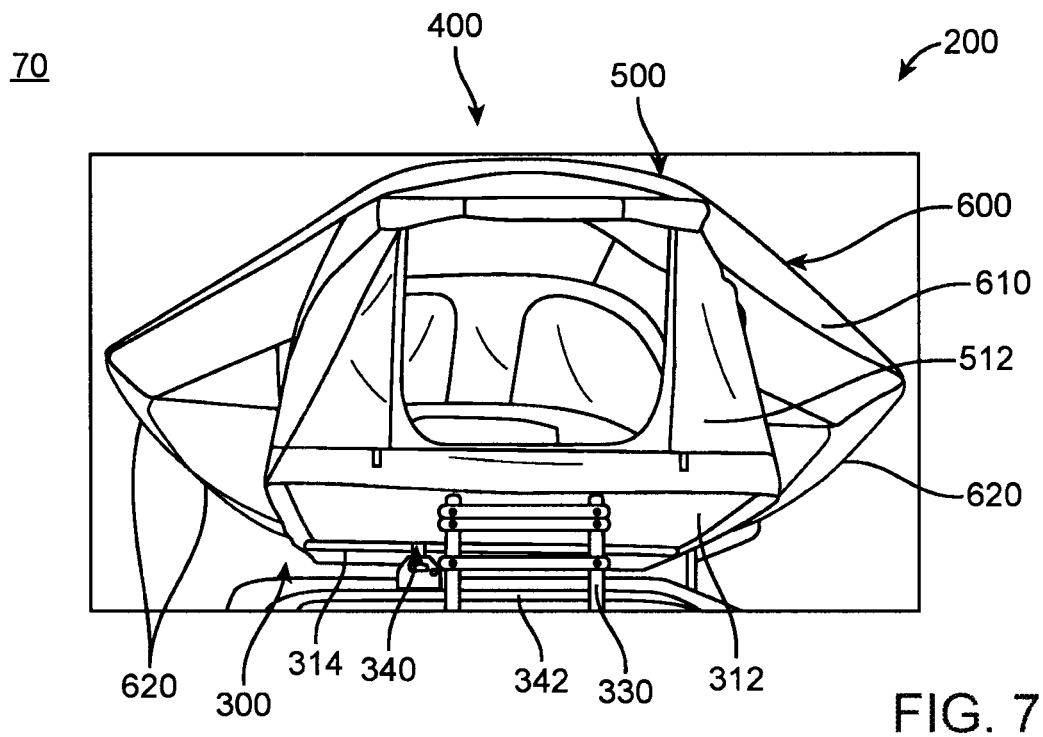
FIG. 7 illustrates a front perspective view of the tent system shown in FIG. 6 with a rain fly in a fully deployed configuration, according to an aspect.

FIGS. 2A-29 illustrate tent system 200, according to various aspects. FIG. 2A is a side illustration of tent system 200 in open configuration 10, according to an aspect. FIG. 2B is a cross-sectional illustration of tent system 200 shown in FIG. 2A. FIG. 6 is a front perspective illustration of tent system 200 mounted on vehicle 342, according to an aspect. FIG. 7 is a front perspective illustration of tent system 200 shown in FIG. 6 with rain fly system 600 in fully deployed configuration 70, according to an aspect.

Figure 8:
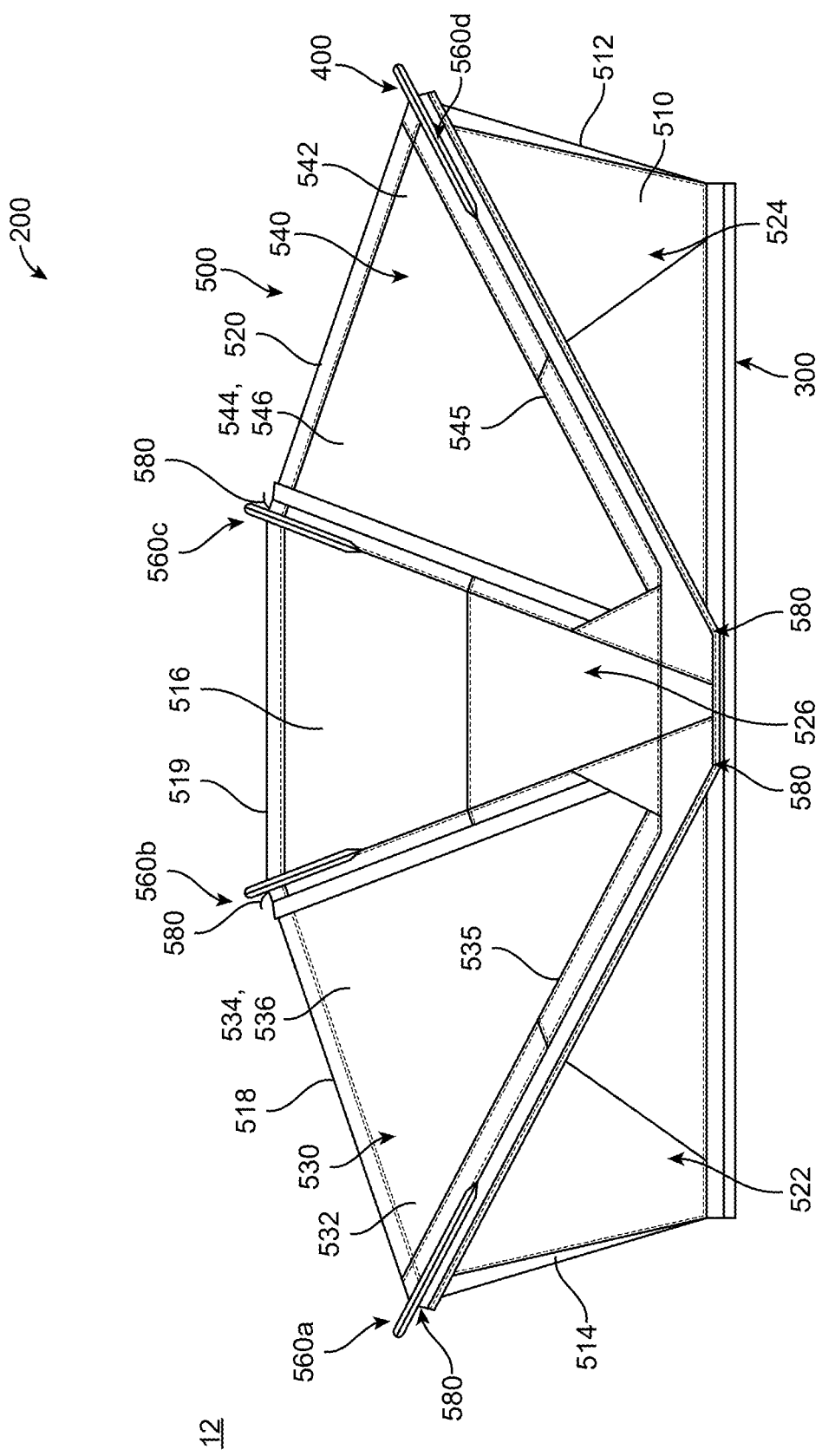
FIG. 8 illustrates a side view of the tent system shown in FIG. 2A, according to an aspect.

Tent system 200 can be configured to suspend a rain fly (e.g., rain fly system 600 shown in FIG. 7) above a canopy (e.g., canopy 510 shown in FIG. 7) with a plurality of canopy sleeves (e.g., canopy sleeves 560 shown in FIG. 8). Tent system 200 can be further configured to decrease condensation and moisture. Tent system 200 can be further configured to increase ventilation, insulation, and visibility. Tent system 200 can be further configured to decrease weight, increase manufacturing efficiency, and provide a single interior frame system (e.g., frame system 400 shown in FIG. 2A). Although tent system 200 is shown in FIGS. 2A, 2B, 6, and 7 as a stand-alone apparatus and/or system, the aspects of this disclosure can be used with other apparatuses, systems, and/or methods, such as, but not limited to, base system 300, frame system 400, canopy system 500, rain fly system 600, flow diagram 3600A, and/or flow diagram 3600B.

As shown in FIGS. 2A-29, tent system 200 can include base system 300, frame system 400, canopy system 500, and/or rain fly system 600. Base system 300 can be configured to mount to a vehicle and support frame system 400, canopy system 500, and/or rain fly system 600. Base system 300 can be coupled to frame system 400 and canopy system 500. Frame system 400 can be configured to support canopy system 500. Frame system 400 can be further configured to expand (e.g., open configuration 10 shown in FIG. 2A) and contract (e.g., closed configuration 20 shown in FIG. 4) canopy system 500. Frame system 400 can be coupled to base system 300 and canopy system 500.

Canopy system 500 can be configured to provide weather protection (e.g., rain, sun, heat, wind, snow, cold, etc.) and expand to form an internal volume for a user (e.g., internal volume 552 in open configuration 10 shown in FIG. 2A). Canopy system 500 can be further configured to support rain fly system 600. Canopy system 500 can be further configured to provide a gap (e.g., gap 564 shown in FIG. 21) between rain fly system 600 and an upper exterior surface (e.g., top surface 518) of canopy 510 to increase ventilation and decrease moisture. Rain fly system 600 can be configured to provide weather protection (e.g., rain, sun, heat, wind, snow, cold, etc.) and increase visibility. Rain fly system 600 can be coupled to canopy system 500 (e.g., canopy sleeves 560 shown in FIG. 21).

Example Base System

Base system 300 can be configured to mount to a vehicle (e.g., vehicle 342 shown in FIGS. 6 and 7). As shown in FIGS. 2A-7, base system 300 can include first base member 312 and second base member 314. First base member 312 can be configured to form a platform for tent system 200 atop a vehicle. First base member 312 can be further configured to open (e.g., expand) tent system 200 to open configuration 10. First base member 312 can be further configured to receive a ladder (e.g., ladder 330 shown in FIGS. 6 and 7). In some aspects, a ladder may be included in base system 300 (e.g., within a ladder receptacle in first base member 312 or second base member 314). In some aspects, first and second base members 312, 314 can include aluminum, titanium, fiberglass, a metal, a ceramic, a polymer, a combination thereof, and/or any other rigid material.

Figure 3:
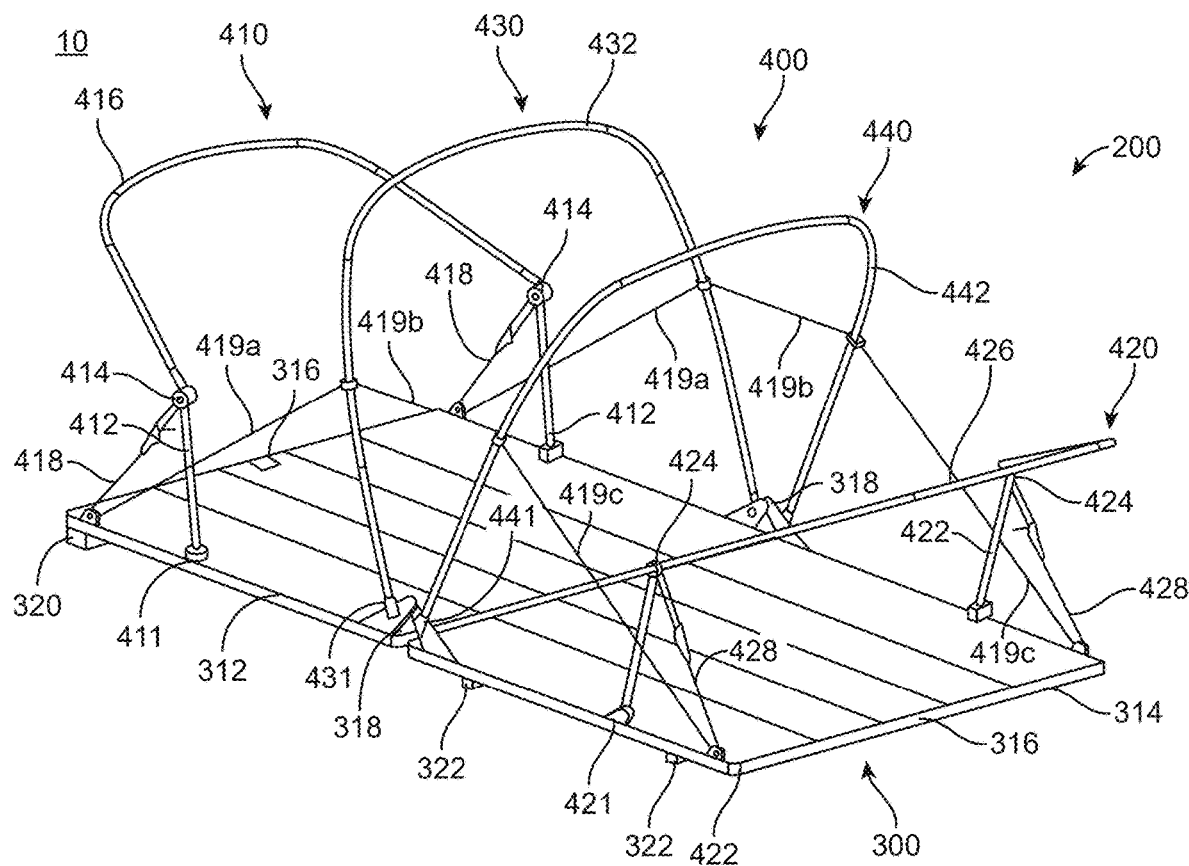
FIG. 3 illustrates a front perspective view of the tent system shown in FIG. 2A with a base system and a frame system.

Second base member 314 can be configured to form a platform for tent system 200 atop a vehicle. Second base member 314 can be further configured to attach (e.g., be fixed) to a rack of a vehicle (e.g., vehicle crossbar 340 shown in FIGS. 6 and 7). In some aspects, second base member 314 can include vehicle connection 322. For example, as shown in FIG. 2A, vehicle connection 322 can extend from a bottom surface of second base member 314 and be configured to mount base system 300 to a roof rack, a platform, or rails of a vehicle. In some aspects, first base member 312 and/or second base member 314 can include a tent fastener that attaches to an underside of canopy system 500. For example, as shown in FIGS. 2A and 3, first base member 312 and/or second base member 314 can include tent fastener 316 to connect to a bottom surface of canopy 510. In some aspects, tent fastener 316 can include a bolt, a clamp, a strap, a zipper, a jaw, and/or any other suitable fastener to couple to canopy 510. In some aspects, tent fastener 316 can connect to a channel or a groove of canopy 510 to secure canopy 510 to base system 300.

As shown in FIG. 2A, first and second base members 312, 314 can be coupled to each other, for example, via hinge 318. Hinge 318 can be configured to open (e.g., open configuration 10 shown in FIG. 2A) and close (e.g., closed configuration 20 shown in FIG. 4) first and second base members 312, 314 to expand and contract tent system 200. In some aspects, first base member 312 can include a ladder connection to receive a ladder. For example, as shown in FIG. 2A, first base member 312 can include ladder connection 320 to receive a ladder (e.g., ladder 330 shown in FIGS. 6 and 7), for example, near a distal end of first base member 312. In some aspects, second base member 314 can include a vehicle connection to attach to a vehicle. For example, as shown in FIG. 2A, second base member 314 can include vehicle connection 322 to attach to a vehicle (e.g., vehicle crossbar 340 of vehicle 342 shown in FIGS. 6 and 7).

Figure 4:
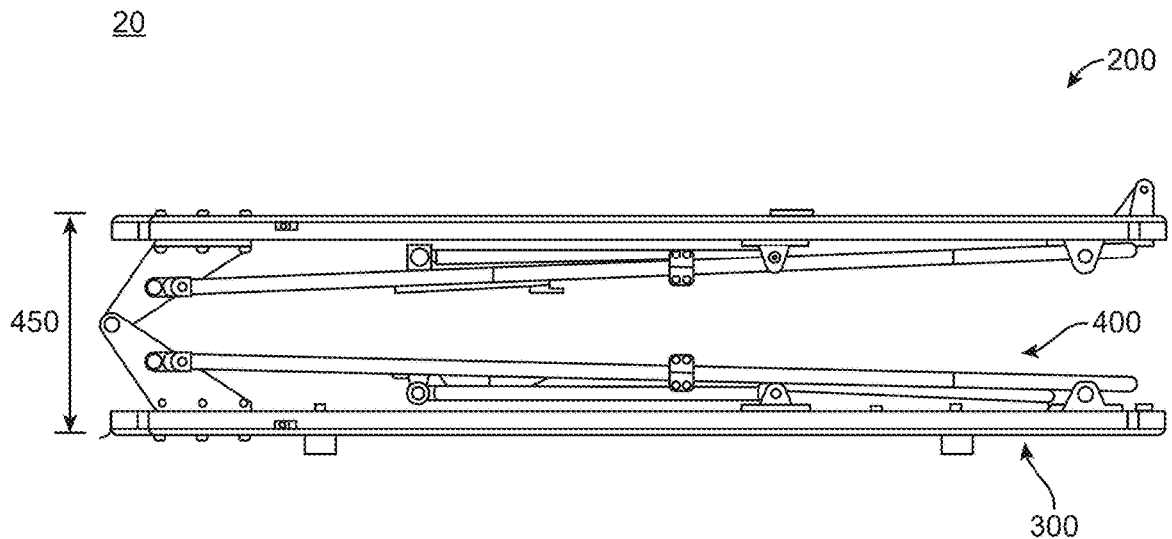
FIG. 4 illustrates a side view of the tent system shown in FIG. 3 in a closed configuration, according to an aspect.

In some aspects, base system 300 can be stored in a closed configuration. For example, as shown in FIG. 4, base system 300 can be in closed configuration 20, where first and second base members 312, 314 are arranged parallel to each other and stacked vertically. In some aspects, base system 300 can be expanded to an open configuration. For example, as shown in FIGS. 4-5B, first base member 312 can be pivoted about hinge 318 from closed configuration 20 to semi-open configuration 30 (shown in FIG. 5A) and first base member 312 can be further pivoted about hinge 318 from semi-open configuration 30 to unfolded configuration 40 (shown in FIG. 5B), such that first and second base members 312, 314 are aligned adjacent to each other in a single plane to form a single platform for tent system 200.

Example Frame System

Frame system 400 can be configured to support a canopy (e.g., canopy system 500 shown in FIG. 2A). Frame system 400 can be further configured to expand (e.g., open configuration 10 shown in FIG. 2A) and contract (e.g., closed configuration 20 shown in FIG. 4) canopy system 500. Frame system 400 can be further configured to provide a single interior frame system for tent system 200 to decrease weight and increase manufacturing efficiency. Frame system 400 can be coupled to base system 300 and canopy system 500.

As shown in FIGS. 2A-7, frame system 400 can include first frame member 410, second frame member 420, third frame member 430, and fourth frame member 440. In some aspects, frame members 410, 420, 430, 440 can include aluminum, titanium, fiberglass, a metal, a ceramic, a polymer, a combination thereof, and/or any other rigid material. In some aspects, frame members 410, 420, 430, 440 can be configured to expand canopy system 500 to form an internal volume for a user. For example, in open configuration 10, frame members 410, 420, 430, 440 can contact an interior of canopy system 500 (e.g., canopy sleeves 560 shown in FIGS. 8, 11, and 12) to form internal volume 552.

First frame member 410 can be configured to operate as a first knee connection of frame system 400. As shown in FIGS. 2A and 3, first frame member 410 can include first support 412, first joint 414, first leg 416, and/or first linkage 418. First support 412 can be configured to pivot about first connection 411 to first base member 312. First support 412 can be coupled to first base member 312 of base system 300. First support 412 can be coupled to first leg 416 via first joint 414. First joint 414 can be configured to pivot first leg 416 about distal end 412c of first support 412, for example, similar to a human knee joint. First joint 414 can be disposed between first support 412 and first leg 416. First leg 416 can be configured to contact canopy system 500 (e.g., canopy sleeve 560 shown in FIGS. 8, 11, and 12) and to expand canopy system 500 into an expanded position (e.g., open configuration 10 shown in FIG. 2A). First linkage 418 can be configured to expand first frame member 410 from a closed position (e.g., closed configuration 20 shown in FIG. 4) to an expanded position (e.g., open configuration 10 shown in FIG. 2A). First support 412, first joint 414, and/or first leg 416 can be coupled to first linkage 418. In some aspects, first linkage 418 can include a rope, tether, cord, string, chain, and/or any other linkage that allows a user to apply an expanding force (e.g., outward pivoting force) to first frame member 410.

Second frame member 420 can be configured to operate as a second knee connection of frame system 400. As shown in FIGS. 2A and 3, second frame member 420 can include second support 422, second joint 424, second leg 426, and/or second linkage 428. Second support 422 can be configured to pivot about second connection 421 to second base member 314. Second support 422 can be coupled to second base member 314 of base system 300. Second support 422 can be coupled to second leg 426 via second joint 424. Second joint 424 can be configured to pivot second leg 426 about distal end 422c of second support 422, for example, similar to a human knee joint. Second joint 424 can be disposed between second support 422 and second leg 426. Second leg 426 can be configured to contact canopy system 500 (e.g., canopy sleeve 560 shown in FIGS. 8, 11, and 12) and to expand canopy system 500 into an expanded position (e.g., open configuration 10 shown in FIG. 2A). Second linkage 428 can be configured to expand second frame member 420 from a closed position (e.g., closed configuration 20 shown in FIG. 4) to an expanded position (e.g., open configuration 10 shown in FIG. 2A). Second support 422, second joint 424, and/or second leg 426 can be coupled to second linkage 428. In some aspects, second linkage 428 can include a rope, tether, cord, string, chain, and/or any other linkage that allows a user to apply an expanding force (e.g., outward pivoting force) to second frame member 420.

Third frame member 430 can be configured to operate as a first hoop connection of frame system 400. As shown in FIGS. 2A and 3, third frame member 430 can include third arm 432. Third arm 432 can be configured to pivot about third connection 431 to hinge 318. Third arm 432 can be coupled to hinge 318 of base system 300. In some aspects, third arm 432 can be fixed (e.g., bolted) to hinge 318 and pivot along with hinge 318. Third arm 432 can be further configured to contact canopy system 500 (e.g., canopy sleeve 560 shown in FIGS. 8, 11, and 12) and to expand canopy system 500 into an expanded position (e.g., open configuration 10 shown in FIG. 2A). In some aspects, first linkage 418 can be configured to expand third frame member 430 from a closed position (e.g., closed configuration 20 shown in FIG. 4) to an expanded position (e.g., open configuration 10 shown in FIG. 2A). For example, third arm 432 can be coupled to first linkage 418. In some aspects, third frame member 430 can be coupled to an arm linkage configured to expand third frame member 430 from a closed position (e.g., closed configuration 20 shown in FIG. 4) to an expanded position (e.g., open configuration 10 shown in FIG. 2A). For example, third arm 432 can be coupled to arm linkage 419. In some aspects, a user can apply a force to arm linkage 419 (e.g., first arm linkage 419a) to expand third frame member 430 from closed configuration 20 to open configuration 10. In some aspects, as shown in FIGS. 2A and 3, arm linkage 419 can include first arm linkage 419a, second arm linkage 419b, and third arm linkage 419c.

Fourth frame member 440 can be configured to operate as a second hoop connection of frame system 400. As shown in FIGS. 2A and 3, fourth frame member 440 can include fourth arm 442. Fourth arm 442 can be configured to pivot about fourth connection 441 to hinge 318. Fourth arm 442 can be coupled to hinge 318 of base system 300. In some aspects, fourth arm 442 can be fixed (e.g., bolted) to hinge 318 and pivot along with hinge 318. Fourth arm 442 can be further configured to contact canopy system 500 (e.g., canopy sleeve 560 shown in FIGS. 8, 11, and 12) and to expand canopy system 500 into an expanded position (e.g., open configuration 10 shown in FIG. 2A). In some aspects, second linkage 428 can be configured to expand fourth frame member 420 from a closed position (e.g., closed configuration 20 shown in FIG. 4) to an expanded position (e.g., open configuration 10 shown in FIG. 2A). For example, fourth arm 442 can be coupled to second linkage 428. In some aspects, fourth frame member 440 can be coupled to an arm linkage configured to expand fourth frame member 440 from a closed position (e.g., closed configuration 20 shown in FIG. 4) to an expanded position (e.g., open configuration 10 shown in FIG. 2A). For example, fourth arm 442 can be coupled to arm linkage 419. In some aspects, a user can apply a force to arm linkage 419 (e.g., third arm linkage 419c) to expand fourth frame member 440 from closed configuration 20 to open configuration 10. In some aspects, as shown in FIGS. 2A and 3, arm linkage 419 can include first arm linkage 419a, second arm linkage 419b, and third arm linkage 419c.

In some aspects, as shown in FIGS. 2A and 3, first arm linkage 419a can be coupled to third arm 432 and first linkage 418. In some aspects, as shown in FIGS. 2A and 3, second arm linkage 419b can be coupled to third arm 432 and fourth arm 442. In some aspects, as shown in FIGS. 2A and 3, third arm linkage 419c can be coupled to fourth arm 442 and second linkage 428. In some aspects, a user can apply a force (e.g., outward) to first linkage 418 coupled to arm linkage 419 (e.g., first arm linkage 419a) and thereby expand frame system 400 from closed configuration 20 to open configuration 10. In some aspects, a user can apply a force (e.g., outward) to second linkage 428 coupled to arm linkage 419 (e.g., third arm linkage 419c) and thereby expand frame system 400 from closed configuration 20 to open configuration 10.

In some aspects, in a closed configuration, tent system 200 can have a height (e.g., vertical thickness) of about 10 cm to about 60 cm. For example, as shown in FIG. 4, in closed configuration 20, base system 300 and frame system 400 can have height 450, where height 450 is about 10 cm to about 60 cm. In some aspects, height 450 can be about 10 cm to about 30 cm. In some aspects, height 450 can be about 10 cm to about 20 cm.

In some aspects, frame system 400 can be stored in a closed configuration. For example, as shown in FIG. 4, frame system 400 can be in closed configuration 20, where frame members 410, 420, 430, 440 are arranged parallel to each other and stacked vertically. In some aspects, frame system 400 can be expanded to an open configuration. For example, as shown in FIGS. 4-5C, third and fourth frame members 430, 440 can be pivoted about hinge 318 from closed configuration 20 to semi-open configuration 30 (shown in FIG. 5A), first base member 312 can be further pivoted about hinge 318 from semi-open configuration 30 to unfolded configuration 40 (shown in FIG. 5B), such that third and fourth frame members 430, 440 are expanded, and first and second frame members 410, 420 can be expanded from unfolded configuration (shown in FIG. 5B) to open configuration (shown in FIG. 5C) via first and second linkages 418, 428, such that first and second frame members 410, 420 are expanded to form a single interior frame system 400 for tent system 200.

Figure 11:
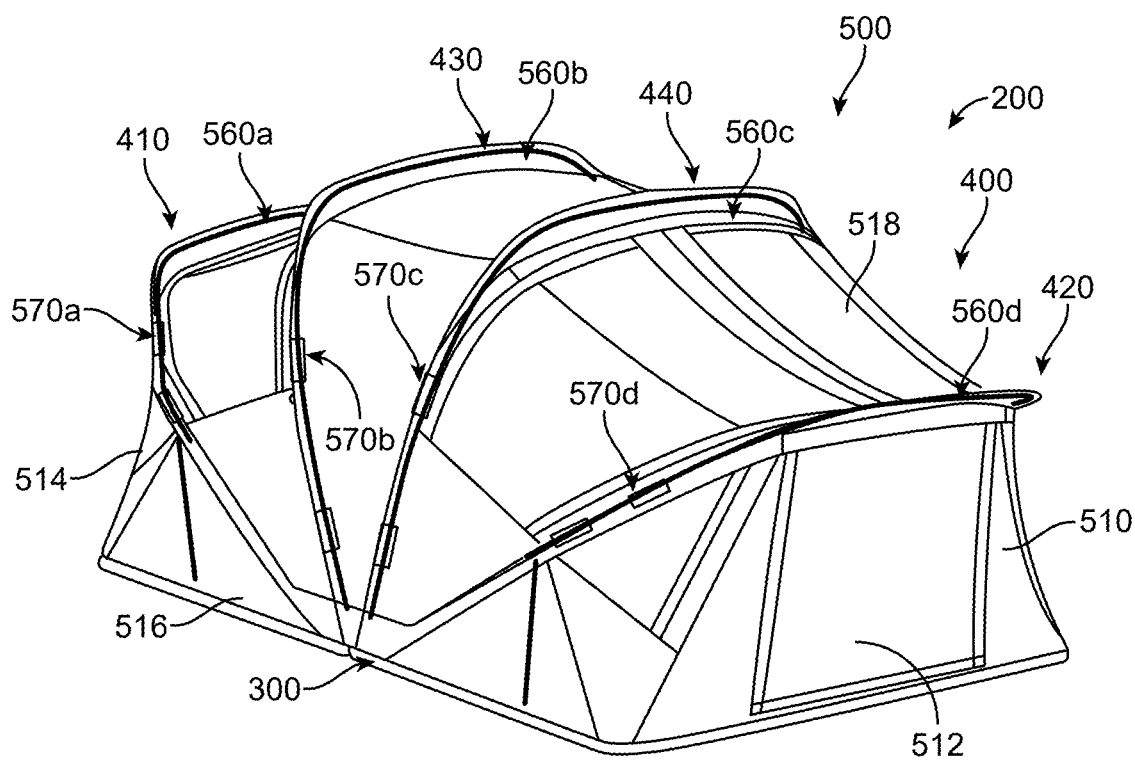
FIG. 11 illustrates a front perspective view of the tent system shown in FIG. 2A.
Figure 12:
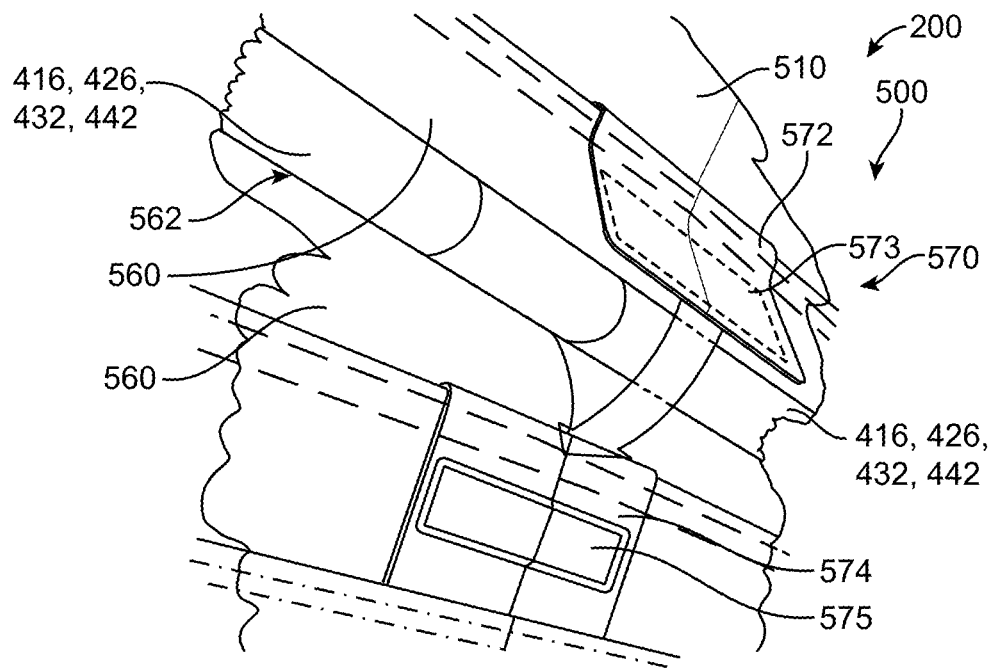
FIG. 12 illustrates a partial perspective view of the tent system shown in FIG. 11 with a frame fastener, according to an aspect.

In some aspects, frame system 400 can be disposed interior to canopy system 500. For example, as shown in FIG. 2A, frame members 410, 420, 430, 440 can be disposed interior to canopy system 500 (e.g., within canopy sleeves 560 as shown in FIGS. 8, 11, and 12). In some aspects, frame system 400 can be disposed entirely interior to canopy system 500. For example, as shown in FIG. 2A, frame members 410, 420, 430, 440 can be disposed entirely interior to canopy system 500.

Example Canopy System

Canopy system 500 can be configured to receive frame system 400 and provide weather protection (e.g., rain, sun, heat, wind, snow, cold, etc.). Canopy system 500 can be further configured to support rain fly system 600. As shown in FIGS. 8-21, canopy system 500 can include canopy 510, canopy sleeves 560, frame fasteners 570, and rain fly fasteners 580.

Canopy 510 can be configured to provide weather protection (e.g., rain, sun, heat, wind, snow, cold, etc.). Canopy 510 can be further configured to provide an internal volume (e.g., internal volume 552 shown in FIGS. 2A and 2B) for a user. In some aspects, canopy 510 can include a polymer, a plastic, a thermoplastic, an elastomer, polyester (e.g., Mylar®), thermoplastic polyurethane (TPU), polyethylene (e.g., Dyneema®), ultra-high molecular weight polyethylene (UHMWPE) (e.g., Dyneema® composite fiber (DCF)), nylon, silicone, poly-cotton, canvas,), a combination thereof, and/or any other water resistant material. For example, canopy 510 can include TPU.

Figure 9:
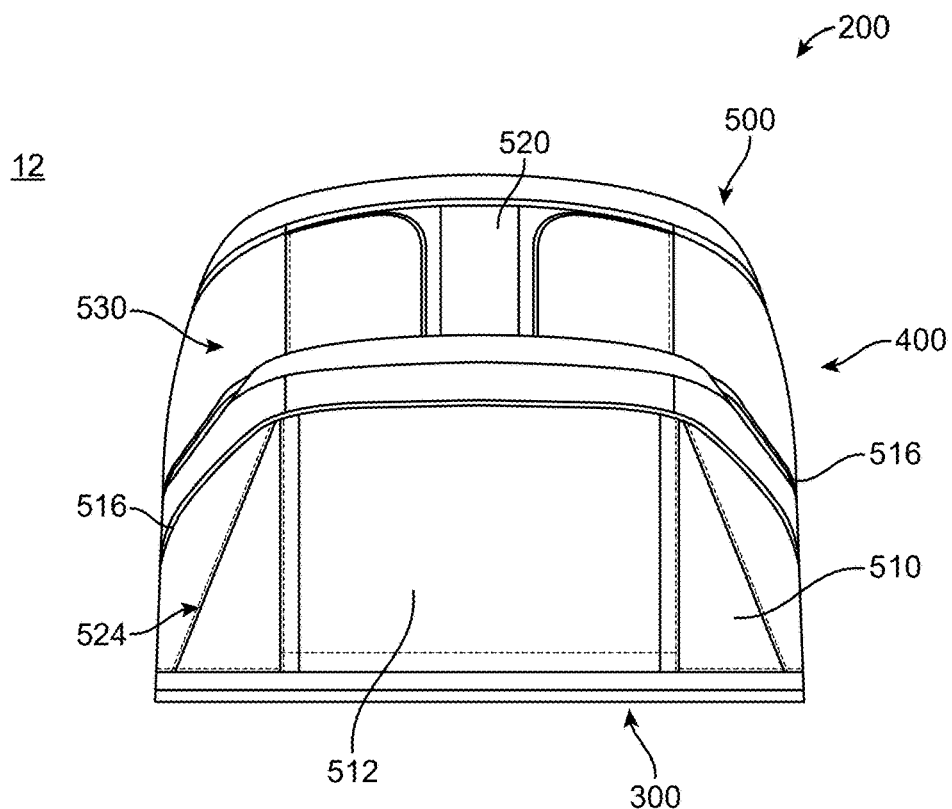
FIG. 9 illustrates a front view of the tent system shown in FIG. 8.
Figure 10:
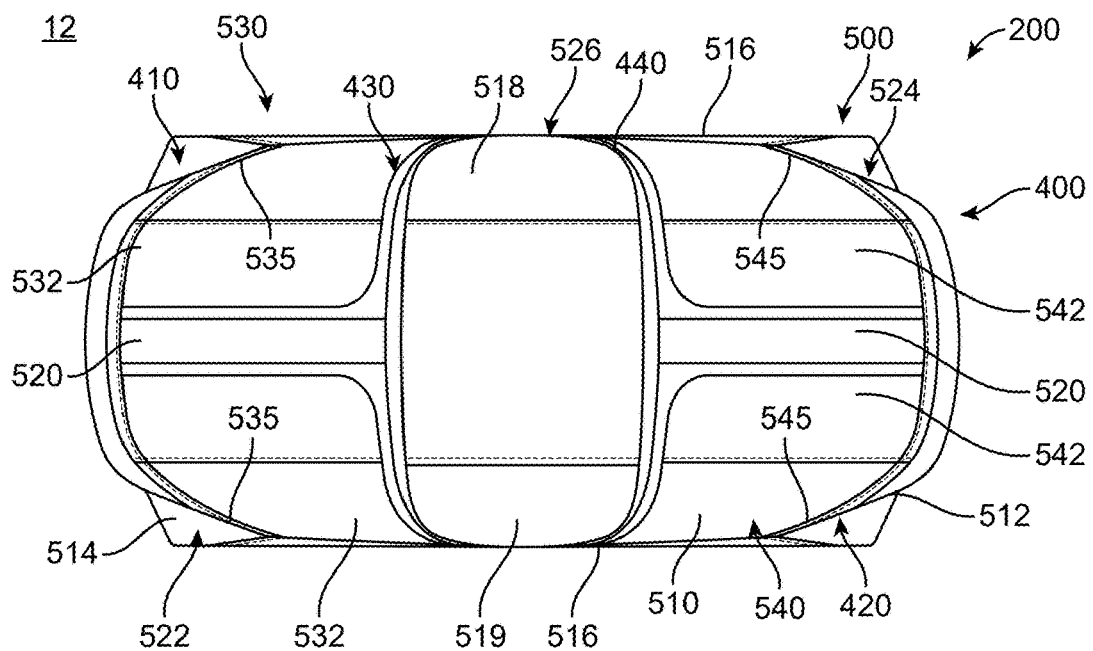
FIG. 10 illustrates a top view of the tent system shown in FIG. 8.

As shown in FIGS. 8-10, canopy 510 can include front surface 512 (e.g., a door), back surface 514, side surface 516, and top surface 518. In some aspects, top surface 518 can be an upper exterior surface of canopy 510 between adjacent canopy sleeves 560. For example, as shown in FIG. 8, top surface 518 can be between canopy sleeves 560, which extend outwardly beyond top surface 518 of canopy 510. In some aspects, top surface 518 can include one or more supporting panels. For example, as shown in FIG. 10, top surface 518 can include top transverse panel 519 and top longitudinal panel 520. In some aspects, top transverse panel 519 can include one or more storage areas (e.g., interior storage area) for a user to stow items.

Canopy 510 can further include first section 522, second section 524, third section 526, fourth section 530, and fifth section 540. As shown in FIG. 8, first section 522 (e.g., leftmost side) can be disposed between base system 300 and canopy sleeve 560a, second section 524 (e.g., rightmost side) can be disposed between base system 300 and canopy sleeve 560d, third section 526 (e.g., center) can be disposed between canopy sleeves 560b, 560c, fourth section 530 (e.g., left side) can be disposed between canopy sleeves 560a, 560b, and fifth section 540 (e.g., right side) can be disposed between canopy sleeves 560c, 560d.

Figure 17:
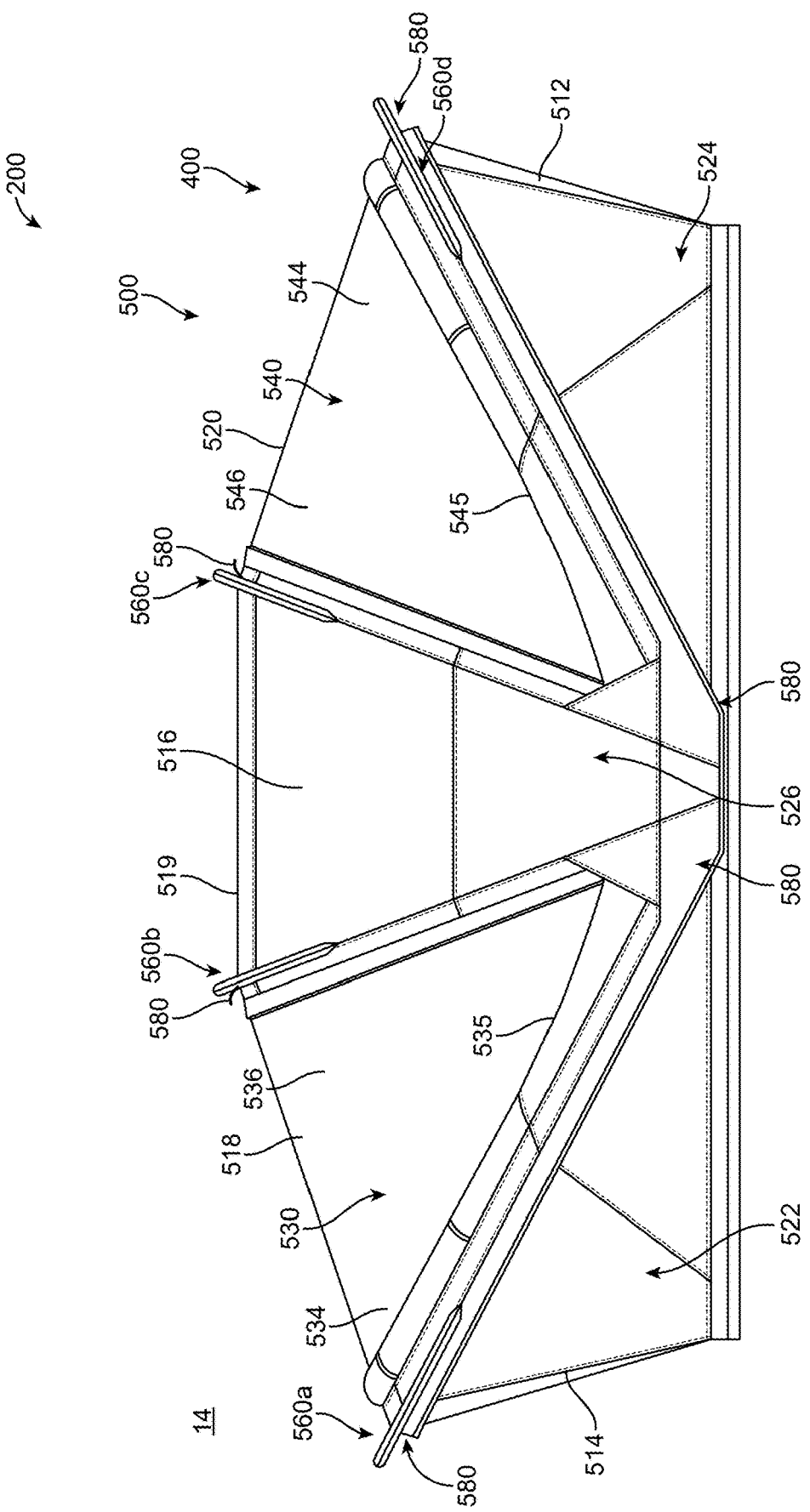
FIG. 17 illustrates a side view of the tent system shown in FIG. 8, according to an aspect.
Figure 18:
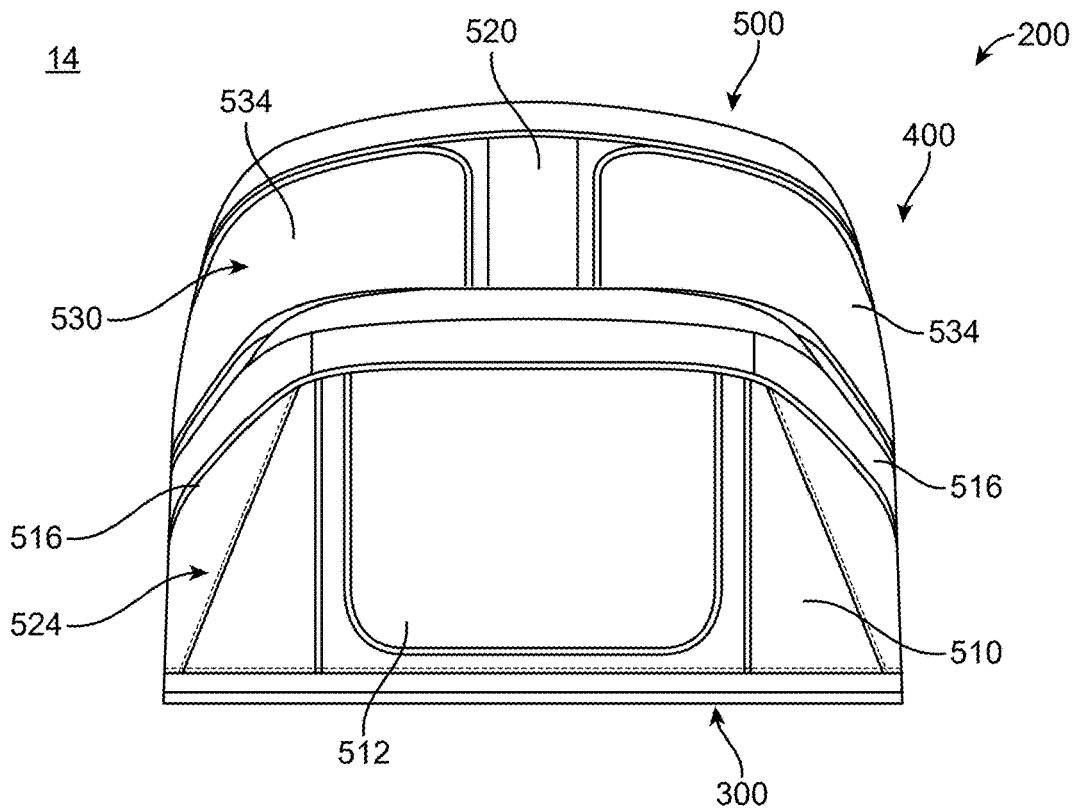
FIG. 18 illustrates a front view of the tent system shown in FIG. 17.
Figure 19:
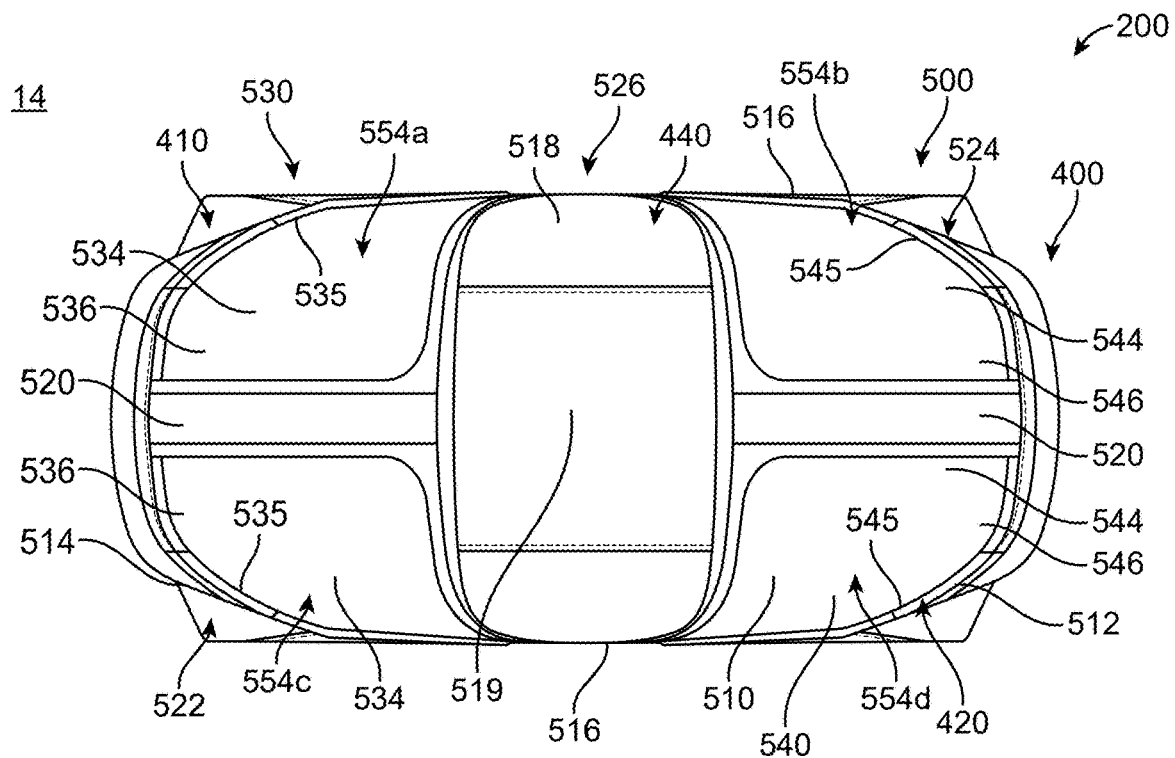
FIG. 19 illustrates a top view of the tent system shown in FIG. 17.
Figure 20:
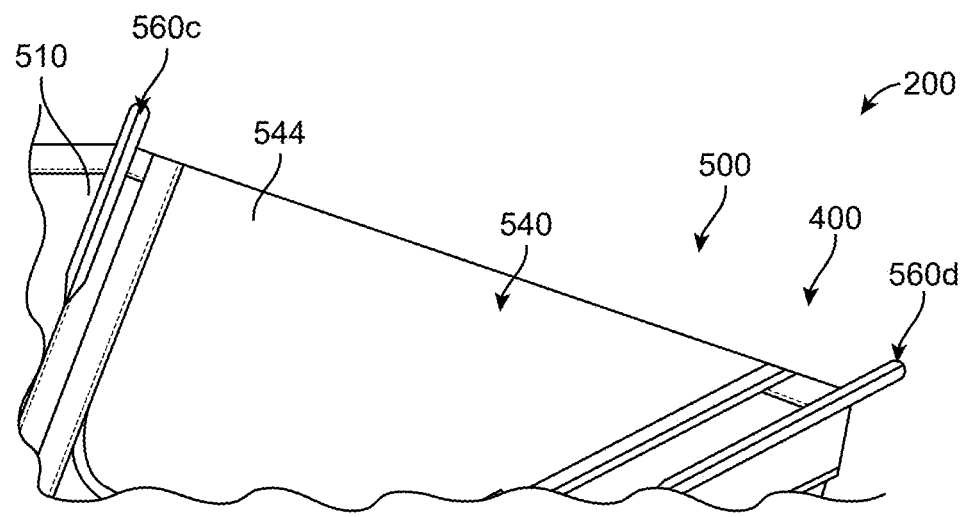
FIG. 20 illustrates a partial side view of the tent system shown in FIG. 17.

In some aspects, canopy 510 can be in a closed window configuration where windows of canopy 510 (e.g., fourth and fifth section windows 534, 544) are covered by window covers (e.g., fourth and fifth section covers 532, 542). For example, as shown in FIGS. 8-10, canopy 510 can be in closed window configuration 12. In some aspects, fourth and fifth section covers 532, 542 can be on, unfolded, unrolled, and/or secured (e.g., by one or more fasteners, e.g., a zipper) to fourth and fifth section windows 534, 544, respectively, in closed window configuration 12. In some aspects, canopy 510 can be in an open window configuration where window covers (e.g., fourth and fifth section covers 532, 542) are removed from windows of canopy 510 (e.g., fourth and fifth section windows 534, 544). For example, as shown in FIGS. 17-19, canopy 510 can be in open window configuration 14. In some aspects, fourth and fifth section covers 532, 542 can be removed, folded, rolled, and/or unsecured (e.g., by one or more fasteners, e.g., a zipper) from fourth and fifth section windows 534, 544, respectively, in open window configuration 14.

Fourth section 530 can be configured to provide one or more windows and increase ventilation and visibility of tent system 200. Fourth section 530 can include fourth section covers 532 atop fourth section windows 534. In some aspects, fourth section windows 534 can include TPU, a polymer, a mesh, and/or any other breathable material. Fourth section windows 534 can include arc 535 and have fourth section window area 536 (see e.g., FIG. 17). In some aspects, fourth section window area 536 can be about 0.5 $m^2$ to about 0.85 $m^2$ to increase visibility. For example, fourth section window area 536 can be about 0.6 $m^2$ to about 0.7 $m^2$.

Fifth section 540 can be configured to provide one or more windows and increase ventilation and visibility of tent system 200. Fifth section 540 can include fifth section covers 542 atop fifth section windows 544. In some aspects, fifth section windows 544 can include TPU, a polymer, a mesh, and/or any other breathable material. Fifth section windows 544 can include arc 545 and have fifth section window area 546 (see e.g., FIG. 17). In some aspects, fifth section window area 546 can be about 0.5 $m^2$ to about 0.85 $m^2$ to increase visibility. For example, fifth section window area 546 can be about 0.6 $m^2$ to about 0.7 $m^2$.

In some aspects, each of the plurality of windows of canopy 510 can have a window area of about 0.5 $m^2$ to about 0.85 $m^2$ to increase visibility. For example, as shown in FIGS. 17-19, in open window configuration 14, fourth section windows 534 can each have fourth section window area 536 and fifth section windows 544 can each have fifth section window area 546, where fourth and fifth section window areas 536, 546 are each about 0.5 $m^2$ to about 0.85 $m^2$. In some aspects, fourth and fifth section window arears 536, 546 can each be about 0.6 $m^2$ to about 0.7 $m^2$.

In some aspects, canopy 510 can include a plurality of windows. For example, as shown in FIGS. 17-19, canopy 510 can include fourth section windows 534 and/or fifth section windows 544. In some aspects, canopy 510, in an open configuration, can include a plurality of windows that each extend continuously from a top surface to a side surface of canopy 510. For example, as shown in FIGS. 17-19, in open window configuration 14, fourth section windows 534 and fifth section windows 544 can each extend continuously from top surface 518 to side surface 516 of canopy 510.

In some aspects, a first window of canopy 510 can be disposed between a first pair of canopy sleeves 560. For example, as shown in FIG. 17, fourth section window 534 can be disposed between two canopy sleeves 560a, 560b adjacent fourth section 530 of canopy 510. In some aspects, a second window of canopy 510 can be disposed between a second pair of canopy sleeves 560. For example, as shown in FIG. 17, fifth section window 544 can be disposed between two canopy sleeves 560c, 560d adjacent fifth section 540 of canopy 510. In some aspects, as shown in FIGS. 17-19, in open window configuration 14, fourth section windows 534 and/or fifth section windows 544 can extend continuously from top surface 518 to side surface 516 of canopy 510.

In some aspects, in an open configuration, a plurality of windows of canopy 510 can be arranged symmetrically about a longitudinal axis and a transverse axis of canopy 510. For example, as shown in FIG. 19, in open window configuration 14, fourth section windows 534 and fifth section windows 544 can be arranged symmetrically about top longitudinal panel 520 and top transverse panel 519 of canopy 510.

In some aspects, in an open configuration, each of the plurality of windows of canopy 510 can be disposed in a quadrant of canopy 510 formed by a top longitudinal panel and a top transverse panel of canopy 510. For example, as shown in FIG. 19, in open window configuration 14, fourth section windows 534 and fifth section windows 544 can be disposed in quadrants 554a-554d of canopy 510, respectively, formed (e.g., separated) by top longitudinal panel 520 and top transverse panel 519 of canopy 510.

In some aspects, in an open configuration, a longitudinal cross-section of canopy 510 can be hexagonal. For example, as shown in FIG. 2B, in open configuration 10, longitudinal cross-section 550 of canopy 510 can be hexagonal. In some aspects, in an open configuration, an internal volume of canopy 510 can form a hexagonal prism. For example, as shown in FIGS. 2A and 2B, in open configuration 10, internal volume 552 of canopy 510 can be a hexagonal prism.

In some aspects, each of the plurality of windows of canopy 510 can include an irregular (e.g., non-parallel) quadrilateral shape. For example, as shown in FIGS. 17-19, fourth section windows 534 and fifth section windows 544 can be an irregular quadrilateral shape. In some aspects, in an open configuration, a side of the irregular quadrilateral shape can include an arc extending from a top surface to a side surface of canopy 510. For example, as shown in FIGS. 17 and 19, in open window configuration 14, fourth section windows 534 can include arc 535 and fifth section windows 544 can include arc 545 extending from top surface 518 to side surface 516 of canopy 510.

In some aspects, canopy 510 can include a plurality of canopy sleeves 560. For example, as shown in FIGS. 8 and 17, canopy 510 can include four canopy sleeves 560a, 560b, 560c, 560d. In some aspects, in an open configuration, a rain fly can be coupled to canopy system 500. For example, as shown in FIGS. 7 and 21-24, in fully deployed extended configuration 70, rain fly system 600 can be coupled to canopy system 500, for example, rain fly 610 can be coupled to one or more canopy sleeves 560 (e.g., canopy sleeves 560b, 560c).

Figure 21:
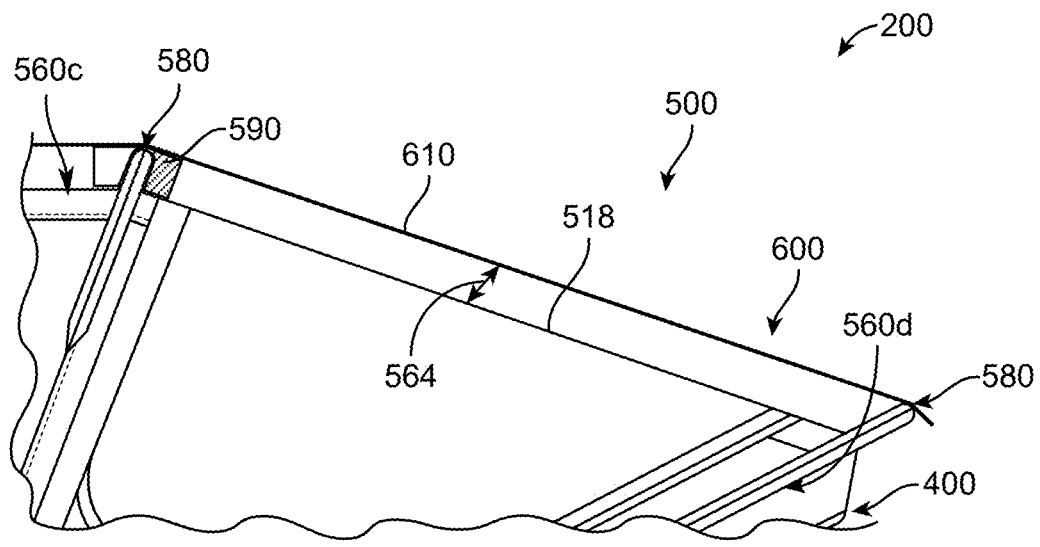
FIG. 21 illustrates a partial side view of the tent system shown in FIG. 17 with a rain fly in a fully deployed configuration, according to an aspect.

Canopy sleeves 560 can be configured to support a rain fly (e.g., rain fly system 600 shown in FIG. 7). Canopy sleeves 560 can be further configured to secure frame system 400 to canopy system 500. In some aspects, canopy sleeves 560 can extend above an upper exterior surface (e.g., top surface 518 shown in FIGS. 8 and 11) of canopy 510 between each canopy sleeve 560. For example, as shown in FIG. 21, canopy sleeves 560 can form gap 564 between rain fly system 600 (e.g., rain fly 610) and top surface 518 to increase ventilation and decrease moisture (e.g., moisture build-up between rain fly 610 and canopy 510). In some aspects, as shown in FIG. 12, canopy sleeve 560 can include sleeve recess 562 (e.g., a pocket) configured to receive a corresponding frame member 410, 420, 430, 440.

Figure 16:
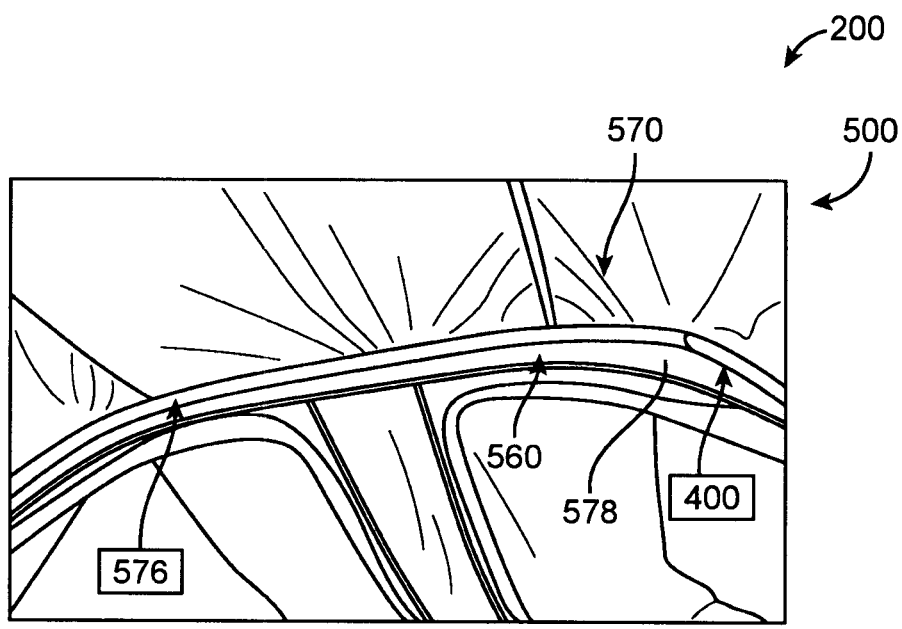
FIG. 16 illustrates an interior perspective view of the tent system shown in FIG. 15.
Figure 32:
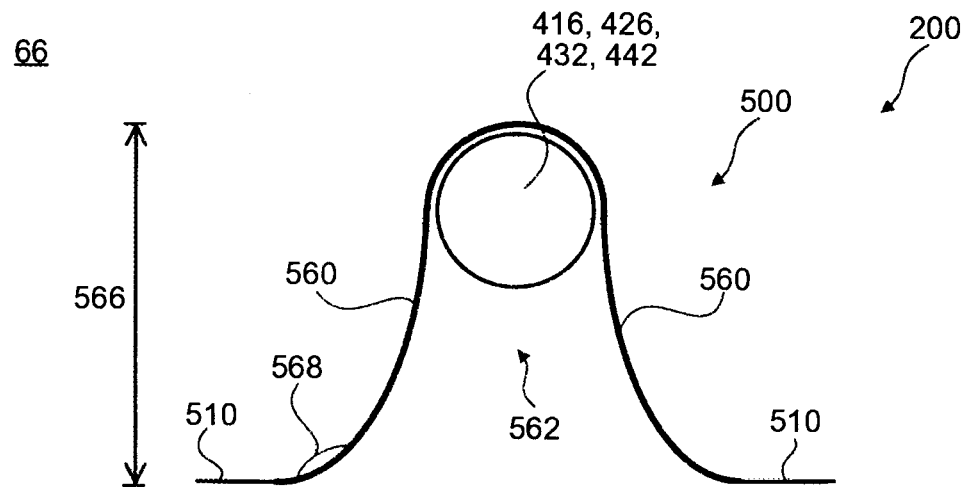
FIG. 32 illustrates a cross-sectional view of the tent system shown in FIG. 11 with a canopy sleeve in a parabolic configuration, according to an aspect.
Figure 33:
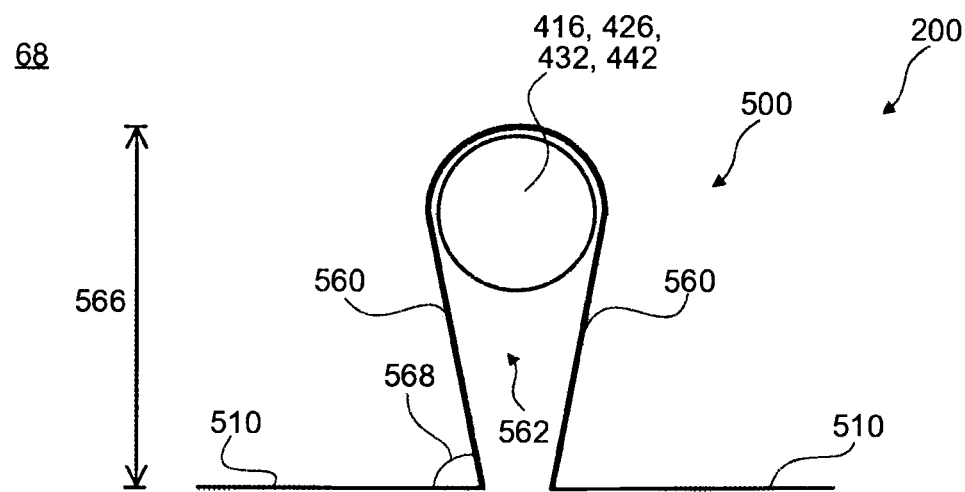
FIG. 33 illustrates a cross-sectional view of the tent system shown in FIG. 11 with a canopy sleeve in an acute configuration, according to an aspect.
Figure 34:
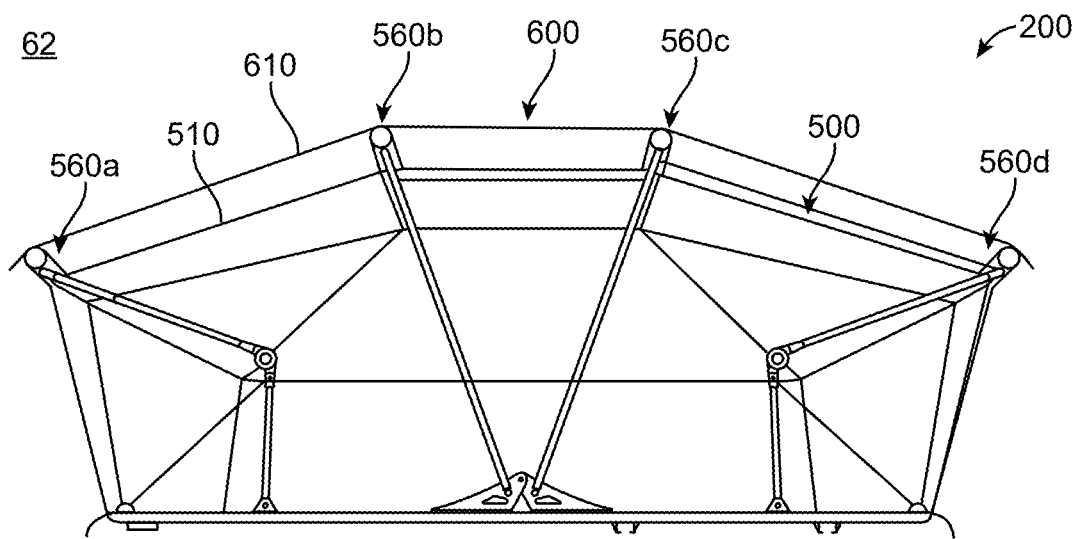
FIG. 34 illustrates a side view of the tent system shown in FIG. 11 in the perpendicular configuration, according to an aspect.
Figure 35:
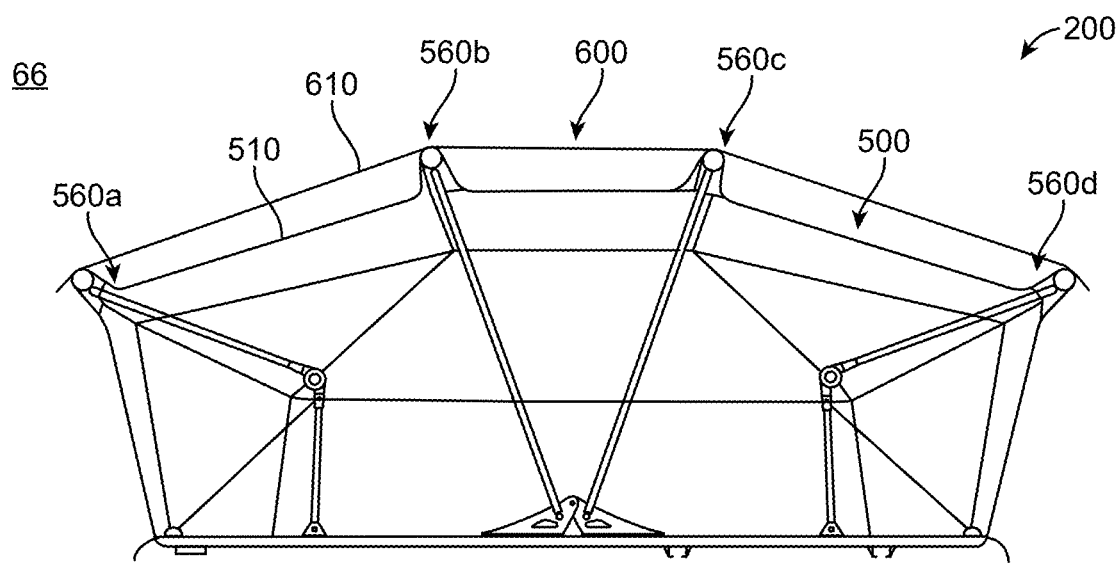
FIG. 35 illustrates a side view of the tent system shown in FIG. 11 in the parabolic configuration, according to an aspect.

In some aspects, canopy sleeves 560 can be closed. For example, as shown in FIG. 16, canopy sleeve 560 can include zipper sleeve 576 and zipper 578 to receive and enclose at least a portion of a corresponding frame member 410, 420, 430, 440. In some aspects, closed canopy sleeves 560 can provide rapid deployment (e.g., opening) and collapse (e.g., closing) of tent system 200. In some aspects, canopy sleeves 560 can be open. For example, as shown in FIGS. 30-33, canopy sleeve 560 can be a pocket, a depression, and/or a recess with sleeve recess 562 to receive and support a portion of a corresponding frame member 410, 420, 430, 440. In some aspects, open canopy sleeves 560 can provide adjustment to a height and/or shape of canopy system 500. For example, as shown in FIGS. 34 and 35, open canopy sleeves 560 can adjust canopy system 500 into different configurations (e.g., perpendicular configuration 62, parabolic configuration 66, etc.). In some aspects, when disposed in canopy sleeve 560, a portion (e.g., a majority or a bottom surface) of a corresponding frame member 410, 420, 430, 440 can be exposed to internal volume 552.

In some aspects, canopy sleeves 560 and canopy 510 can be formed from the same material. For example, canopy sleeves 560 and canopy 510 formed from the same material can increase manufacturing efficiency and decrease cost. In some aspects, for example, stitching and/or fabric thickness can be adjusted to form canopy sleeves 560 and canopy 510 from the same material. In some aspects, canopy sleeves 560 and canopy 510 can be integrally formed. In some aspects, canopy sleeves 560 and canopy 510 can be formed from different materials. In some aspects, canopy 510 and/or canopy sleeves 560 can include an elastic material. For example, as shown in FIG. 32, in parabolic configuration 66, canopy sleeve 560 can include an elastic material configured to stretch around a corresponding frame member 410, 420, 430, 440 (e.g., when in open configuration 10) and connect to canopy 510.

In some aspects, canopy sleeves 560 can be stitched to canopy 510. In some aspects, canopy sleeves 560 can be stitched to canopy 510 at a particular angle, for example, canopy sleeve angle 568 shown in FIGS. 30-33. In some aspects, canopy sleeves 560 can be stitched to canopy 510 with a particular height, for example, canopy sleeve height 566 shown in FIGS. 30-33. In some aspects, a plurality of canopy sleeves 560 can be coupled (e.g., stitched, sewn, tacked, etc.) to canopy 510 at a particular angle (e.g., canopy sleeve angle 568) and/or a particular height (e.g., canopy sleeve height 566). For example, as shown in FIG. 34, canopy sleeves 560a, 560b, 560c, 560d can be in perpendicular configuration 62. For example, as shown in FIG. 35, canopy sleeves 560a, 560b, 560c, 560d can be in parabolic configuration 66.

Figure 30:
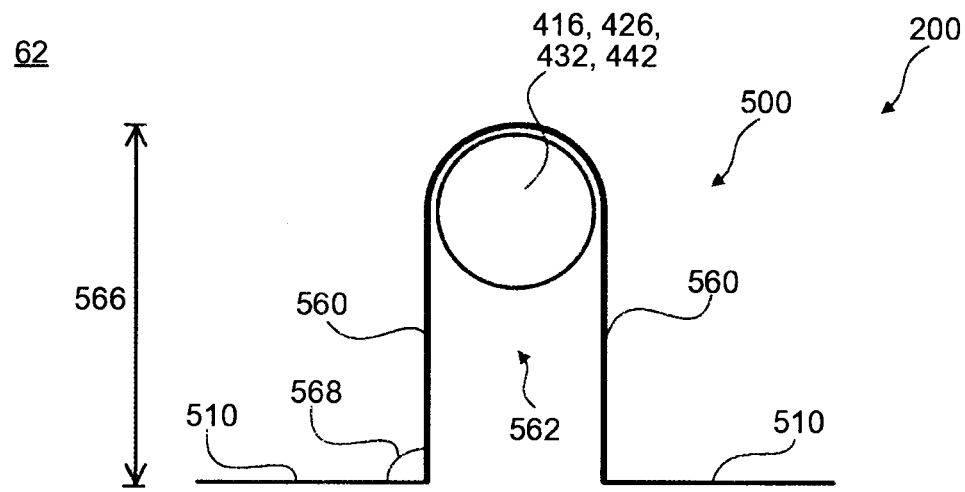
FIG. 30 illustrates a cross-sectional view of the tent system shown in FIG. 11 with a canopy sleeve in a perpendicular configuration, according to an aspect.
Figure 31:
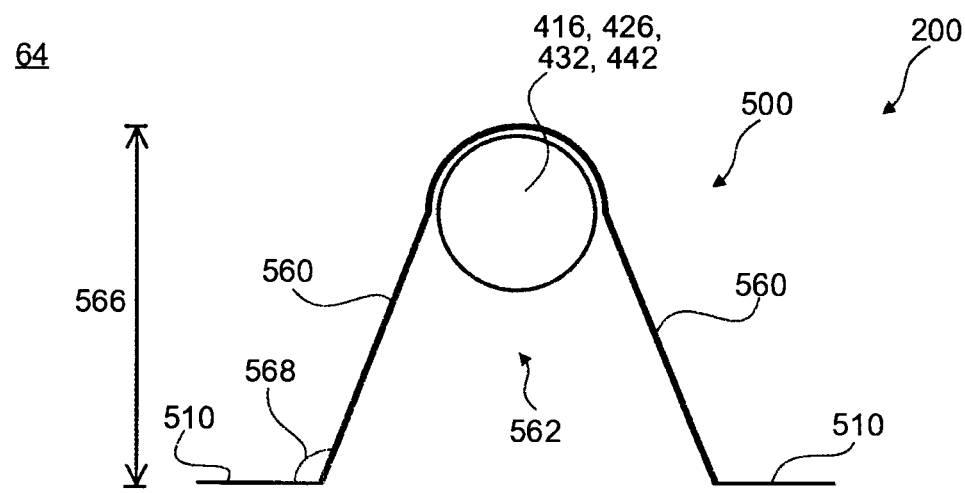
FIG. 31 illustrates a cross-sectional view of the tent system shown in FIG. 11 with a canopy sleeve in an obtuse configuration, according to an aspect.

In some aspects, canopy sleeves 560 can be coupled to canopy 510. In some aspects, canopy sleeves 560 can be coupled (e.g., stitched, sewn, tacked, etc.) to canopy 510 at a particular angle. In some aspects, for example, as shown in FIG. 30, in perpendicular configuration 62, canopy sleeves 560 can be coupled to canopy 510 at canopy sleeve angle 568 of about 90 degrees. In some aspects, for example, as shown in FIG. 31, in obtuse configuration 64, canopy sleeves 560 can be coupled to canopy 510 at canopy sleeve angle 568 of about 90 degrees to about 150 degrees. For example, in obtuse configuration 64, canopy sleeve angle 568 can be about 120 degrees. In some aspects, for example, as shown in FIG. 32, in parabolic configuration 66, canopy sleeves 560 can be coupled to canopy 510 at canopy sleeve angle 568 of about 90 degrees to about 180 degrees. For example, in parabolic configuration 66, canopy sleeve angle 568 can be about 150 degrees. In some aspects, for example, as shown in FIG. 33, in acute configuration 68, canopy sleeves 560 can be coupled to canopy 510 at canopy sleeve angle 568 of about 0 degrees to about 90 degrees. For example, in acute configuration 68, canopy sleeve angle 568 can be about 30 degrees.

In some aspects, canopy sleeves 560 can be coupled (e.g., stitched, sewn, tacked, etc.) to canopy 510 with a particular height. In some aspects, for example, as shown in FIG. 30, in perpendicular configuration 62, canopy sleeves 560 can be coupled to canopy 510 with canopy sleeve height 566 of about 1 cm to about 15 cm. For example, in perpendicular configuration 62, canopy sleeve height 566 can be about 10 cm. In some aspects, for example, as shown in FIG. 31, in obtuse configuration 64, canopy sleeves 560 can be coupled to canopy 510 with canopy sleeve height 566 of about 1 cm to about 10 cm. For example, in obtuse configuration 64, canopy sleeve height 566 can be about 5 cm. In some aspects, for example, as shown in FIG. 32, in parabolic configuration 66, canopy sleeves 560 can be coupled to canopy 510 with canopy sleeve height 566 of about 1 cm to about 10 cm. For example, in parabolic configuration 66, canopy sleeve height 566 can be about 5 cm. In some aspects, for example, as shown in FIG. 33, in acute configuration 68, canopy sleeves 560 can be coupled to canopy 510 with canopy sleeve height 566 of about 1 cm to about 10 cm. For example, in acute configuration 68, canopy sleeve height 566 can be about 5 cm.

In some aspects, first frame member 410, second frame member 420, third frame member 430, and fourth frame member 440 of frame system 400 can be configured to be disposed in canopy sleeves 560 such that first frame member 410, second frame member 420, third frame member 430, and fourth frame member 440 are disposed interior to canopy system 500. For example, as shown in FIGS. 8, 11, and 17, first frame member 410 can be disposed within canopy sleeve 560a, second frame member 420 can be disposed within canopy sleeve 560d, third frame member 430 can be disposed within canopy sleeve 560b, and fourth frame member 440 can be disposed within canopy sleeve 560c. In some aspects, frame system 400 can be disposed entirely interior to canopy system 500.

One or more frame fasteners 570 can be configured to secure frame members 410, 420, 430, 440 to canopy sleeves 560. Frame fasteners 570 can be further configured to secure frame members 410, 420, 430, 440 within sleeve recesses 562 of canopy sleeves 560. In some aspects, each canopy sleeve 560 can include frame fastener 570. For example, as shown in FIG. 11, frame fastener 570a can secure first frame member 410 within canopy sleeve 560a, frame fastener 570b can secure third frame member 430 within canopy sleeve 560b, frame fastener 570c can secure fourth frame member 440 within canopy sleeve 560c, and frame fastener 570d can secure second frame member 420 within canopy sleeve 560d. In some aspects, frame fastener 570 can include a zipper, a hook-and-loop fastener, a button, a snap, a magnet, a friction lock, a tie, a hook, a clasp, a loop, and/or any other suitable fasteners or combinations thereof to secure a corresponding frame member 410, 420, 430, 440.

Figure 13:
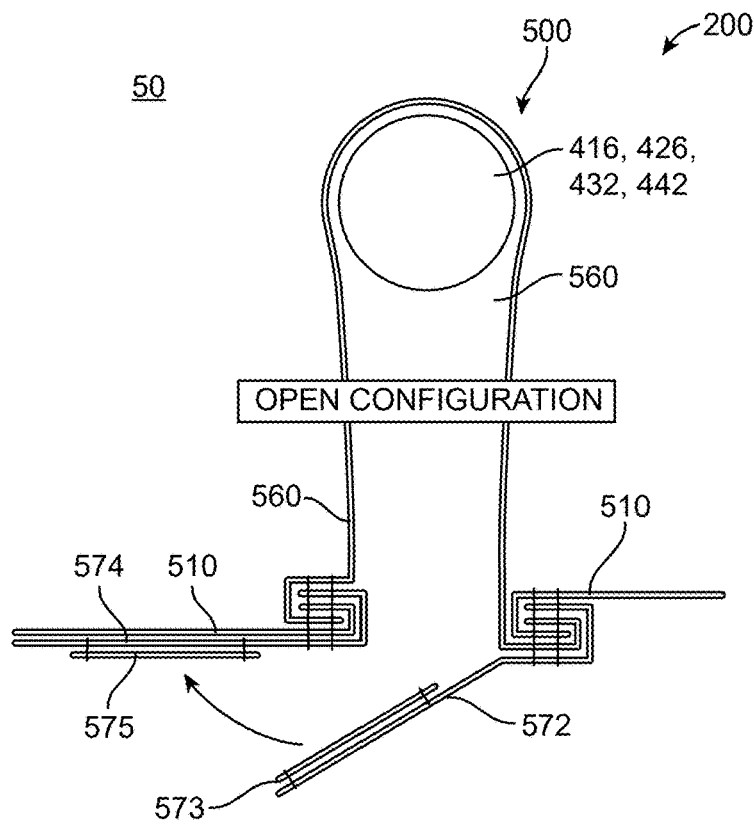
FIG. 13 illustrates a cross-sectional view of the frame fastener shown in FIG. 12 in an open configuration, according to an aspect.
Figure 14:
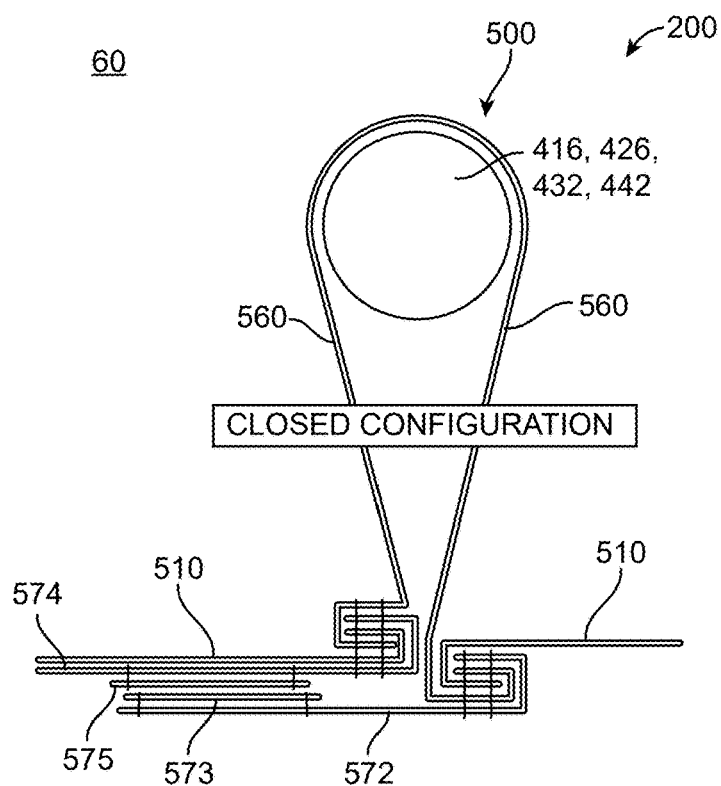
FIG. 14 illustrates a cross-sectional view of the frame fastener shown in FIG. 12 in a closed configuration, according to an aspect.

In some aspects, frame fastener 570 can include a hook-and-loop fastener (e.g., VELCRO®). For example, as shown in FIGS. 12-14, frame fastener 570 can include first strap fastener 572 and second strap fastener 574. In some aspects, as shown in FIG. 13, in open fastener configuration 50, first and second strap fasteners 572, 574 can be unsecured from each other. In some aspects, as shown in FIG. 14, in closed fastener configuration 60, first and second strap fasteners 572, 574 can be secured to each other. In some aspects, as shown in FIGS. 12-14, first strap fastener 572 can include first fastener 573 (e.g., hook portion of hook-and-loop fastener) configured to secure first strap fastener 572 to second strap fastener 574 in closed fastener configuration 60. In some aspects, as shown in FIGS. 12-14, second strap fastener 574 can include second fastener 575 (e.g., loop portion of hook-and-loop fastener) configured to secure second strap fastener 574 to first strap fastener 572 in closed fastener configuration 60.

Figure 15:
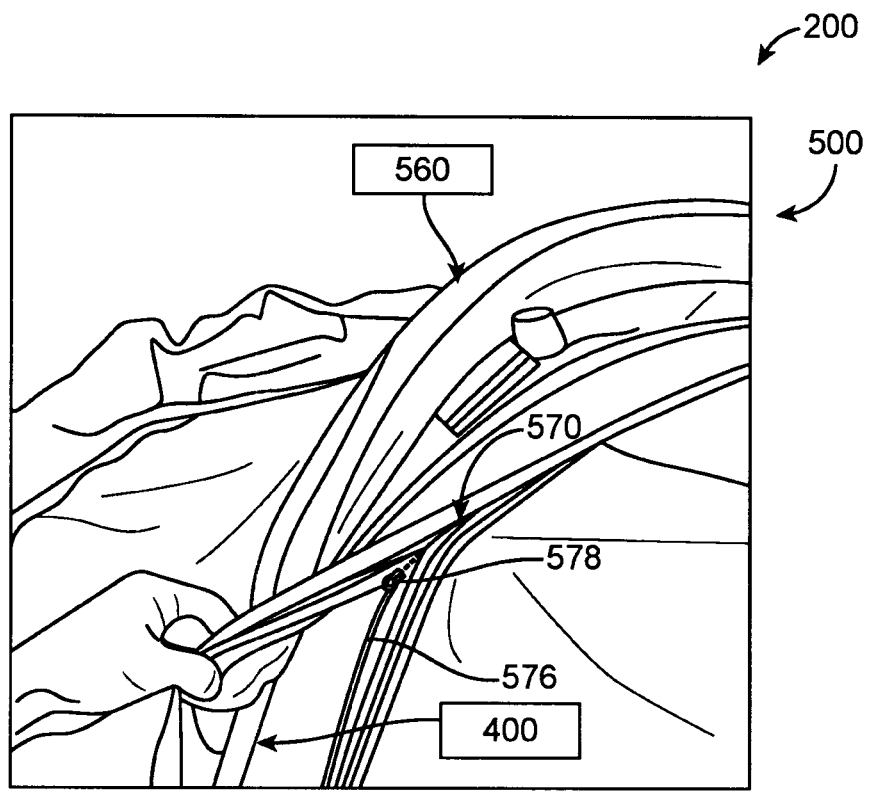
FIG. 15 illustrates a side perspective view of the tent system shown in FIG. 2A with a frame fastener, according to an aspect.

In some aspects, frame fastener 570 can include a zipper. For example, as shown in FIGS. 15 and 16, frame fastener 570 can include zipper sleeve 576 and zipper 578. In some aspects, as shown in FIGS. 15 and 16, zipper sleeve 576 can be coupled to canopy sleeve 560 and configured to receive (e.g., hold) a corresponding frame member 410, 420, 430, 440. In some aspects, as shown in FIGS. 15 and 16, zipper 578 can be configured to secure the corresponding frame member 410, 420, 430, 440 to zipper sleeve 576.

Rain fly fasteners 580 can be configured to secure a rain fly (e.g., rain fly system 600 shown in FIG. 7) to canopy system 500. As shown in FIGS. 8 and 17, canopy system 500 can include one or more rain fly fasteners 580 on canopy 510. For example, as shown in FIGS. 8 and 17, rain fly fasteners 580 can be disposed on canopy sleeves 560 (e.g., canopy sleeves 560b, 560c) and/or lower side surface 516 of canopy 510 adjacent base system 300. In some aspects, rain fly fastener 580 can include a zipper, a hook-and-loop fastener, a button, a snap, a magnet, a friction lock, a tie, a hook, a clasp, a loop, and/or any other suitable fasteners or combinations thereof to secure rain fly 610 of rain fly system 600.

Example Rain Fly System

Rain fly system 600 can be configured to provide weather protection (e.g., rain, sun, heat, wind, snow, cold, etc.). As shown in FIGS. 21-29, rain fly system 600 can include rain fly 610. In some aspects, rain fly system 600 can include spring rods 620. In some aspects, rain fly 610 can include a polymer, a plastic, a thermoplastic, an elastomer, polyester (e.g., Mylar®), TPU, polyethylene (e.g., Dyneema®), UHMWPE (e.g., DCF), nylon, silicone, poly-cotton, canvas,), a combination thereof, and/or any other water resistant material. For example, rain fly 610 can include TPU.

Figure 22:
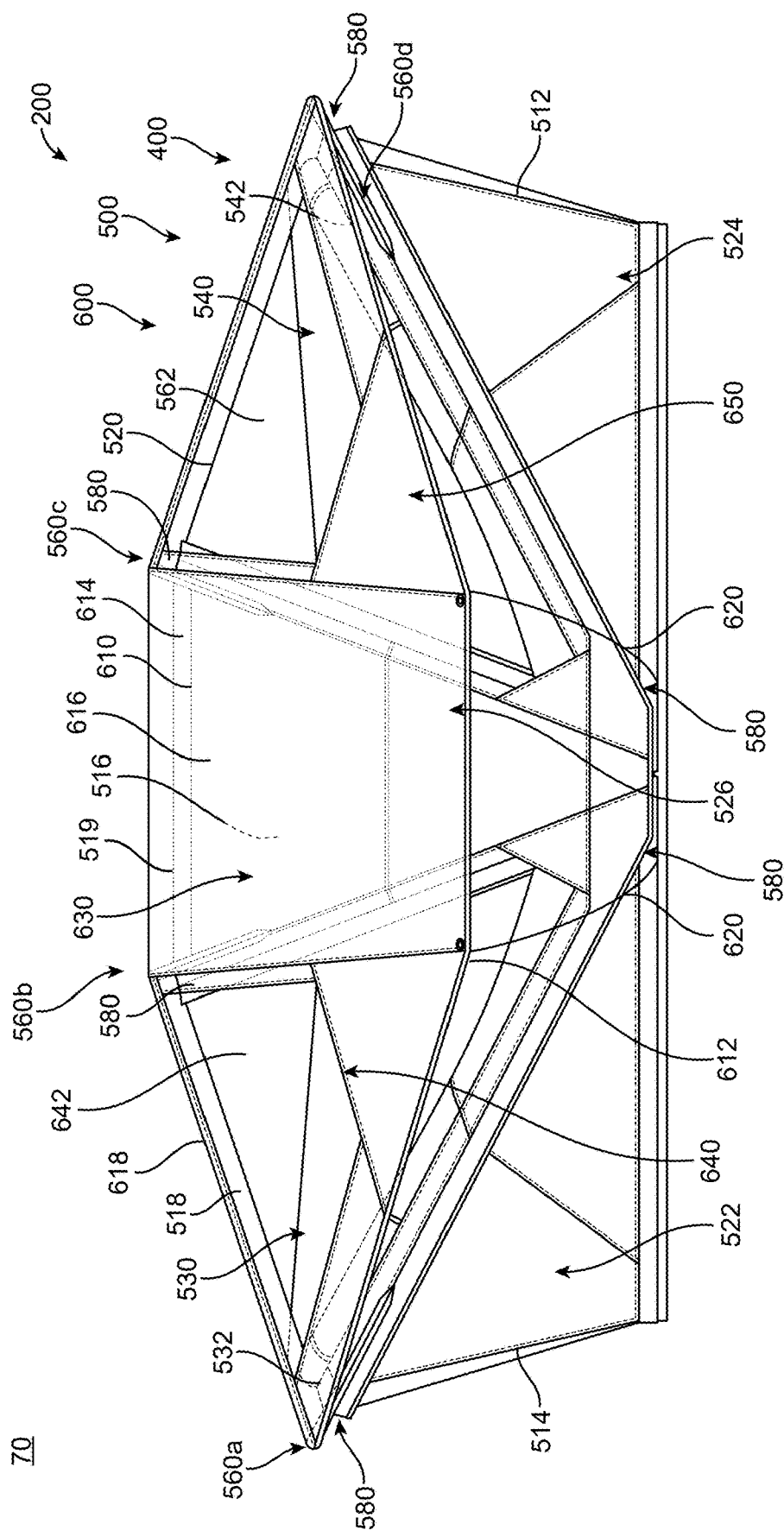
FIG. 22 illustrates a side view of the tent system shown in FIG. 17 with a rain fly in a fully deployed configuration, according to an aspect.
Figure 23:
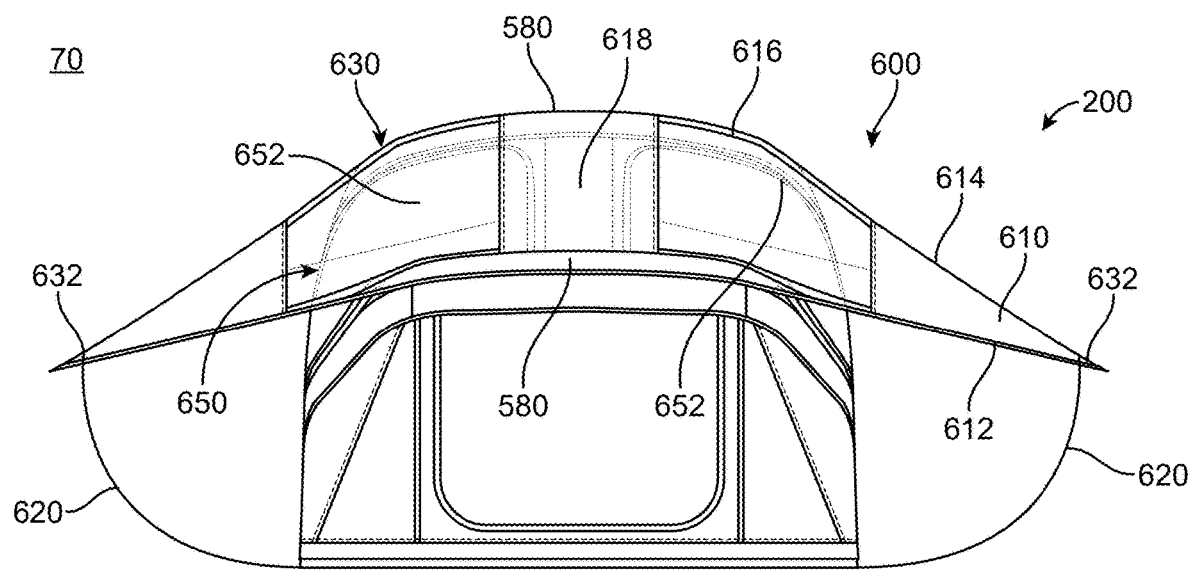
FIG. 23 illustrates a front view of the tent system shown in FIG. 22.
Figure 24:
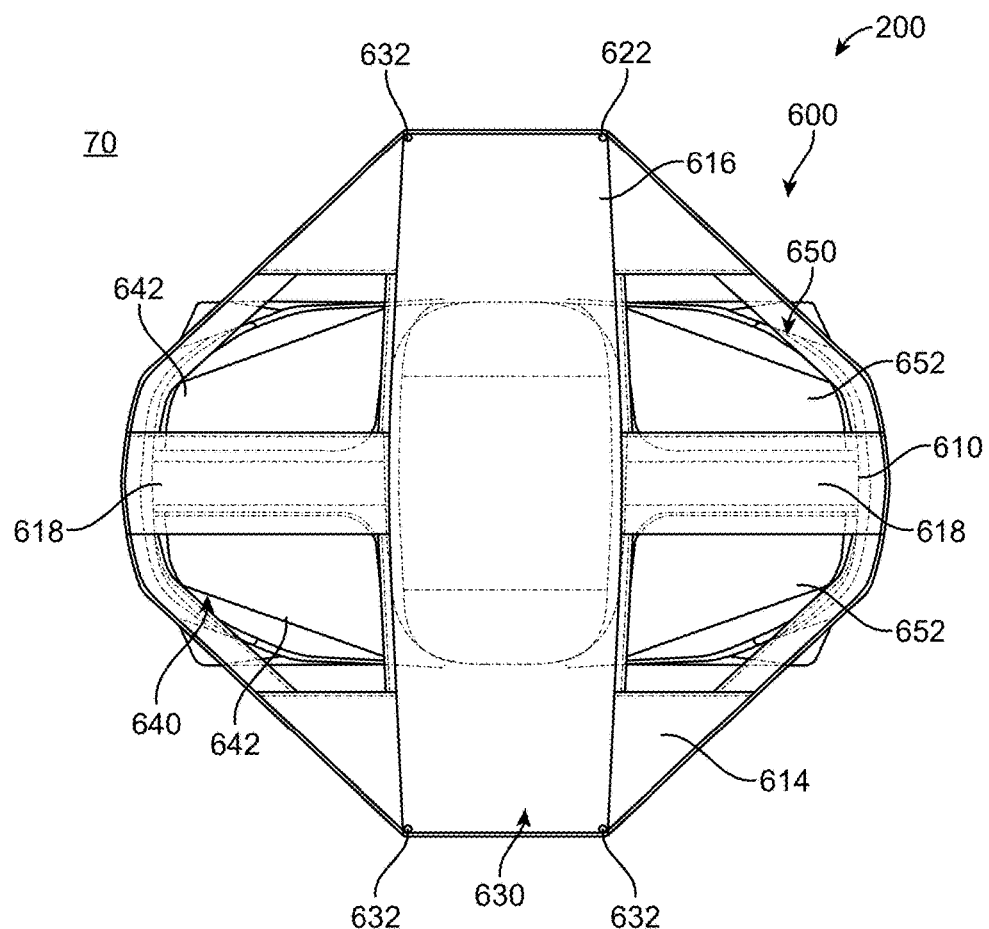
FIG. 24 illustrates a top view of the tent system shown in FIG. 22.

As shown in FIGS. 22-24, rain fly 610 can include interior surface 612, exterior surface 614, transverse panel 616, and longitudinal panel 618. Rain fly 610 can further include first section 630, second section 640, and third section 650. As shown in FIG. 22, in fully deployed extended configuration 70, first section 630 (e.g., center) can be disposed atop canopy sleeves 560b, 560c, second section 640 (e.g., left side) can be disposed atop canopy sleeves 560a, 560b, and third section 650 (e.g., right side) can be disposed atop canopy sleeves 560c, 560d. In some aspects, rain fly 610 can include a plurality of windows. For example, as shown in FIG. 24, rain fly 610 can include second section windows 642 and/or third section windows 652.

First section 630 can be configured to receive one or more spring rods 620. First section 630 can include transverse panel 616. In some aspects, first section 630 can be configured to provide one or more spring rod inserts. For example, as shown in FIGS. 22-24, first section 630 can include spring rod inserts 632 to receive spring rods 620. In some aspects, spring rod inserts 632 can include holes, recesses, apertures, sleeves, pockets, a combination thereof, and/or any suitable insert to receive and secure spring rods 620.

Second section 640 can be configured to provide one or more windows and increase visibility of tent system 200. Second section 640 can include second section windows 642. In some aspects, second section windows 642 can include TPU, a polymer, a polyester, and/or any other water resistant and transparent material. In some aspects, as shown in FIG. 24, second section windows 642 can each be separated by longitudinal panel 618.

Third section 650 can be configured to provide one or more windows and increase visibility of tent system 200. Third section 650 can include third section windows 652. In some aspects, third section windows 652 can include TPU, a polymer, a polyester, and/or any other water resistant and transparent material. In some aspects, as shown in FIG. 24, third section windows 652 can each be separated by longitudinal panel 618.

In some aspects, in an open configuration, rain fly 610 can be supported by at least one of the plurality of canopy sleeves 560. For example, as shown in FIG. 22, in fully deployed extended configuration 70, rain fly 610 can be supported by canopy sleeves 560a, 560b, 560c, and/or 560d. In some aspects, rain fly 610 can contact at least one of the plurality of canopy sleeves 560. For example, as shown in FIG. 21, rain fly 610 can contact canopy sleeves 560c, 560d.

In some aspects, a buffer can be disposed between rain fly 610 and at least one of the plurality of canopy sleeves 560. For example, as shown in FIG. 21, buffer 590 can be disposed between rain fly 610 and canopy sleeve 560c. In some aspects, buffer 590 can be configured to separate rain fly 610 from at least one of the plurality of canopy sleeves 560, for example, for additional separation and decrease in moisture. In some aspects, buffer 590 can include a foam, a fabric, a standoff, a spacer, and/or any other material capable of separating rain fly 610 from at least one of the plurality of canopy sleeves 560.

In some aspects, a gap can be formed between rain fly 610 and an upper exterior surface (e.g., top surface 518 shown in FIG. 17) of canopy 510 between each canopy sleeve 560. For example, as shown in FIG. 21, gap 564 can be formed between rain fly 610 and top surface 518 of canopy 510. In some aspects, gap 564 can be about 1 cm to about 15 cm, for example, to reduce condensation and/or moisture in tent system 200. In some aspects, gap 564 can be about 2 cm to about 10 cm. For example, gap 564 can be about 4 cm to about 5 cm.

Spring rods 620 can be configured to support a portion of rain fly 610. In some aspects, tent system 200 can include a plurality of spring rods 620. For example, as shown in FIGS. 22 and 23, in fully deployed extending configuration 70, tent system 200 can include four spring rods 620 to support transverse panel 616 of rain fly 610. In some aspects, spring rods 620 can include a polymer, an elastomer, a metal, and/or any other material capable of producing a spring force to suspend a portion (e.g., transverse panel 616) of rain fly 610. In some aspects, as shown in FIGS. 22 and 23, spring rods 620 can be coupled to rain fly 610 (e.g., transverse panel 616) and rain fly fasteners 580. In some aspects, spring rods 620 can be coupled to rain fly 610 (e.g., transverse panel 616) and base system 300. In some aspects, spring rods 620 can be coupled to rain fly 610, rain fly fasteners 580, and/or base system 300.

In an aspect, in a first configuration, rain fly 610 can be fully deployed and supported by the plurality of canopy sleeves 560 and the plurality of spring rods 620 coupled to base system 300. For example, as shown in FIG. 22, in fully deployed extended configuration 70, rain fly 610 can be supported by canopy sleeves 560 and spring rods 620.

Figure 25:
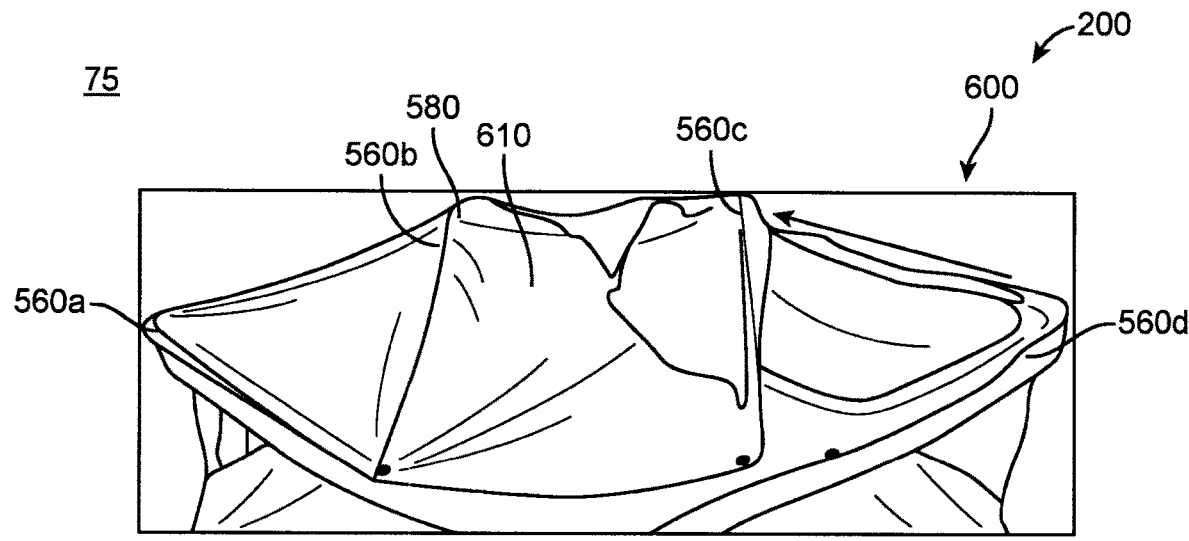
FIG. 25 illustrates a partial side perspective view of the tent system shown in FIG. 22 in a semi-stowed configuration, according to an aspect.

In an aspect, in a second configuration, rain fly 610 can be semi-stowed and fixed by one or more rain fly fasteners 580 on canopy 510 to expose a transverse section of canopy 510. For example, as shown in FIG. 25, in semi-stowed longitudinal configuration 75, rain fly 610 can be semi-stowed and fixed by rain fly fasteners 580 to expose fifth section 540 or fourth section 530 of canopy 510.

Figure 26:
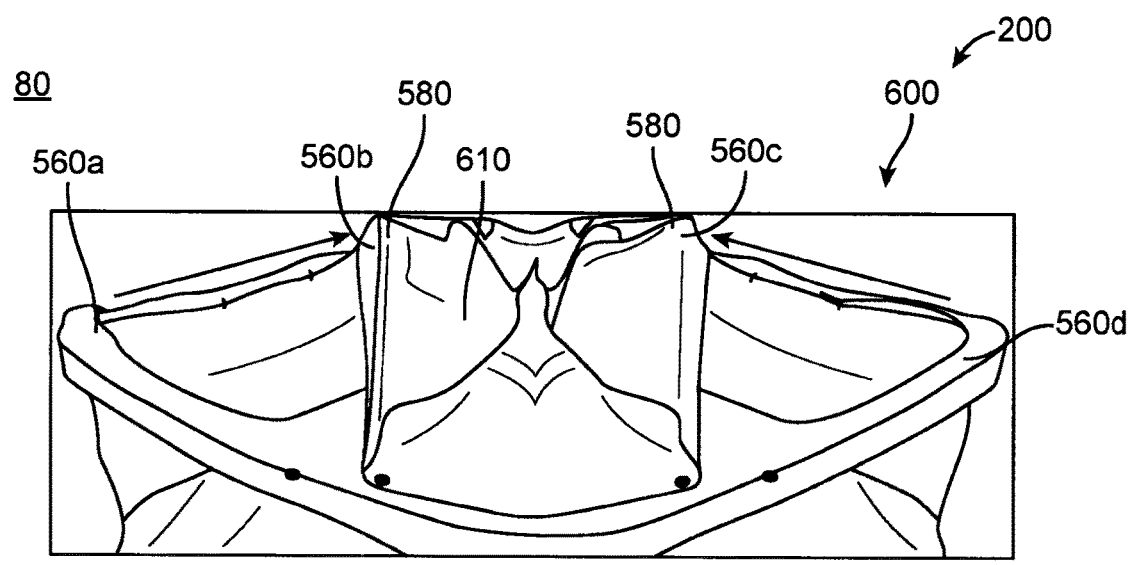
FIG. 26 illustrates a partial side perspective view of the tent system shown in FIG. 22 in a stowed configuration, according to an aspect.

In an aspect, in a third configuration, rain fly 610 can be stowed and fixed by a plurality of rain fly fasteners 580 on canopy 510 to expose a plurality of transverse sections of canopy 510. For example, as shown in FIG. 26, in stowed configuration 80, rain fly 610 can be stowed (e.g., along top transverse panel 519) and fixed by rain fly fasteners 580 to expose fourth and fifth sections 530, 540 of canopy 510.

Figure 27:
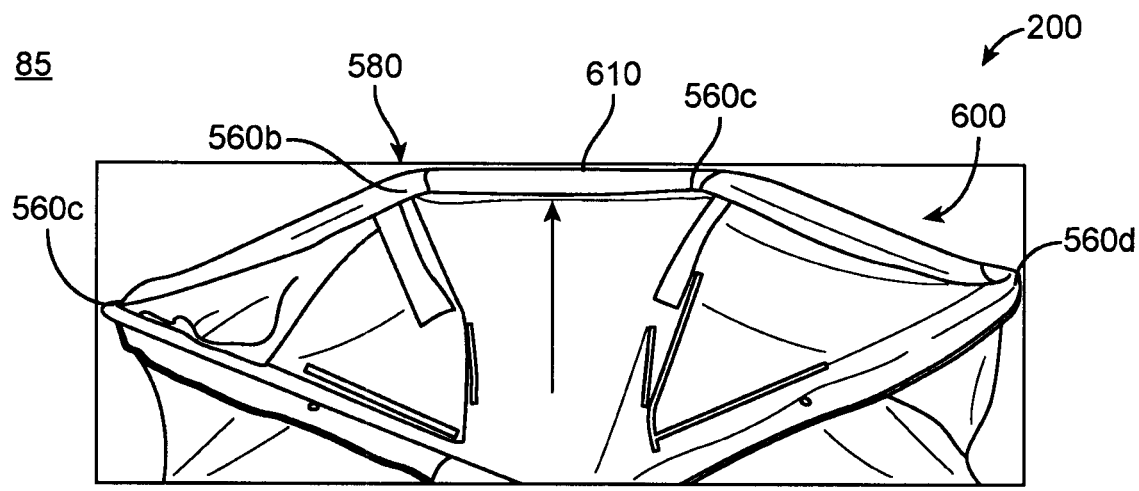
FIG. 27 illustrates a partial side perspective view of the tent system shown in FIG. 22 in a semi-stowed configuration, according to an aspect.

In an aspect, in a fourth configuration, rain fly 610 can be semi-stowed and fixed by one or more rain fly fasteners 580 on canopy 510 to expose a longitudinal section of canopy 510. For example, as shown in FIG. 27, in semi-stowed transverse configuration 85, rain fly 610 can be semi-stowed and fixed by rain fly fasteners 580 to expose approximately half of third section 526, fourth section 530, and fifth section 540 of canopy 510.

Figure 28:
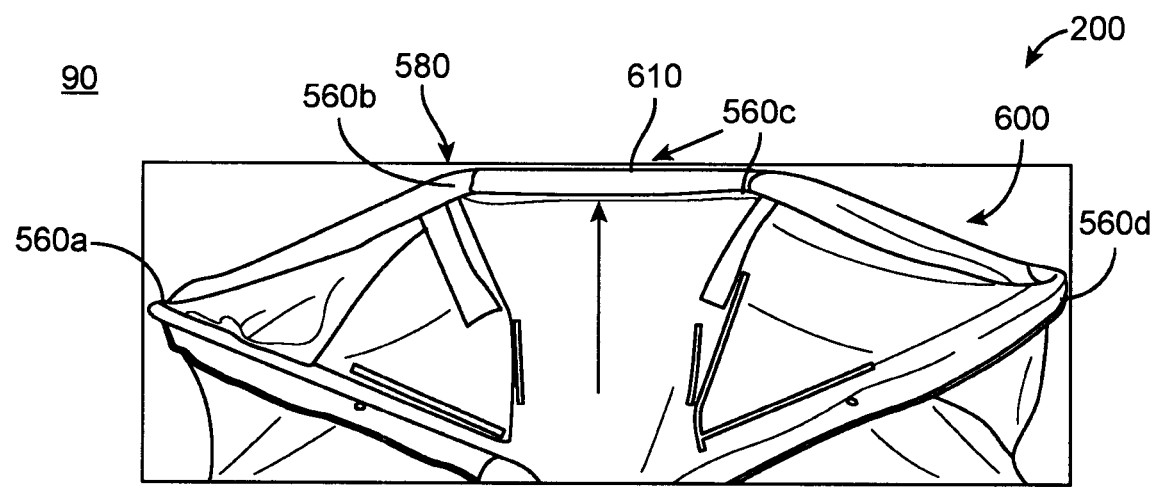
FIG. 28 illustrates a partial side perspective view of the tent system shown in FIG. 22 in a stowed configuration, according to an aspect.

In an aspect, in a fifth configuration, rain fly 610 can be stowed and fixed by a plurality of rain fly fasteners 580 on canopy 510 to expose a plurality of longitudinal sections of canopy 510. For example, as shown in FIG. 28, in stowed configuration 90, rain fly 610 can be stowed (e.g., along top longitudinal panel 520) and fixed by rain fly fasteners 580 to expose a majority of third, fourth, and fifth sections 524, 530, 540 of canopy 510.

Figure 29:
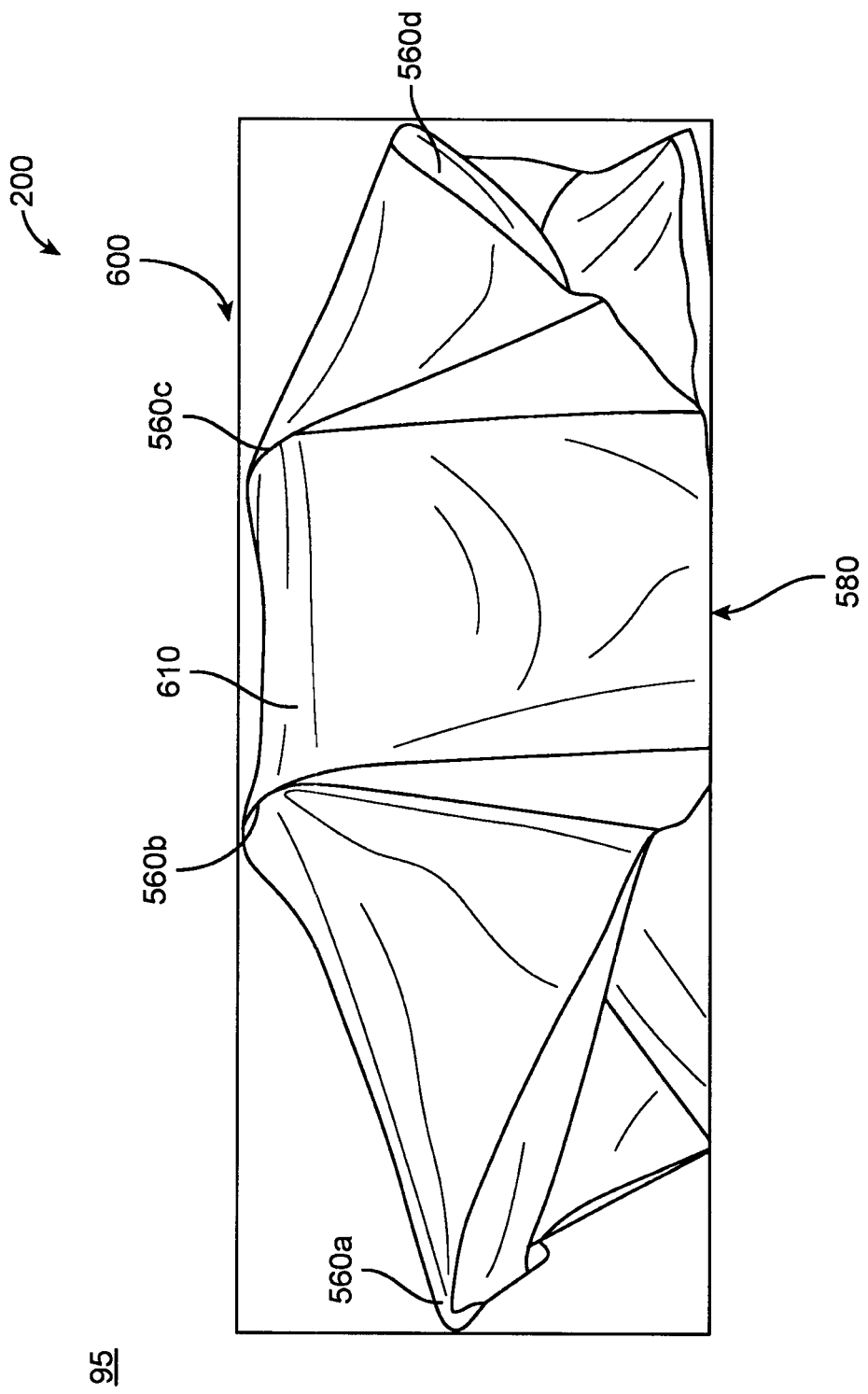
FIG. 29 illustrates a partial side perspective view of the tent system shown in FIG. 22 in a fully deployed configuration, according to an aspect.

In an aspect, in a sixth configuration, rain fly 610 can be fully deployed and supported by the plurality of canopy sleeves 560. For example, as shown in FIG. 29, in fully deployed covered configuration 95, rain fly 610 can be supported by canopy sleeves 560.

Example Flow Diagrams

Figure 36A:
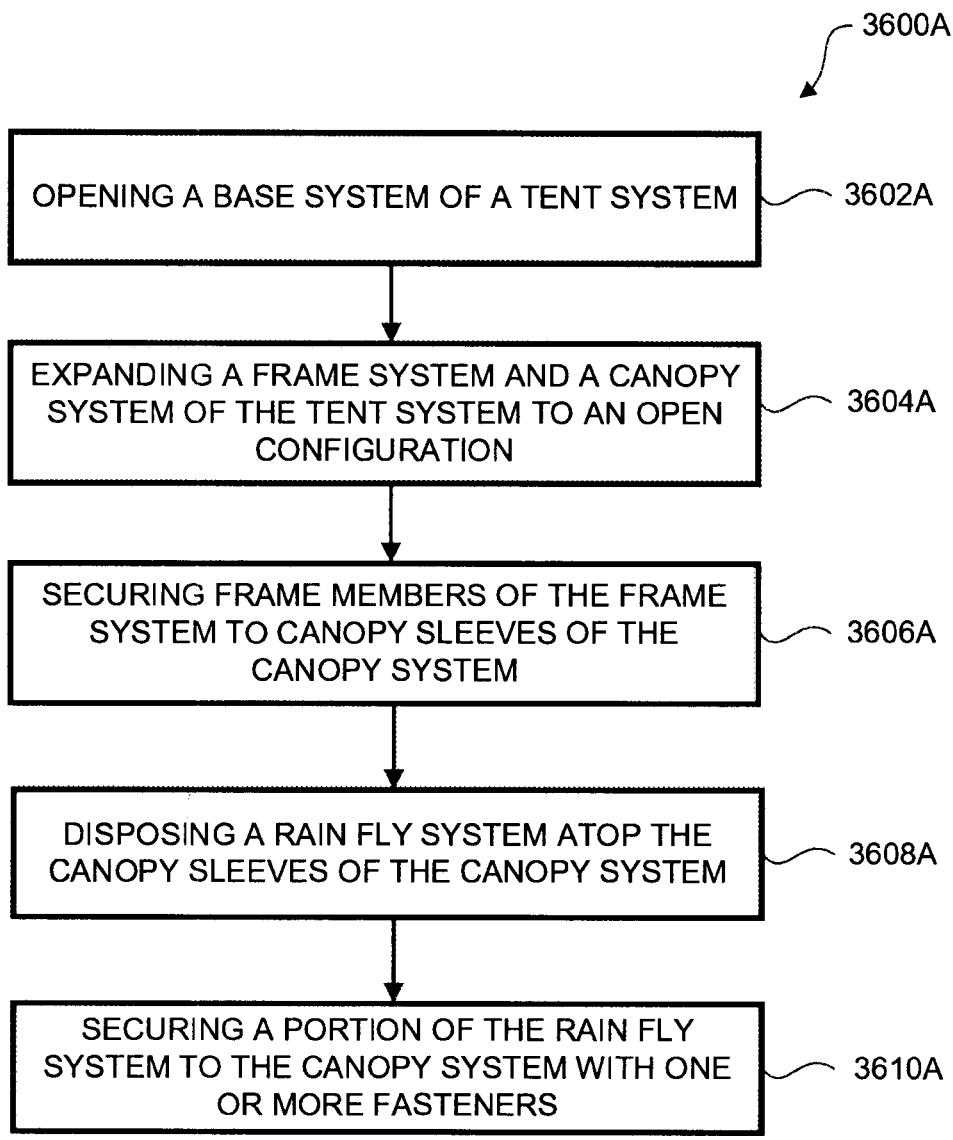
FIG. 36A illustrates a flow diagram for operating the tent system shown in FIG. 2A, according to an aspect.

FIG. 36A illustrates flow diagram 3600A for operating tent system 200, for example, shown in FIGS. 2A, 7, and 22, according to aspects. It is to be appreciated that not all steps in FIG. 36A are needed to perform the disclosure provided herein. Further, some of the steps may be performed simultaneously, sequentially, and/or in a different order than shown in FIG. 36A. Flow diagram 3600A is described with reference to FIGS. 2A-29. However, flow diagram 3600A is not limited to those example aspects. In some aspects, flow diagram 3600A can suspend rain fly system 600 above canopy system 500, increase ventilation, increase visibility, decrease condensation, decrease moisture, increase insulation, increase manufacturing efficiency, decrease weight, and/or provide a single interior frame system 400.

In step 3602A, as shown in the example of FIGS. 4-5B, base system 300, frame system 400, and canopy system 500 of tent system 200 can be opened from closed configuration 20 (shown in FIG. 4) to semi-open configuration 30 (shown in FIG. 5A), and from semi-open configuration 30 (shown in FIG. 5A) to unfolded configuration 40 (shown in FIG. 5B), by rotating first base member 312 about hinge 318 such that first and second base members 312, 314 are adjacent to each other in the same plane.

In step 3604A, as shown in the example of FIGS. 2A, 5C, 8, and 17, frame system 400 and canopy system 500 of tent system 200 can be expanded to open configuration 10. In some aspects, a user can apply a force (e.g., pull) to first and second linkages 418, 428 to extend frame system 400 within canopy system 500. In some aspects, unfolding base system 300 automatically and/or simultaneously expands frame system 400.

In step 3606A, as shown in the example of FIGS. 8 and 11-16, frame members 410, 420, 430, 440 (e.g., first leg 416, second leg 426, third arm 432, fourth arm 442) of frame system 400 can be secured to (e.g., within) canopy sleeves 560 of canopy system 500 by corresponding frame fasteners 570. In some aspects, for example, as shown in FIG. 11, frame member 410 can be secured to canopy sleeve 560a by frame fastener 570a, frame member 420 can be secured to canopy sleeve 560d by frame fastener 570d, frame member 430 can be secured to canopy sleeve 560b by frame fastener 570b, and frame member 440 can be secured to canopy sleeve 560c by frame fastener 570c.

In step 3608A, as shown in the example of FIGS. 21-25, rain fly 610 of rain fly system 600 can be disposed atop canopy sleeves 560 of canopy system 500. In some aspects, as shown in FIG. 22, in fully deployed extended configuration 70, rain fly 610 can be disposed atop canopy sleeves 560a, 560b, 560c, 560d.

In step 3610A, as shown in the example of FIGS. 21-29, a portion of rain fly 610 of rain fly system 600 can be secured to canopy system 500 with one or more rain fly fasteners 580. In some aspects, as shown in FIG. 22, in fully deployed extended configuration 70, rain fly 610 can be secured to rain fly fasteners 580 on canopy sleeves 560a, 560b, 560c, 560d. In an aspect, as shown in FIG. 22, in fully deployed extended configuration 70, rain fly 610 can be supported by canopy sleeves 560 and spring rods 620. In an aspect, as shown in FIG. 25, in semi-stowed longitudinal configuration 75, rain fly 610 can be semi-stowed and fixed by rain fly fasteners 580 to expose fifth section 540 or fourth section 530 of canopy 510. In an aspect, as shown in FIG. 26, in stowed configuration 80, rain fly 610 can be stowed (e.g., along top transverse panel 519) and fixed by rain fly fasteners 580 to expose fourth and fifth sections 530, 540 of canopy 510. In an aspect, as shown in FIG. 27, in semi-stowed transverse configuration 85, rain fly 610 can be semi-stowed and fixed by rain fly fasteners 580 to expose half of third section 526, fourth section 530, and fifth section 540 of canopy 510. In an aspect, as shown in FIG. 28, in stowed configuration 90, rain fly 610 can be stowed (e.g., along top longitudinal panel 520) and fixed by rain fly fasteners 580 to expose a majority of third, fourth, and fifth sections 524, 530, 540 of canopy 510. In an aspect, as shown in FIG. 29, in fully deployed covered configuration 95, rain fly 610 can be supported by canopy sleeves 560.

Figure 36B:
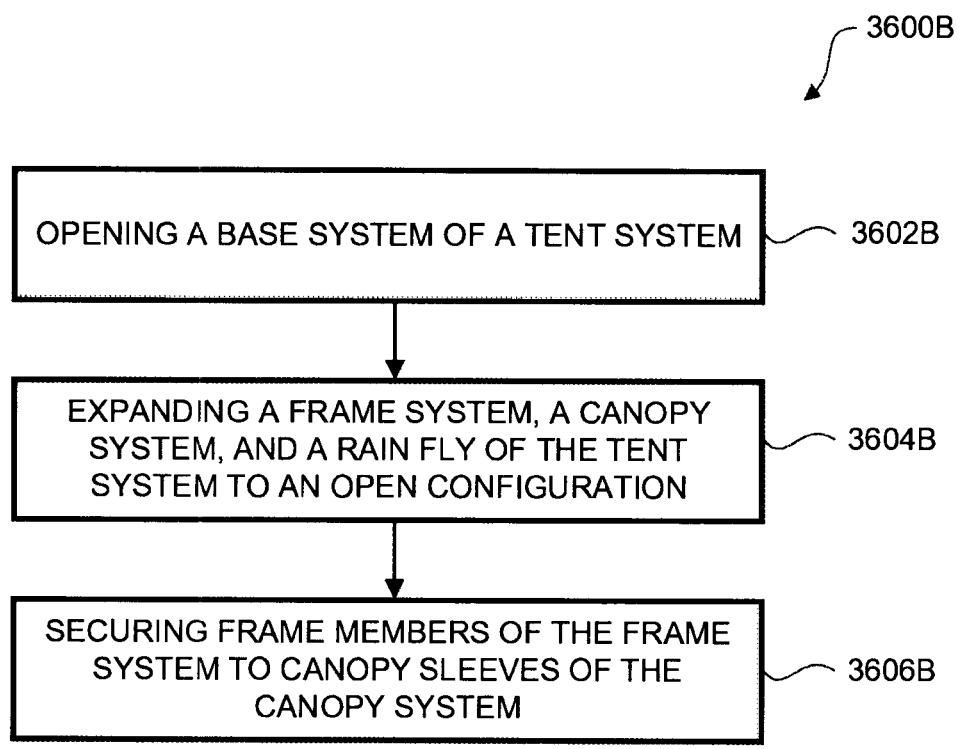
FIG. 36B illustrates a flow diagram for operating the tent system shown in FIG. 22, according to an aspect.

FIG. 36B illustrates flow diagram 3600B for operating tent system 200, for example, shown in FIGS. 7 and 22, according to aspects. It is to be appreciated that not all steps in FIG. 36B are needed to perform the disclosure provided herein. Further, some of the steps may be performed simultaneously, sequentially, and/or in a different order than shown in FIG. 36B. Flow diagram 3600B is described with reference to FIGS. 2A-29. However, flow diagram 3600B is not limited to those example aspects. In some aspects, flow diagram 3600B can simultaneously expand frame system 400, canopy system 500, and rain fly system 600. In some aspects, flow diagram 3600B can support rain fly system 600 on canopy system 500, increase ventilation, increase visibility, decrease condensation, decrease moisture, increase insulation, increase manufacturing efficiency, decrease weight, and/or provide a single interior frame system 400.

In step 3602B, as shown in the example of FIGS. 4-5B, base system 300, frame system 400, and canopy system 500 of tent system 200 can be opened from closed configuration 20 (shown in FIG. 4) to semi-open configuration 30 (shown in FIG. 5A), and from semi-open configuration 30 (shown in FIG. 5A) to unfolded configuration 40 (shown in FIG. 5B), by rotating first base member 312 about hinge 318 such that first and second base members 312, 314 are adjacent to each other in the same plane.

In step 3604B, as shown in the example of FIGS. 5C, 7, 8, 17, and 22, frame system 400, canopy system 500, and rain fly system 600 of tent system 200 can be expanded to open configuration 10. In some aspects, a user can apply a force (e.g., pull) to first and second linkages 418, 428 to extend frame system 400 within canopy system 500. In some aspects, unfolding base system 300 automatically and/or simultaneously expands frame system 400. In some aspects, unfolding base system 300 applies a self-tensioned force (e.g., restoring force) to frame system 400, canopy system 500, and rain fly system 600 of tent system 200. In some aspects, rain fly 610 of rain fly system 600 can be disposed atop canopy sleeves 560 of canopy system 500. In some aspects, as shown in FIG. 22, in fully deployed extended configuration 70, rain fly 610 can be disposed atop canopy sleeves 560a, 560b, 560c, 560d. In some aspects, as shown in the example of FIG. 22, a portion of rain fly 610 of rain fly system 600 can be secured to canopy system 500 with one or more rain fly fasteners 580. In some aspects, as shown in FIG. 22, in fully deployed extended configuration 70, rain fly 610 can be secured to rain fly fasteners 580 on canopy sleeves 560a, 560b, 560c, 560d. In an aspect, as shown in FIG. 22, in fully deployed extended configuration 70, rain fly 610 can be supported by canopy sleeves 560 and spring rods 620.

In step 3606B, as shown in the example of FIGS. 8, 11-16, and 22, frame members 410, 420, 430, 440 (e.g., first leg 416, second leg 426, third arm 432, fourth arm 442) of frame system 400 can be secured to (e.g., within) canopy sleeves 560 of canopy system 500 by corresponding frame fasteners 570. In some aspects, for example, as shown in FIG. 11, frame member 410 can be secured to canopy sleeve 560a by frame fastener 570a, frame member 420 can be secured to canopy sleeve 560d by frame fastener 570d, frame member 430 can be secured to canopy sleeve 560b by frame fastener 570b, and frame member 440 can be secured to canopy sleeve 560c by frame fastener 570c.

Example Manual Tent System

As discussed above, current rooftop tents (e.g., tent 100 shown in FIG. 1) can utilize a plurality of tent poles attached to a base to support a main tent canopy and create an internal volume for a user. When expanding from a collapsed configuration to an expanded configuration, tent poles of rooftop tents can apply an internal force (e.g., outward force) to create tension in the tent canopy, unlike ground tents which receive an external force (e.g., inward force) from a user outside of the tent canopy to create the tension.

However, static tent poles have drawbacks including that they must be inserted into various portions of the tent, they increase an overall height of the base (e.g., in a closed configuration), and they cannot stretch the main tent canopy, which can result in sagging and moisture buildup. Additionally, it can be difficult and time consuming to setup and deploy the plurality of tent poles around the main tent canopy, especially during harsh weather conditions, and maintain tension in the main tent canopy to form the internal volume. Further, there is a need to provide a more user-friendly and rapidly deployed tent system to quickly and easily mount, expand, secure, and utilize a tent canopy for weather protection (e.g., rain, sun, heat, wind, snow, cold, etc.). In addition, there is a need to provide a tent system with a folding mechanism (e.g., manual, automatic, self-tensioned) to easily and efficiently open (e.g., expand, deploy, etc.) and close (e.g., collapse, retract, etc.) the tent system.

Aspects of tent apparatuses, systems, and methods as discussed below can provide a tent having a folding mechanism (e.g., manual, automatic, self-tensioned) to easily and efficiently open (e.g., expand, deploy, etc.) and close (e.g., collapse, retract, etc.) the tent, increase an internal volume of the tent, increase rigidity of the main tent canopy, decrease setup time of the tent, decrease condensation, decrease moisture, increase insulation, decrease weight, decrease a height of the base, provide a single interior frame system, and/or provide an automatic (e.g., self-tensioned) self-folding tent.

Figure 37:
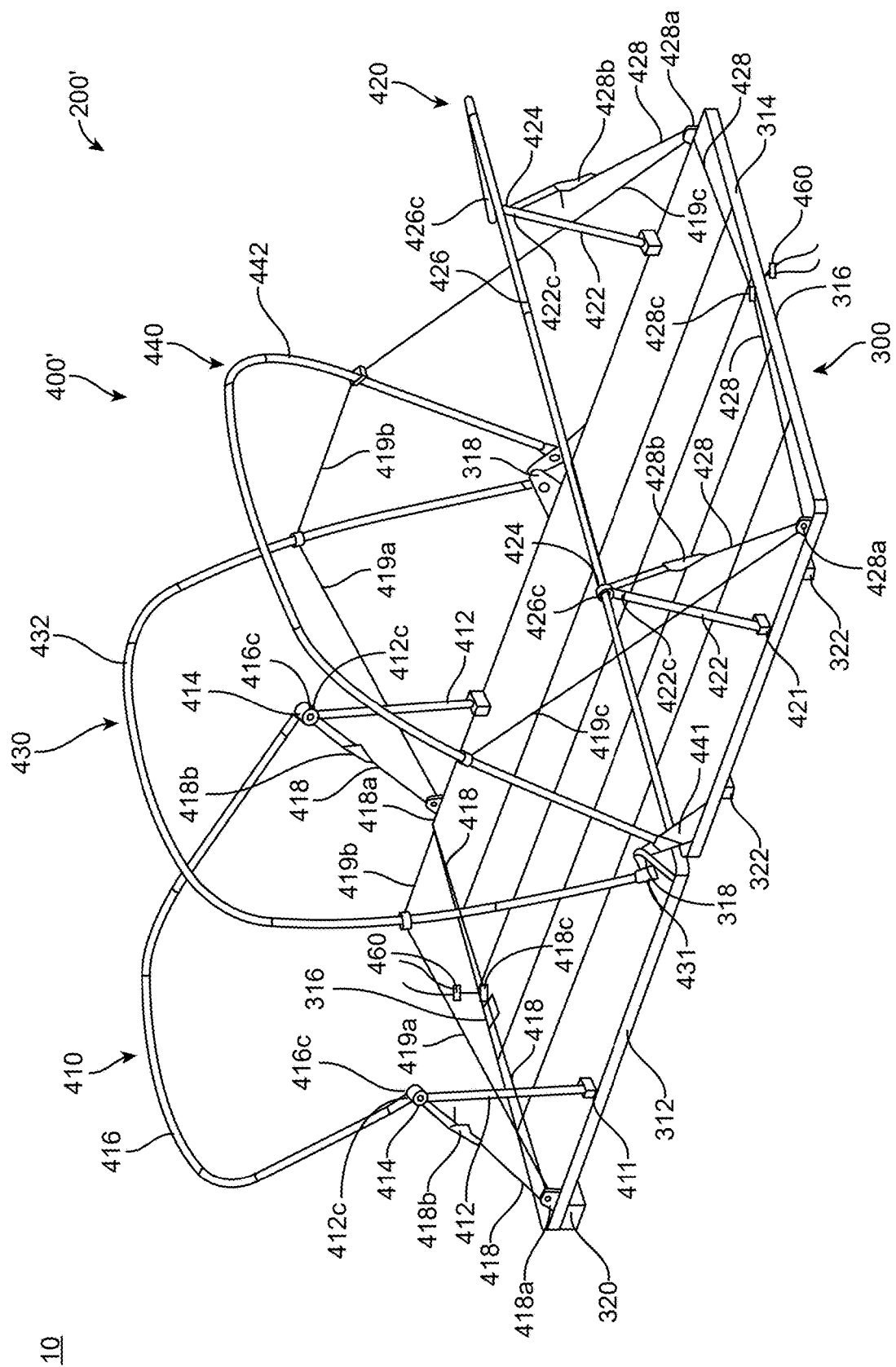
FIG. 37 illustrates a front perspective view of a tent system with a base system and a manual frame system in an open configuration, according to an aspect.
Figure 38:
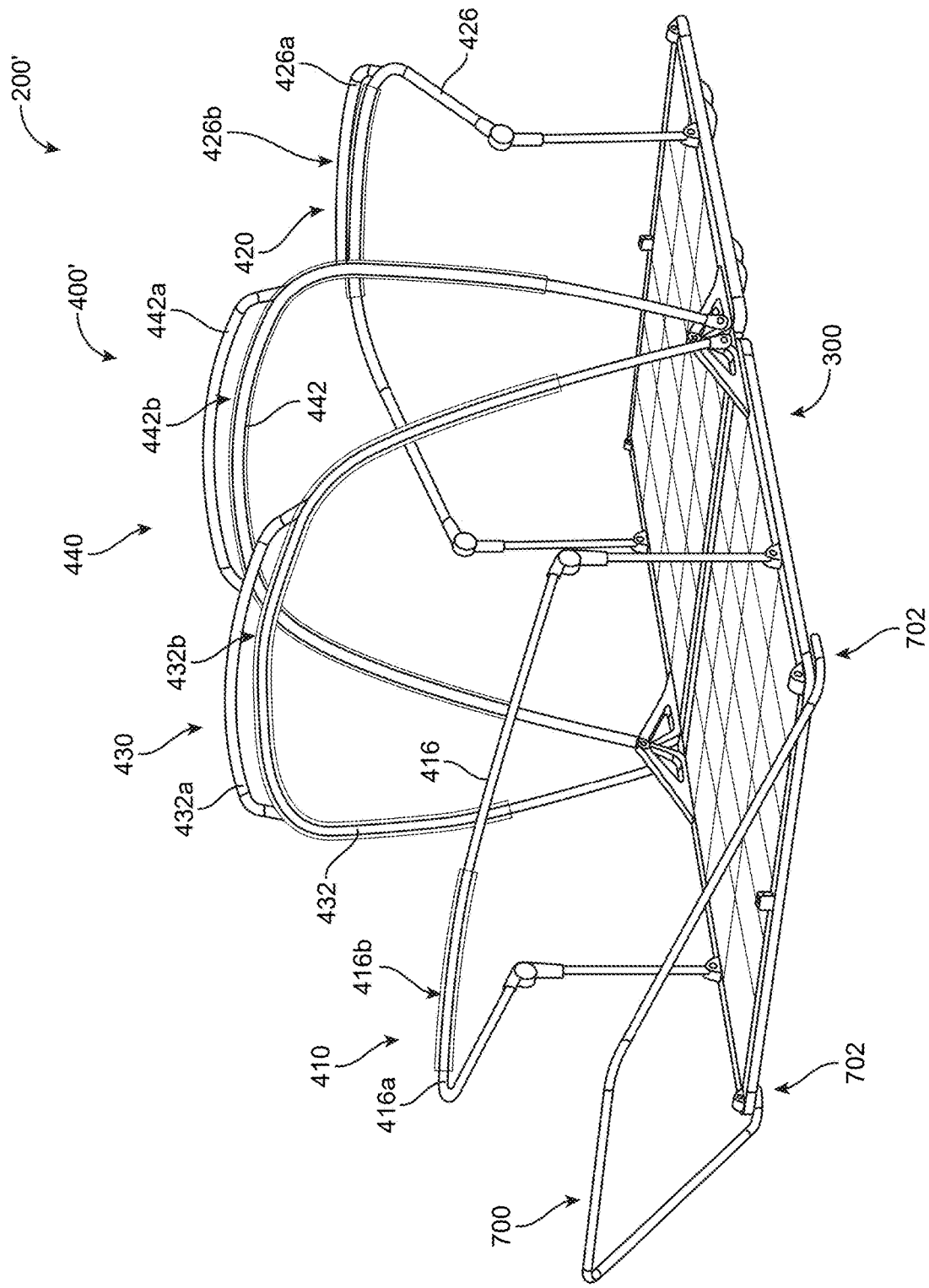
FIG. 38 illustrates a rear perspective view of the tent system shown in FIG. 37, according to an aspect.
Figure 39:
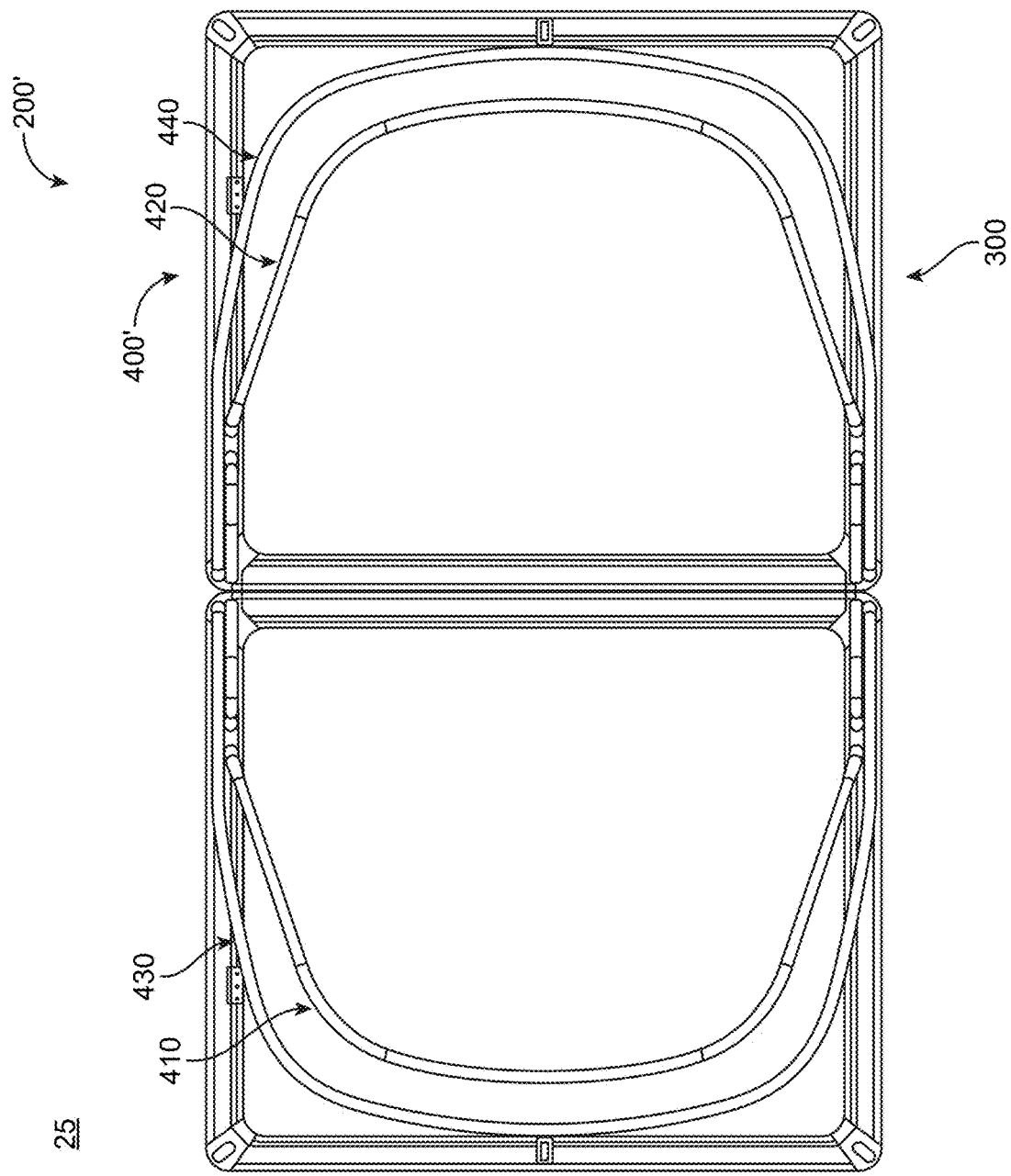
FIG. 39 illustrates a plan view of the tent system shown in FIG. 37 in a collapsed configuration, according to an aspect.
Figure 40:
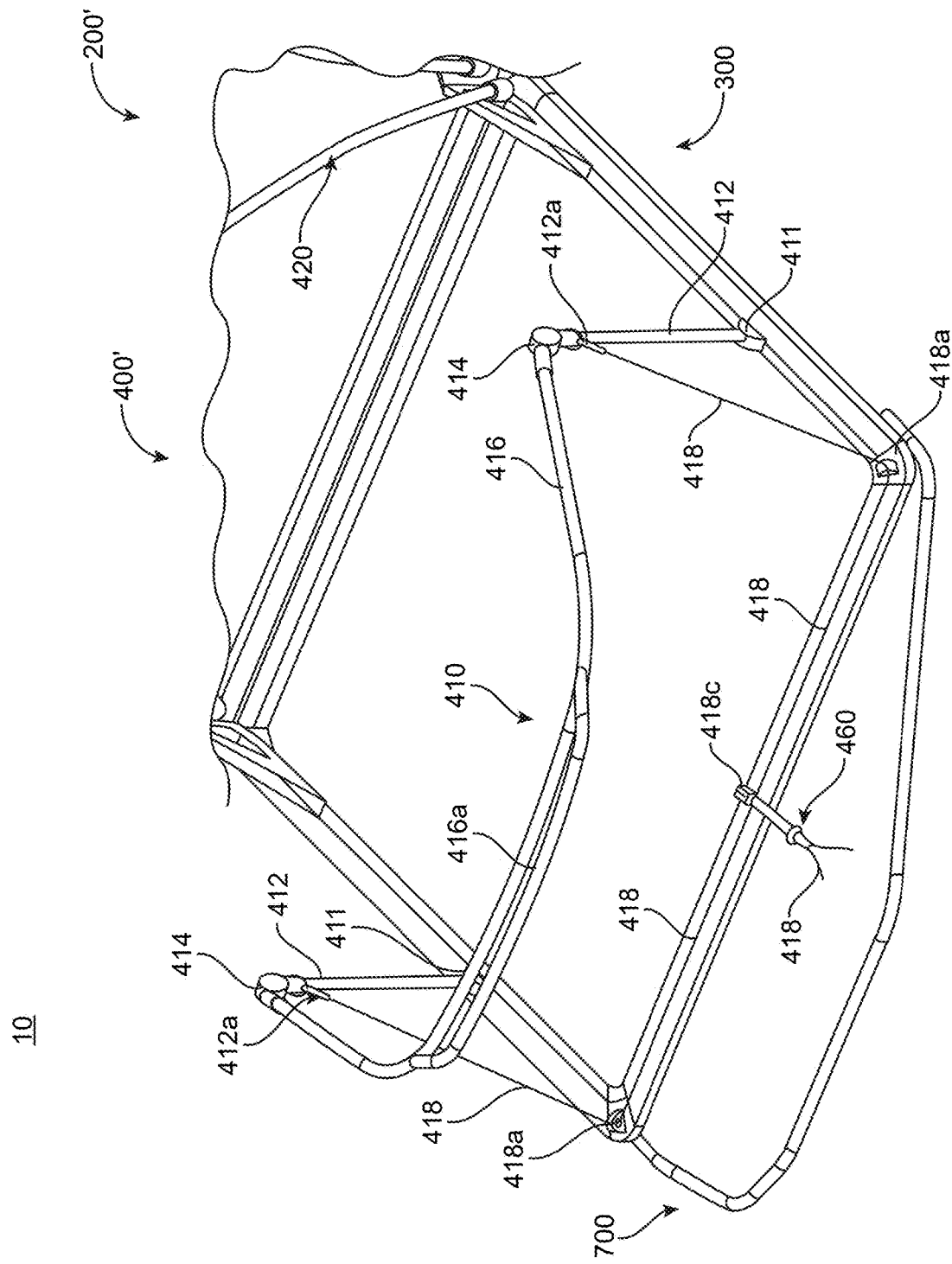
FIG. 40 illustrates a partial top rear perspective view of the tent system shown in FIG. 37, according to an aspect.
Figure 50:
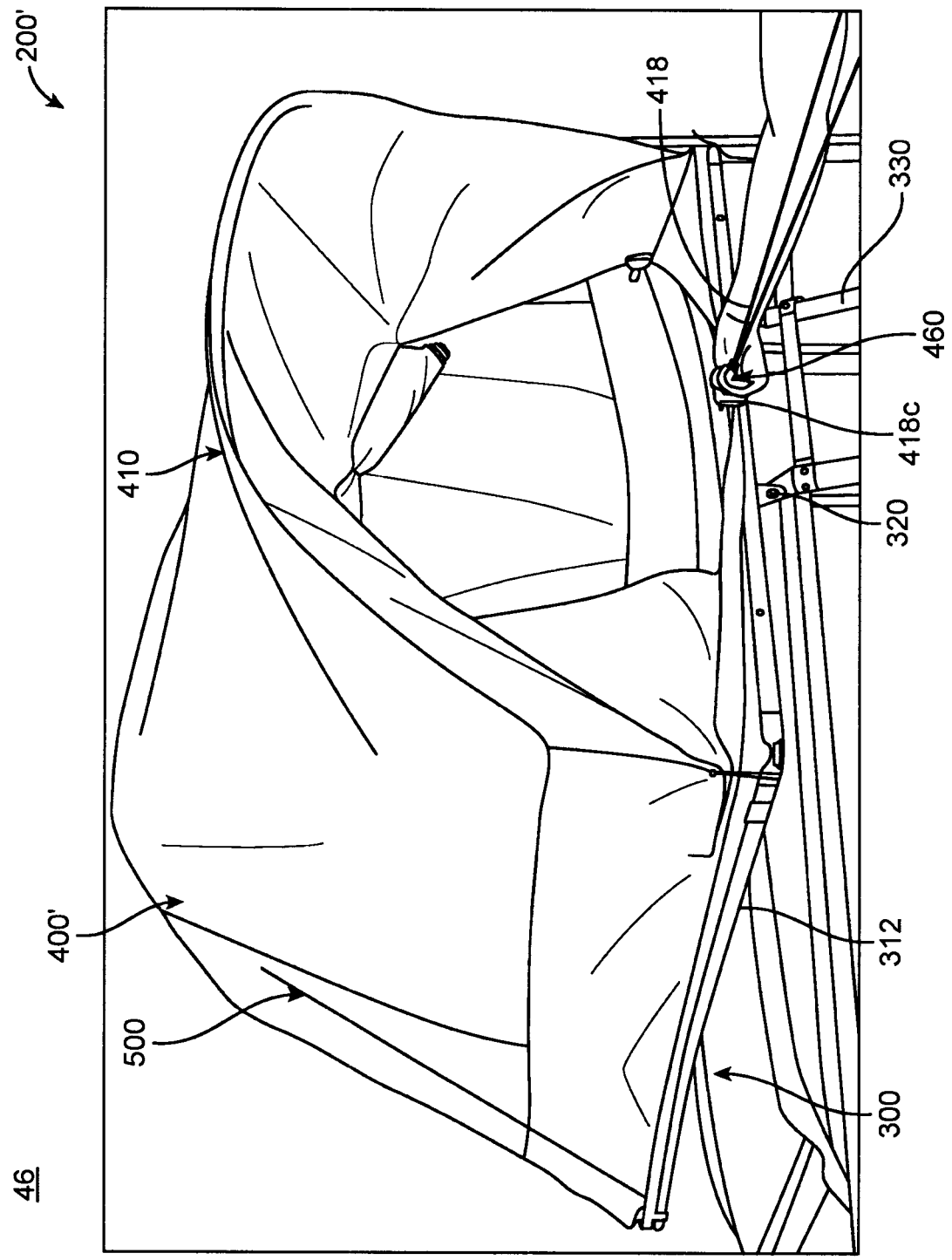
FIG. 50 illustrates a rear perspective view of the tent system shown in FIG. 37 in a knee locked configuration, according to an aspect.
Figure 51:
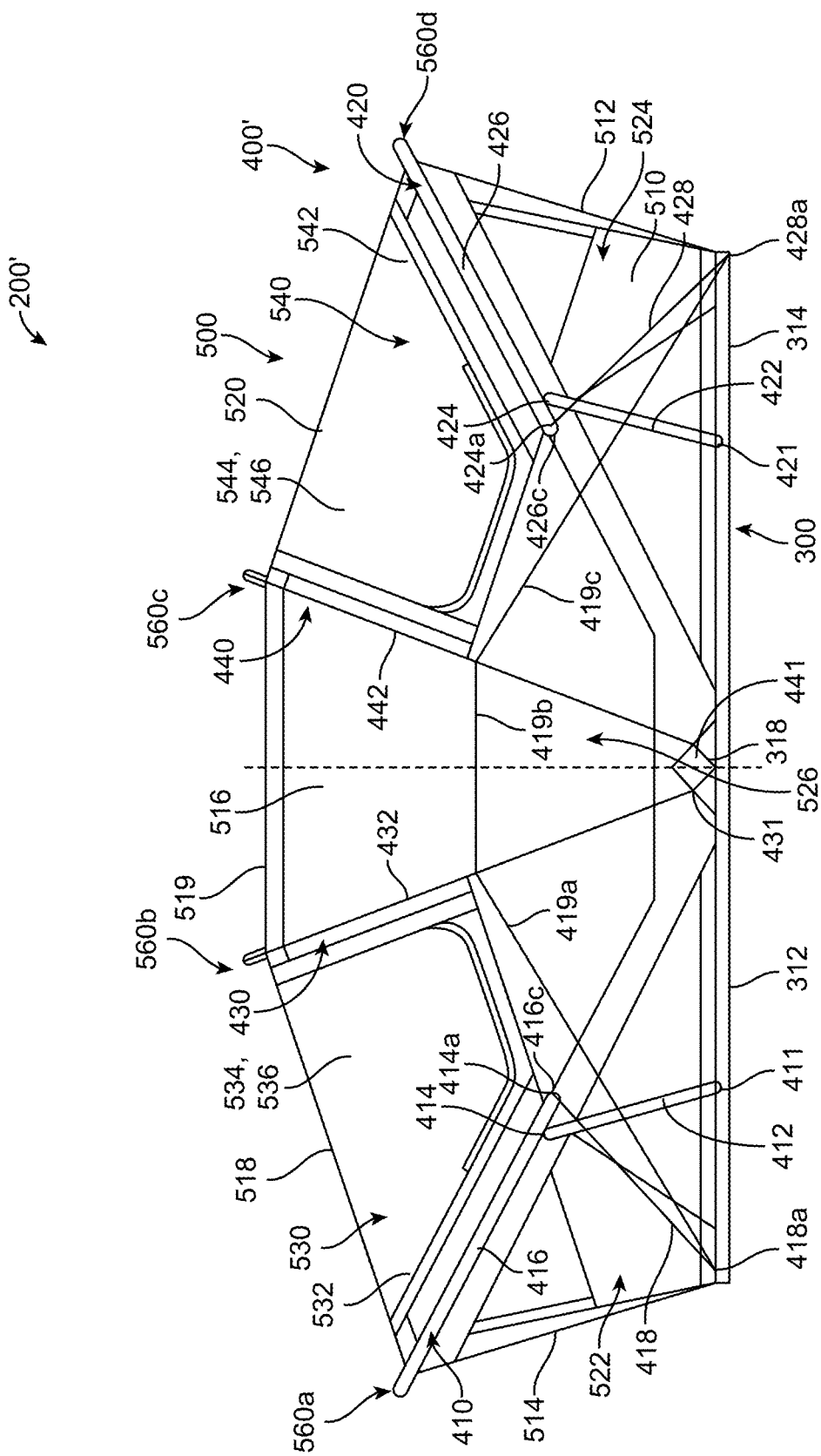
FIG. 51 illustrates a side view of the tent system shown in FIG. 37, according to an aspect.
Figure 52:
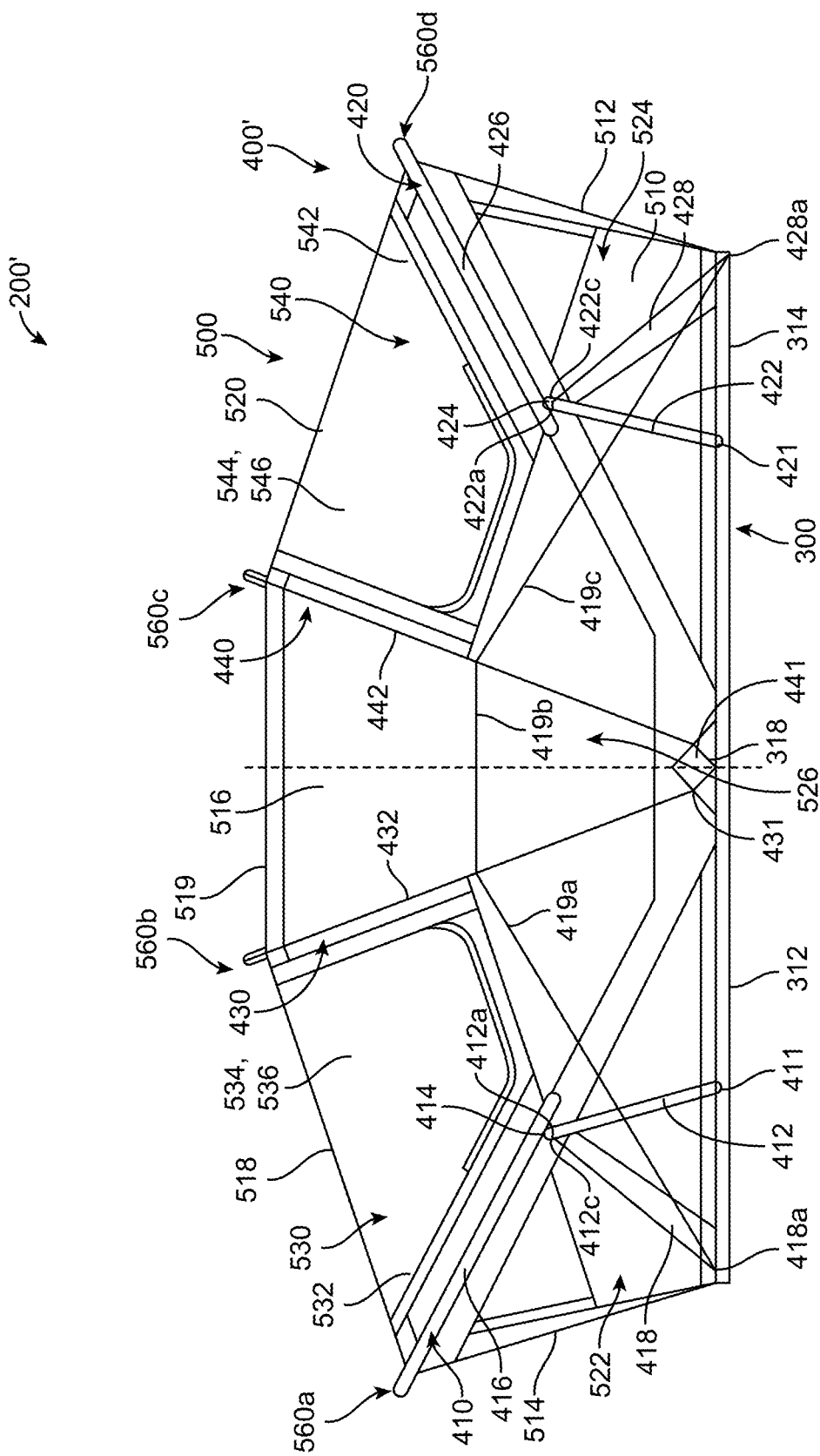
FIG. 52 illustrates a side view of the tent system shown in FIG. 37, according to an aspect.

FIGS. 37-52 illustrate manual tent system 200', according to aspects. FIG. 37 is a front perspective view of manual tent system 200' with base system 300 and manual frame system 400' in open configuration 10, according to an aspect. FIG. 38 is a rear perspective view of manual tent system 200' shown in FIG. 37, according to an aspect. FIG. 39 is a plan view of manual tent system 200' shown in FIG. 37 in collapsed configuration 25, according to an aspect. FIG. 40 is a partial top rear perspective view of manual tent system 200' shown in FIG. 37, according to an aspect. FIG. 51 is a side view of manual tent system 200' shown in FIG. 37, according to an aspect. FIG. 52 is a side view of manual tent system 200' shown in FIG. 37, according to an aspect.

Manual tent system 200' can be configured to expand and collapse a frame system (e.g., manual frame system 400' shown in FIG. 37) and a canopy (e.g., canopy system 500 shown in FIGS. 2A and 52) coupled to the frame system. Manual tent system 200' can be further configured to provide a manual folding mechanism (e.g., manual frame system 400' shown in FIG. 37) to easily and efficiently open and close the canopy. Manual tent system 200' can be further configured to increase an internal volume of the canopy, insulation, and a rigidity of the canopy. Manual tent system 200' can be further configured to decrease condensation and moisture. Manual tent system 200' can be further configured to decrease setup time of the canopy. Manual tent system 200' can be further configured to decrease weight and a height of base system 300. Although manual tent system 200' is shown in FIGS. 37-52 as a stand-alone apparatus and/or system, the aspects of this disclosure can be used with other apparatuses, systems, and/or methods, such as, but not limited to, tent system 200, automatic tent system 200", base system 300, frame system 400, manual frame system 400', self-folding frame system 400", canopy system 500, rain fly system 600, flow diagram 3600A, and/or flow diagram 3600B.

The aspects of tent system 200 with frame system 400 shown in FIGS. 2A-29, for example, and the aspects of manual tent system 200' with manual frame system 400' shown in FIGS. 37-52 may be similar. Similar reference numbers are used to indicate features of the aspects of tent system 200 shown in FIGS. 2A-29 and the similar features of the aspects of manual tent system 200' shown in FIGS. 37-52. Manual tent system 200' shown in FIGS. 37-52 includes manual frame system 400' with one or more linkage locks 460 to manually secure first linkage 418 and/or second linkage 428 in locked configuration 46.

As shown in FIGS. 37-52, manual tent system 200' can include base system 300, manual frame system 400', and/or canopy system 500. The aspects of frame system 400 shown in FIGS. 2A-29, for example, and the aspects of manual frame system 400' shown in FIGS. 37-52 may be similar. Similar reference numbers are used to indicate features of the aspects of frame system 400 shown in FIGS. 2A-29 and the similar features of the aspects of manual tent system 400' shown in FIGS. 37-52.

As shown in FIGS. 37-52, manual frame system 400' can include first frame member 410, second frame member 420, third frame member 430, fourth frame member 440, and/or linkage lock 460. Manual frame system 400' can be coupled to base system 300 and configured to expand and collapse canopy system 500. In some aspects, frame members 410, 420, 430, 440 can be configured to expand canopy system 500 (e.g., open configuration 10 shown in FIGS. 37 and 52) to form an internal volume for a user. In some aspects, frame members 410, 420, 430, 440 can be configured to collapse canopy system 500 (e.g., closed configuration 20 shown in FIG. 45). In some aspects, manual frame system 400' can include annex system 700. For example, as shown in FIG. 38, annex system 700 can be removably attached to annex connections 702 on base system 300. Annex system 700 can be configured to support an annex canopy coupled to canopy system 500, for example, the annex canopy can extend from canopy system 500 to the ground.

First frame member 410 can be configured to operate as a first knee connection of manual frame system 400'. As shown in FIGS. 37 and 52, first frame member 410 can include first support 412, first joint 414, first leg 416, and/or first linkage 418. First support 412 can be configured to pivot about first connection 411 to first base member 312. First support 412 can be coupled to first base member 312 of base system 300. First support 412 can be coupled to first leg 416 via first joint 414. First joint 414 can be configured to pivot first leg 416 about distal end 412c of first support 412, for example, similar to a human knee joint. First joint 414 can be disposed between first support 412 and first leg 416. First leg 416 can be configured to contact canopy system 500 (e.g., canopy sleeve 560a shown in FIG. 52) and to expand canopy system 500 into an expanded position (e.g., open configuration 10 shown in FIG. 52). First leg 416 can be configured to contact canopy system 500 (e.g., canopy sleeve 560a shown in FIG. 52) and to collapse canopy system 500 into a collapsed position (e.g., closed configuration 20 shown in FIG. 45). In some aspects, first support 412, first joint 414, and first leg 416 can include aluminum, titanium, fiberglass, a metal, a ceramic, a polymer, a plastic, a combination thereof, and/or any other rigid material. In some aspects, first support 412, first joint 414, and first leg 416 can include poles, tubes, rods, a combination thereof, and/or any other shape to support canopy system 500.

First linkage 418 can be configured to expand first frame member 410 from a closed position (e.g., closed configuration 20 shown in FIG. 45) to an expanded position (e.g., open configuration 10 shown in FIG. 52). First support 412, first joint 414, and/or first leg 416 can be coupled to first linkage 418. In some aspects, first linkage 418 can include a rope, tether, cord, string, chain, and/or any other linkage that allows a user to apply an expanding force (e.g., outward pivoting force) to first frame member 410. In some aspects, first linkage 418 can include an elastic material, for example, elastic cord, stretch cord, elastomer, polyester, rubber, silicone, and/or any other material providing a restoring force to first linkage 418.

In some aspects, first support 412 can include first support linkage connection 412a configured to connect first linkage 418 to first support 412. For example, as shown in FIGS. 37 and 52, first support linkage connection 412a can be disposed near distal end 412c of first support 412. First support linkage connection 412a can be configured to apply an outward expanding force (e.g., outward pivoting force) to first support 412 and/or first leg 416 toward canopy system 500. In some aspects, as shown in FIG. 40, first support linkage connection 412a can include a hoop, ring, latch, crimp, and/or any other coupling that secures (e.g., fixes) first linkage 418 to first support 412.

Figure 41:
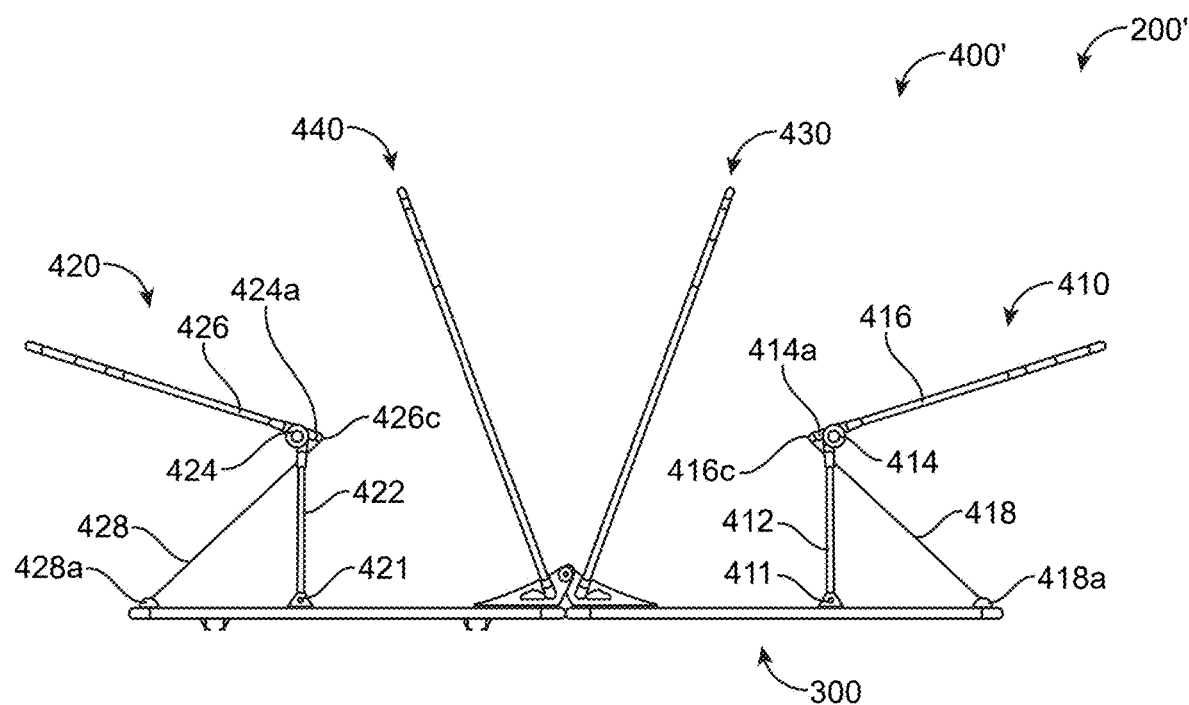
FIG. 41 illustrates a side view of the tent system shown in FIG. 37, according to an aspect.
Figure 42:
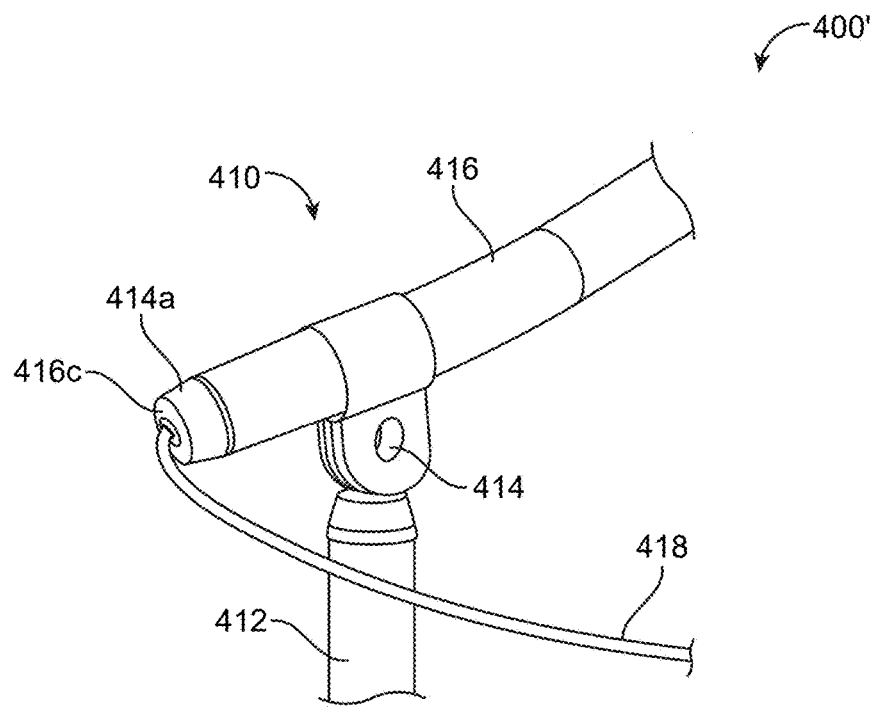
FIG. 42 illustrates a partial rear perspective view of the manual frame system shown in FIG. 41, according to an aspect.

In some aspects, first leg 416 can include first leg linkage connection 414a configured to connect first linkage 418 to first leg 416. For example, as shown in FIGS. 41, 42, and 51, first leg linkage connection 414a can be disposed near distal end 416c of first leg 416. First leg linkage connection 414a can be configured to apply an outward expanding force (e.g., outward pivoting force) to first support 412 and/or first leg 416 toward canopy system 500. In some aspects, as shown in FIG. 42, first leg linkage connection 414a can include a tab, cover, insert, threaded insert, hoop, ring, latch, crimp, and/or any other coupling that secures (e.g., fixes) first linkage 418 to first leg 416.

In some aspects, first leg 416 can include first leg addition 416a configured to provide additional contact and/or support to canopy system 500 (e.g., canopy sleeve 560a shown in FIG. 52). For example, as shown in FIGS. 38 and 40, first leg addition 416a can extend above first leg 416 for a portion of first leg 416 (e.g., over a central portion of first leg 416). In some aspects, first leg 416 can include first leg sleeve portion 416b configured to provide contact to canopy system 500 (e.g., frame fastener 570). For example, as shown in FIG. 38, first leg sleeve portion 416b can extend along a portion of first leg 416 (e.g., over a central portion of first leg 416).

In some aspects, manual frame system 400' can include first linkage connection 418a configured to connect first linkage 418 to linkage lock 460. For example, as shown in FIGS. 37 and 40, first linkage connection 418a can direct first linkage 418 from first frame member 410 to linkage lock 460. In some aspects, as shown in FIGS. 37 and 40, first linkage connection 418a can be coupled to one or more corners of base system 300. In some aspects, as shown in FIG. 37, two first linkage connections 418a can be disposed in opposite corners of first base member 312 to receive and direct corresponding first linkages 418, respectively. In some aspects, first linkage connection 418a can include a pulley, roller, bearing, rig, jig, gear, capstan, tackle, block and tackle, and/or any other coupling that directs first linkage 418 towards linkage lock 460 and maintains tension in first linkage 418. In some aspects, first linkage connection 418a can be further configured to couple first linkage 418 to arm linkage 419 (e.g., first arm linkage 419a), for example, by a pulley. In some aspects, first linkage 418 and arm linkage 419 can be connected, for example, first linkage 418 and arm linkage 419 can be a single linkage.

In some aspects, manual frame system 400' can include first linkage fastener 418b configured to adjust a tension (force) of first linkage 418. For example, as shown in FIG. 37, first linkage fastener 418b can adjust a tension (e.g., tighten or loosen) and/or a length (e.g., lengthen or shorten) of first linkage 418 between first frame member 410 and base system 300 (e.g., first linkage connection 418a). In some aspects, first linkage fastener 418b can include a tensioner, ratchet, turnbuckle, and/or any other device that can adjust the tension or length of first linkage 418.

In some aspects, manual frame system 400' can include first linkage guide 418c configured to guide first linkage 418 from first linkage connection 418a to linkage lock 460. For example, as shown in FIGS. 37 and 40, first linkage guide 418c can be disposed at a midpoint between first linkage connections 418a and guide corresponding first linkages 418 outward (e.g., perpendicular) from base system 300. In some aspects, first linkage guide 418c can be coupled to base system 300, for example, an edge perimeter of first base member 312. In some aspects, first linkage guide 418c can include a block, groove, guide, aperture, pulley, bearing, and/or any other device that can guide first linkage 418 in a particular direction.

Second frame member 420 can be configured to operate as a second knee connection of manual frame system 400'. As shown in FIGS. 37 and 52, second frame member 420 can include second support 422, second joint 424, second leg 426, and/or second linkage 428. Second support 422 can be configured to pivot about second connection 421 to second base member 314. Second support 422 can be coupled to second base member 314 of base system 300. Second support 422 can be coupled to second leg 426 via second joint 424. Second joint 424 can be configured to pivot second leg 426 about distal end 422c of second support 422, for example, similar to a human knee joint. Second joint 424 can be disposed between second support 422 and second leg 426. Second leg 426 can be configured to contact canopy system 500 (e.g., canopy sleeve 560d shown in FIG. 52) and to expand canopy system 500 into an expanded position (e.g., open configuration 10 shown in FIG. 52). Second leg 426 can be configured to contact canopy system 500 (e.g., canopy sleeve 560d shown in FIG. 52) and to collapse canopy system 500 into a collapsed position (e.g., closed configuration 20 shown in FIG. 45). In some aspects, second support 422, second joint 424, and second leg 426 can include aluminum, titanium, fiberglass, a metal, a ceramic, a polymer, a plastic, a combination thereof, and/or any other rigid material. In some aspects, second support 422, second joint 424, and second leg 426 can include poles, tubes, rods, a combination thereof, and/or any other shape to support canopy system 500.

Second linkage 428 can be configured to expand second frame member 420 from a closed position (e.g., closed configuration 20 shown in FIG. 45) to an expanded position (e.g., open configuration 10 shown in FIG. 52). Second support 422, second joint 424, and/or second leg 426 can be coupled to second linkage 428. In some aspects, second linkage 428 can include a rope, tether, cord, string, chain, and/or any other linkage that allows a user to apply an expanding force (e.g., outward pivoting force) to second frame member 420.

In some aspects, second support 422 can include second support linkage connection 422a configured to connect second linkage 428 to second support 422. For example, as shown in FIGS. 37 and 52, second support linkage connection 422a can be disposed near distal end 422c of second support 422. Second support linkage connection 422a can be configured to apply an outward expanding force (e.g., outward pivoting force) to second support 422 and/or second leg 426 toward canopy system 500. In some aspects, second support linkage connection 422a can include a hoop, ring, latch, crimp, and/or any other coupling that secures (e.g., fixes) second linkage 428 to second support 422.

In some aspects, second leg 426 can include second leg linkage connection 424a configured to connect second linkage 418 to second leg 426. For example, as shown in FIGS. 41 and 51, second leg linkage connection 424a can be disposed near distal end 426c of second leg 426. Second leg linkage connection 424a can be configured to apply an outward expanding force (e.g., outward pivoting force) to second support 422 and/or second leg 426 toward canopy system 500. In some aspects, second leg linkage connection 424a can include a tab, cover, insert, threaded insert, hoop, ring, latch, crimp, and/or any other coupling that secures (e.g., fixes) second linkage 428 to second leg 426.

In some aspects, second leg 426 can include second leg addition 426a configured to provide additional contact and/or support to canopy system 500 (e.g., canopy sleeve 560d shown in FIG. 52). For example, as shown in FIG. 38, second leg addition 426a can extend above second leg 426 for a portion of second leg 426 (e.g., over a central portion of second leg 426). In some aspects, second leg 426 can include second leg sleeve portion 426b configured to provide contact to canopy system 500 (e.g., frame fastener 570). For example, as shown in FIG. 38, second leg sleeve portion 426b can extend along a portion of second leg 426 (e.g., over a central portion of second leg 426).

In some aspects, manual frame system 400' can include second linkage connection 428a configured to connect second linkage 428 to linkage lock 460. For example, as shown in FIG. 37, second linkage connection 428a can direct second linkage 428 from second frame member 420 to linkage lock 460. In some aspects, as shown in FIG. 37, second linkage connection 428a can be coupled to one or more corners of base system 300. In some aspects, as shown in FIG. 37, two second linkage connections 428a can be disposed in opposite corners of second base member 314 to receive and direct corresponding second linkages 428, respectively. In some aspects, second linkage connection 428a can include a pulley, roller, bearing, rig, jig, gear, capstan, tackle, block and tackle, and/or any other coupling that directs second linkage 428 towards linkage lock 460 and maintains tension in second linkage 428. In some aspects, second linkage connection 428a can be further configured to couple second linkage 428 to arm linkage 419 (e.g., third arm linkage 419c), for example, by a pulley. In some aspects, second linkage 428 and arm linkage 419 can be connected, for example, second linkage 428 and arm linkage 419 can be a single linkage.

In some aspects, manual frame system 400' can include second linkage fastener 428b configured to adjust a tension (force) of second linkage 428. For example, as shown in FIG. 37, second linkage fastener 428b can adjust a tension (e.g., tighten or loosen) and/or a length (e.g., lengthen or shorten) of second linkage 428 between second frame member 420 and base system 300 (e.g., second linkage connection 428a). In some aspects, second linkage fastener 428b can include a tensioner, ratchet, turnbuckle, and/or any other device that can adjust the tension or length of second linkage 428.

In some aspects, manual frame system 400' can include second linkage guide 428c configured to guide second linkage 428 from second linkage connection 428a to linkage lock 460. For example, as shown in FIG. 37, second linkage guide 428c can be disposed at a midpoint between second linkage connections 428a and guide corresponding second linkages 428 outward (e.g., perpendicular) from base system 300. In some aspects, second linkage guide 428c can be coupled to base system 300, for example, an edge perimeter of second base member 314. In some aspects, second linkage guide 428c can include a block, groove, guide, aperture, pulley, bearing, and/or any other device that can guide second linkage 428 in a particular direction.

In some aspects, first frame member 410 and second frame member 420 of manual frame system 400' can be similar. The aspects of first frame member 410 shown in FIGS. 37-52, for example, and the aspects of second frame member 420 shown in FIGS. 37-52 may be similar. Similar reference numbers are used to indicate features of the aspects of first frame member 410 shown in FIGS. 37-52 and the similar features of the aspects of second frame member 420 shown in FIGS. 37-52.

Third frame member 430 can be configured to operate as a first hoop connection of manual frame system 400'. As shown in FIGS. 37 and 52, third frame member 430 can include third arm 432. Third arm 432 can be configured to pivot about third connection 431 to hinge 318. Third arm 432 can be coupled to hinge 318 of base system 300. In some aspects, third arm 432 can be fixed (e.g., bolted) to hinge 318 and pivot along with hinge 318. Third arm 432 can be further configured to contact canopy system 500 (e.g., canopy sleeve 560b shown in FIG. 52) and to expand canopy system 500 into an expanded position (e.g., open configuration 10 shown in FIG. 52). In some aspects, third arm 432 can include aluminum, titanium, fiberglass, a metal, a ceramic, a polymer, a plastic, a combination thereof, and/or any other rigid material. In some aspects, third arm 432 can include a pole, tube, rod, hoop, a combination thereof, and/or any other shape to support canopy system 500.

In some aspects, first linkage 418 can be configured to expand third frame member 430 from a closed position (e.g., closed configuration 20 shown in FIG. 45) to an expanded position (e.g., open configuration 10 shown in FIG. 52). For example, third arm 432 can be coupled to first linkage 418. In some aspects, third frame member 430 can be coupled to an arm linkage configured to expand third frame member 430 from a closed position (e.g., closed configuration 20 shown in FIG. 45) to an expanded position (e.g., open configuration 10 shown in FIG. 52). For example, third arm 432 can be coupled to arm linkage 419. In some aspects, a user can apply a force to arm linkage 419 (e.g., first arm linkage 419a) to expand third frame member 430 from closed configuration 20 to open configuration 10. In some aspects, as shown in FIGS. 37 and 52, arm linkage 419 can include first arm linkage 419a, second arm linkage 419b, and third arm linkage 419c.

In some aspects, third arm 432 can include third arm addition 432a configured to provide additional contact and/or support to canopy system 500 (e.g., canopy sleeve 560b shown in FIG. 52). For example, as shown in FIG. 38, third arm addition 432a can extend above third arm 432 for a portion of third arm 432 (e.g., over a central portion of third arm 432). In some aspects, third arm 432 can include third arm sleeve portion 432b configured to provide contact to canopy system 500 (e.g., frame fastener 570). For example, as shown in FIG. 38, third arm sleeve portion 432b can extend along a portion of third arm 432 (e.g., over a central portion of third arm 432).

Fourth frame member 440 can be configured to operate as a second hoop connection of manual frame system 400'. As shown in FIGS. 37 and 52, fourth frame member 440 can include fourth arm 442. Fourth arm 442 can be configured to pivot about fourth connection 441 to hinge 318. Fourth arm 442 can be coupled to hinge 318 of base system 300. In some aspects, fourth arm 442 can be fixed (e.g., bolted) to hinge 318 and pivot along with hinge 318. Fourth arm 442 can be further configured to contact canopy system 500 (e.g., canopy sleeve 560c shown in FIG. 52) and to expand canopy system 500 into an expanded position (e.g., open configuration 10 shown in FIG. 52). In some aspects, fourth arm 442 can include aluminum, titanium, fiberglass, a metal, a ceramic, a polymer, a plastic, a combination thereof, and/or any other rigid material. In some aspects, fourth arm 442 can include a pole, tube, rod, hoop, a combination thereof, and/or any other shape to support canopy system 500.

In some aspects, second linkage 428 can be configured to expand fourth frame member 420 from a closed position (e.g., closed configuration 20 shown in FIG. 45) to an expanded position (e.g., open configuration 10 shown in FIG. 52). For example, fourth arm 442 can be coupled to second linkage 428. In some aspects, fourth frame member 440 can be coupled to an arm linkage configured to expand fourth frame member 440 from a closed position (e.g., closed configuration 20 shown in FIG. 45) to an expanded position (e.g., open configuration 10 shown in FIG. 52). For example, fourth arm 442 can be coupled to arm linkage 419. In some aspects, a user can apply a force to arm linkage 419 (e.g., third arm linkage 419c) to expand fourth frame member 440 from closed configuration 20 to open configuration 10. In some aspects, as shown in FIGS. 37 and 52, arm linkage 419 can include first arm linkage 419a, second arm linkage 419b, and third arm linkage 419c.

In some aspects, fourth arm 442 can include fourth arm addition 442a configured to provide additional contact and/or support to canopy system 500 (e.g., canopy sleeve 560c shown in FIG. 52). For example, as shown in FIG. 38, fourth arm addition 442a can extend above fourth arm 442 for a portion of fourth arm 442 (e.g., over a central portion of fourth arm 442). In some aspects, fourth arm 442 can include fourth arm sleeve portion 442b configured to provide contact to canopy system 500 (e.g., frame fastener 570). For example, as shown in FIG. 38, fourth arm sleeve portion 442b can extend along a portion of fourth arm 442 (e.g., over a central portion of fourth arm 442).

Linkage lock 460 can be configured to secure (lock) a tension of first linkage 418 and/or second linkage 428. In some aspects, manual frame system 400' can include one or more linkage locks 460. For example, as shown in FIGS. 37 and 40, linkage lock 460 can secure (lock) a tension of first linkage 418 and a separate linkage lock 460 can secure (lock) a tension of second linkage 428.

Figure 43:
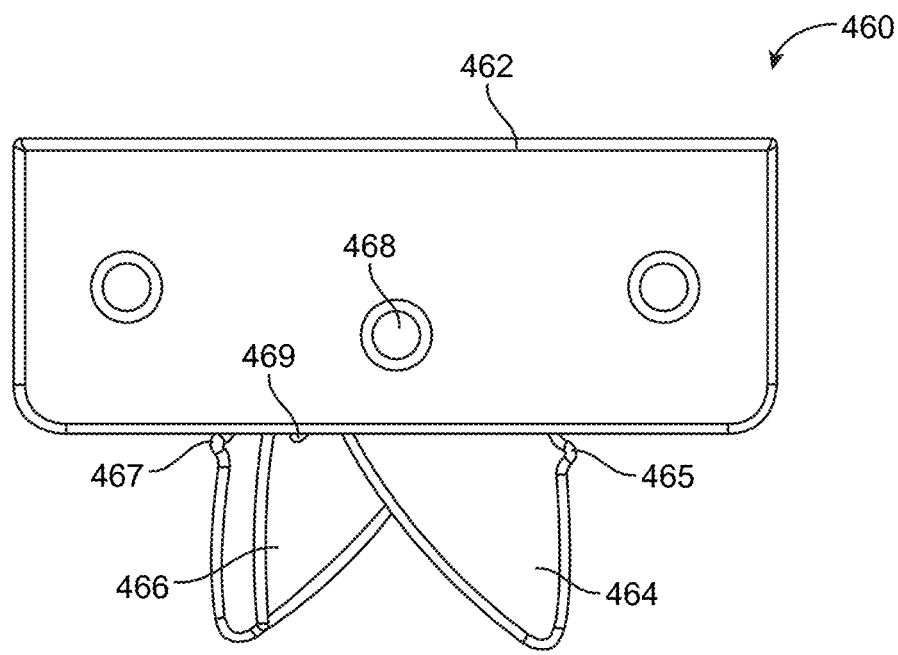
FIG. 43 illustrates a plan view of a linkage lock of the tent system shown in FIG. 37, according to an aspect.
Figure 44:
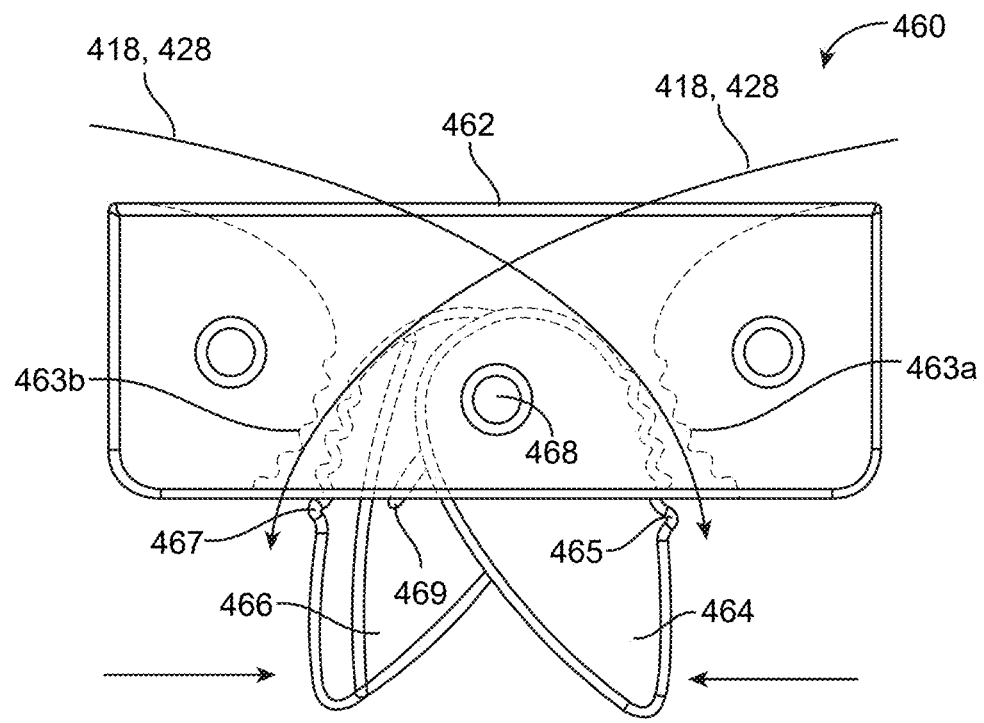
FIG. 44 illustrates a transparent plan view of the linkage lock shown in FIG. 43, according to an aspect.

As shown in FIGS. 43 and 44, linkage lock 460 can include lock base 462, first lock portion 464, and/or second lock portion 466. Lock base 462 can be configured to fasten (lock) first linkage(s) 418 and/or second linkage(s) 428. Lock base 462 can include first lock base teeth 463a, second lock base teeth 463b, connection pin 468, and/or connection spring 469. First lock base teeth 463a can be configured to cooperate with first lock portion teeth 465 of first lock portion 464 to secure first linkage(s) 418 and/or second linkage(s) 428. Second lock base teeth 463b can be configured to cooperate with second lock portion teeth 467 of second lock portion 466 to secure first linkage(s) 418 and/or second linkage(s) 428.

As shown in FIG. 44, first lock portion 464 and second lock portion 466 can be coupled to lock base, for example, by connection pin 468. First lock portion 464 can include first lock base teeth 463a and second lock portion 466 can include second lock base teeth 463b. First lock portion 464 and second lock portion 466 can be configured to pivot or rotate about connection pin 468. For example, connection pin 468 can be coupled to connection spring 469 configured to bias first lock portion 464 and second lock portion 466 outward towards corresponding first and second lock base teeth 463a, 463b, respectively. In some aspects, connection spring 469 can be part of connection pin 468, for example, a torsion spring pin coupled to lock base 462 and first lock portion 464 and/or second lock portion 466.

In some aspects, one or more connection springs 469 can be coupled to first and second lock portions 464, 466 to bias first and second lock portions 464, 466 towards first and second lock portion teeth 465, 467, respectively. In some aspects, a user can rotate first and second lock portions 464, 466 inward (e.g., rotating first lock portion 464 clockwise and rotating second lock portion 466 counterclockwise) to release (unlock) linkage lock 460. For example, as shown in FIG. 44, external forces can be applied towards a center of lock base 462 (e.g., connection pin 468) to unlock linkage lock 460 and adjust a tension of first linkage(s) 418 and/or second linkage(s) 428.

In some aspects, manual frame system 400' can be expanded in an open configuration.

For example, as shown in FIGS. 37 and 52, manual frame system 400' can be in open configuration 10. In some aspects, in open configuration 10, third and fourth frame members 430, 440 can be disposed between first and second frame member 410, 420.

In some aspects, manual frame system 400' can be stored in a collapsed frame configuration. For example, as shown in FIG. 39, manual frame system 400' can be in collapsed frame configuration 25. In some aspects, in collapsed frame configuration 25, first and second frame members 410, 420 can be disposed between third and fourth frame members 430, 440.

Figure 45:
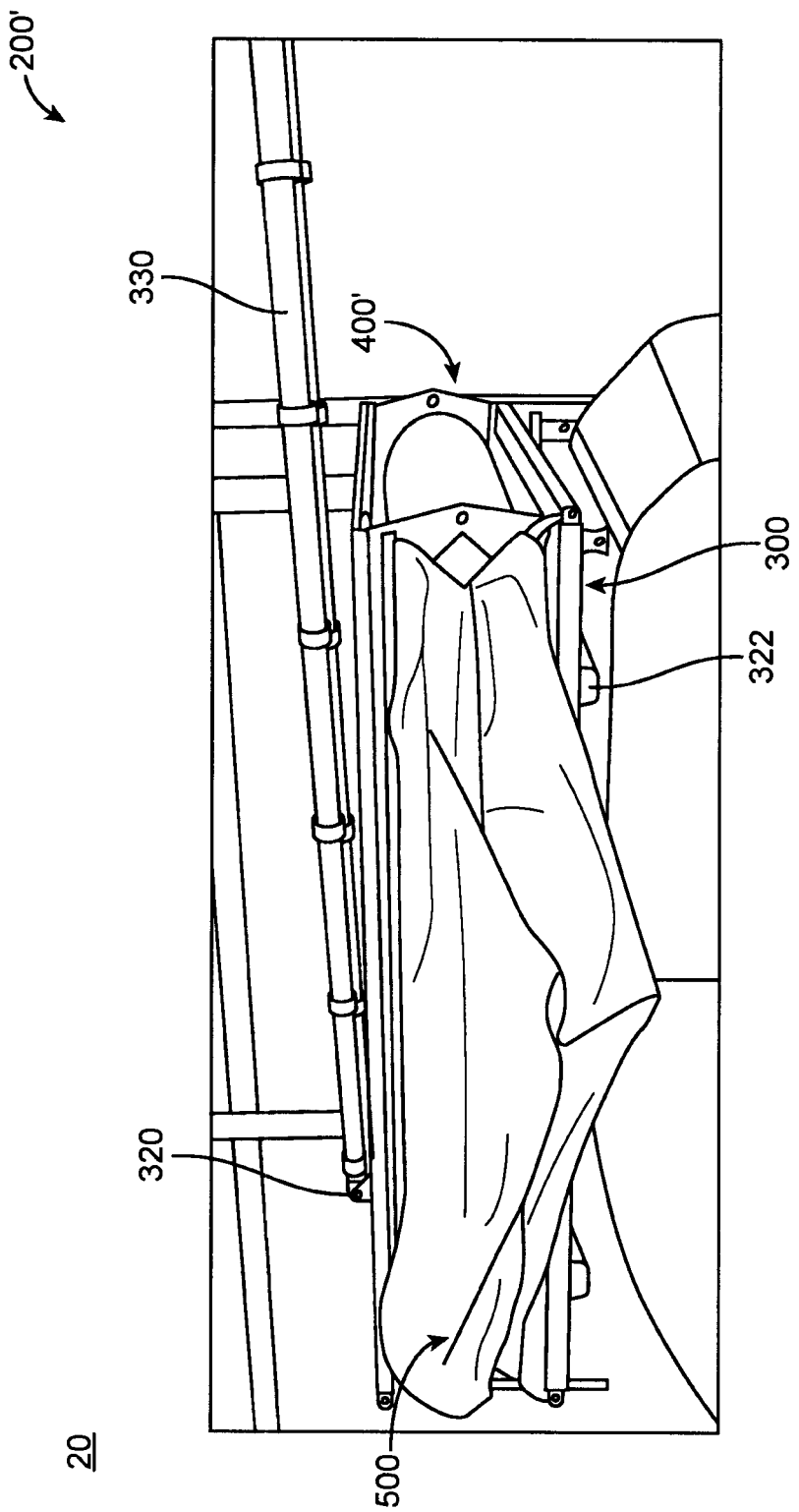
FIG. 45 illustrates a side perspective view of the tent system shown in FIG. 37 in a closed configuration, according to an aspect.
Figure 46:
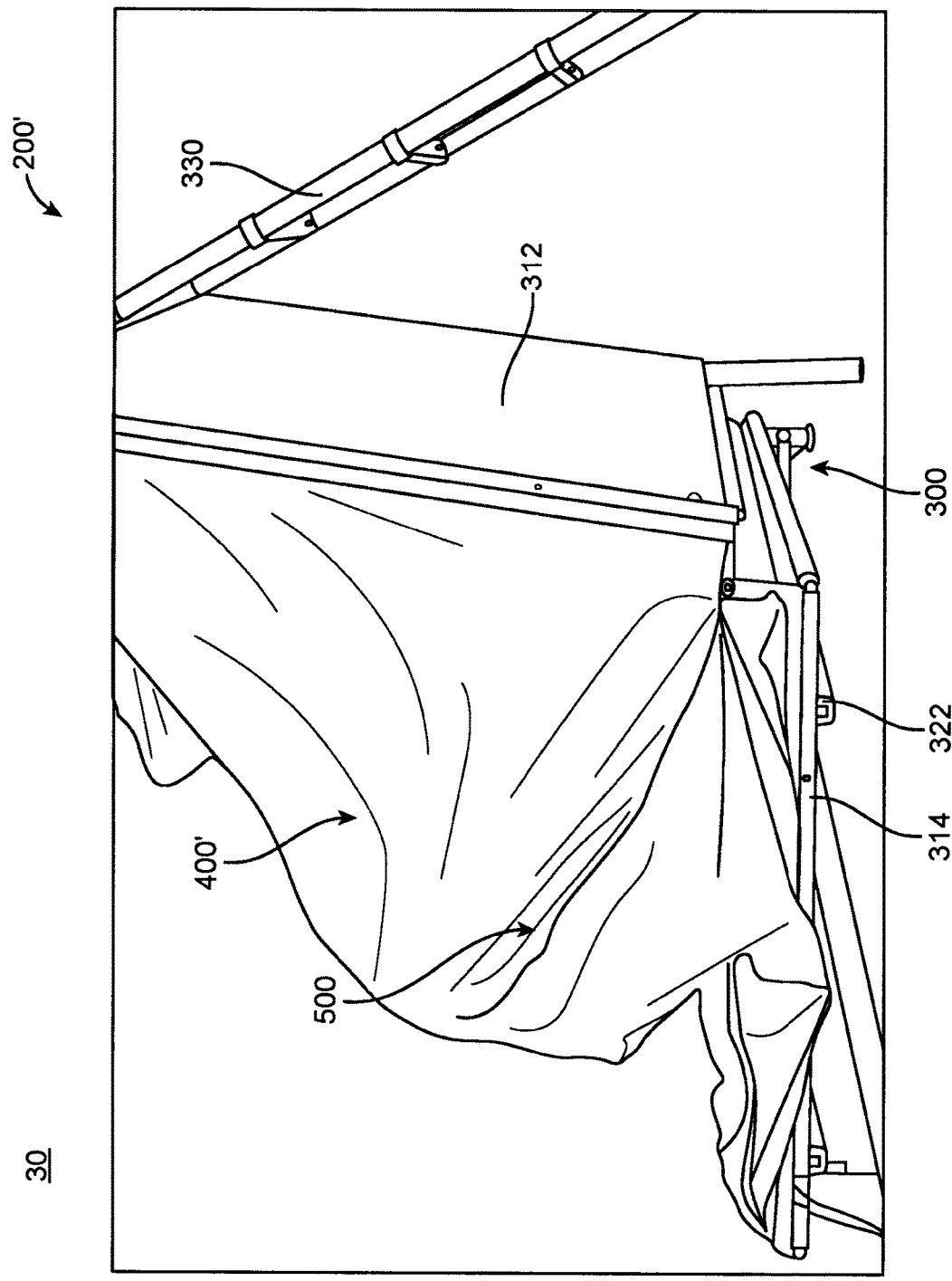
FIG. 46 illustrates a side perspective view of the tent system shown in FIG. 37 in a semi-open configuration, according to an aspect.
Figure 47:
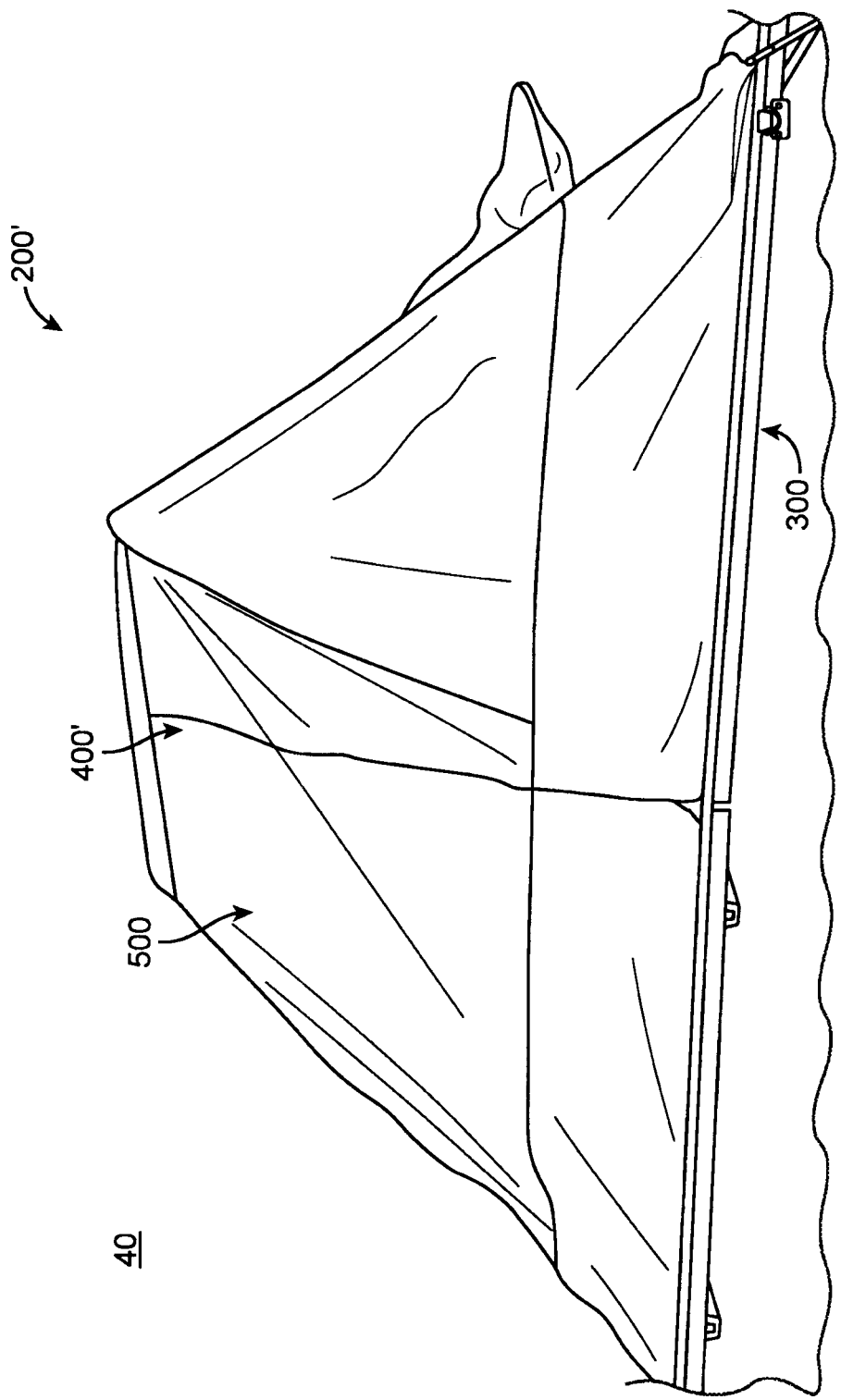
FIG. 47 illustrates a side perspective view of the tent system shown in FIG. 37 in an unfolded configuration, according to an aspect.

In use, as shown in FIGS. 45-50 and 52, manual tent system 200' can be unfolded from closed configuration 20 and expanded to open configuration 10. As shown in FIG. 45, manual tent system 200' can be stored in closed configuration 20. As shown in FIG. 46, manual tent system 200' can then be opened to semi-open configuration 30, for example, by moving (e.g., pivoting) first base member 312 relative to second base member 314 (e.g., by applying a pulling force to ladder 330 coupled to first base member 312). As shown in FIG. 47, manual tent system 200' can then be unfolded to unfolded configuration 40 thereby expanding canopy system 500 coupled to manual frame system 400' (e.g., expanding canopy system 500 coupled to third and fourth frame members 430, 440).

Figure 48:
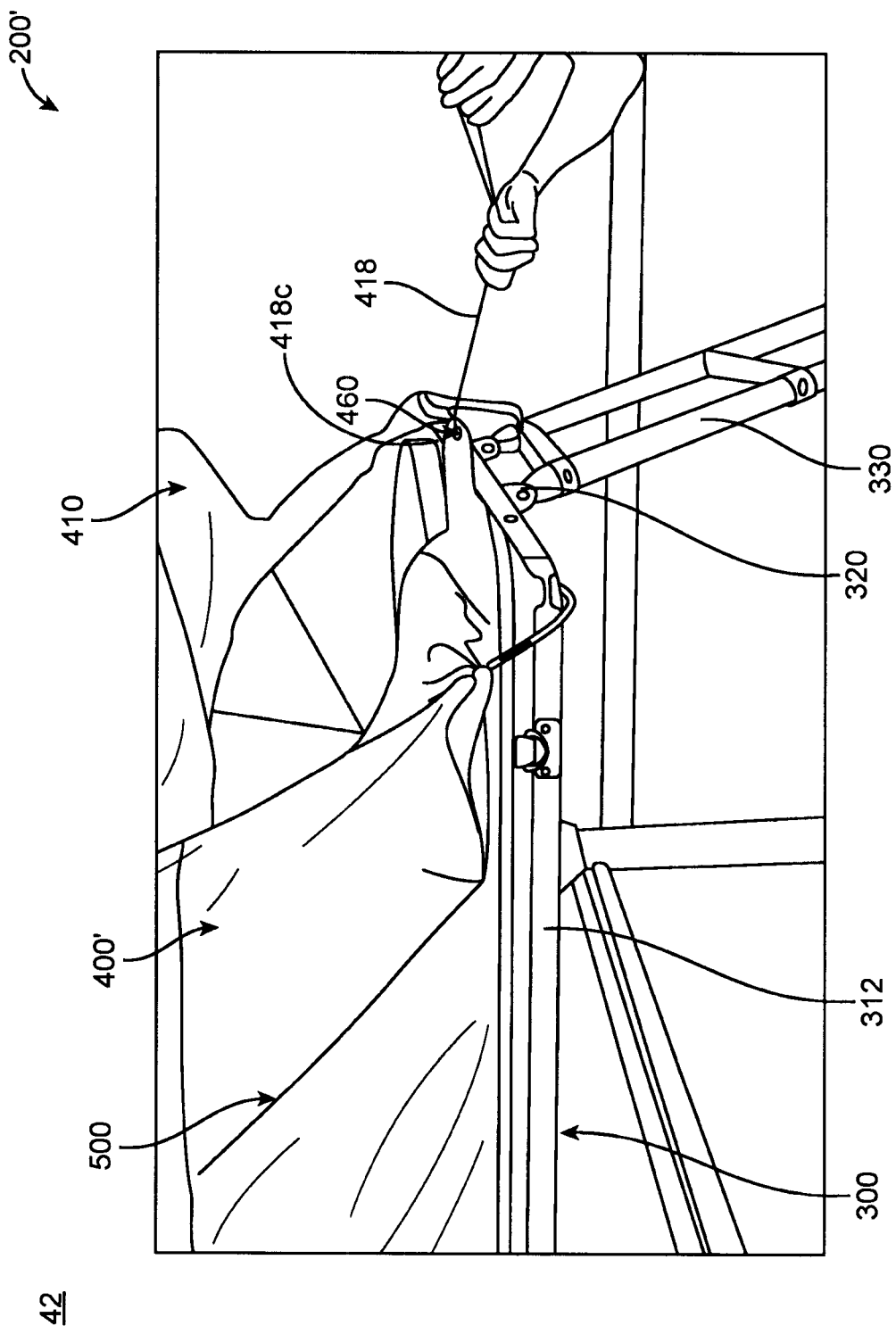
FIG. 48 illustrates a side perspective view of the tent system shown in FIG. 37 in a knee collapsed configuration, according to an aspect.
Figure 49:
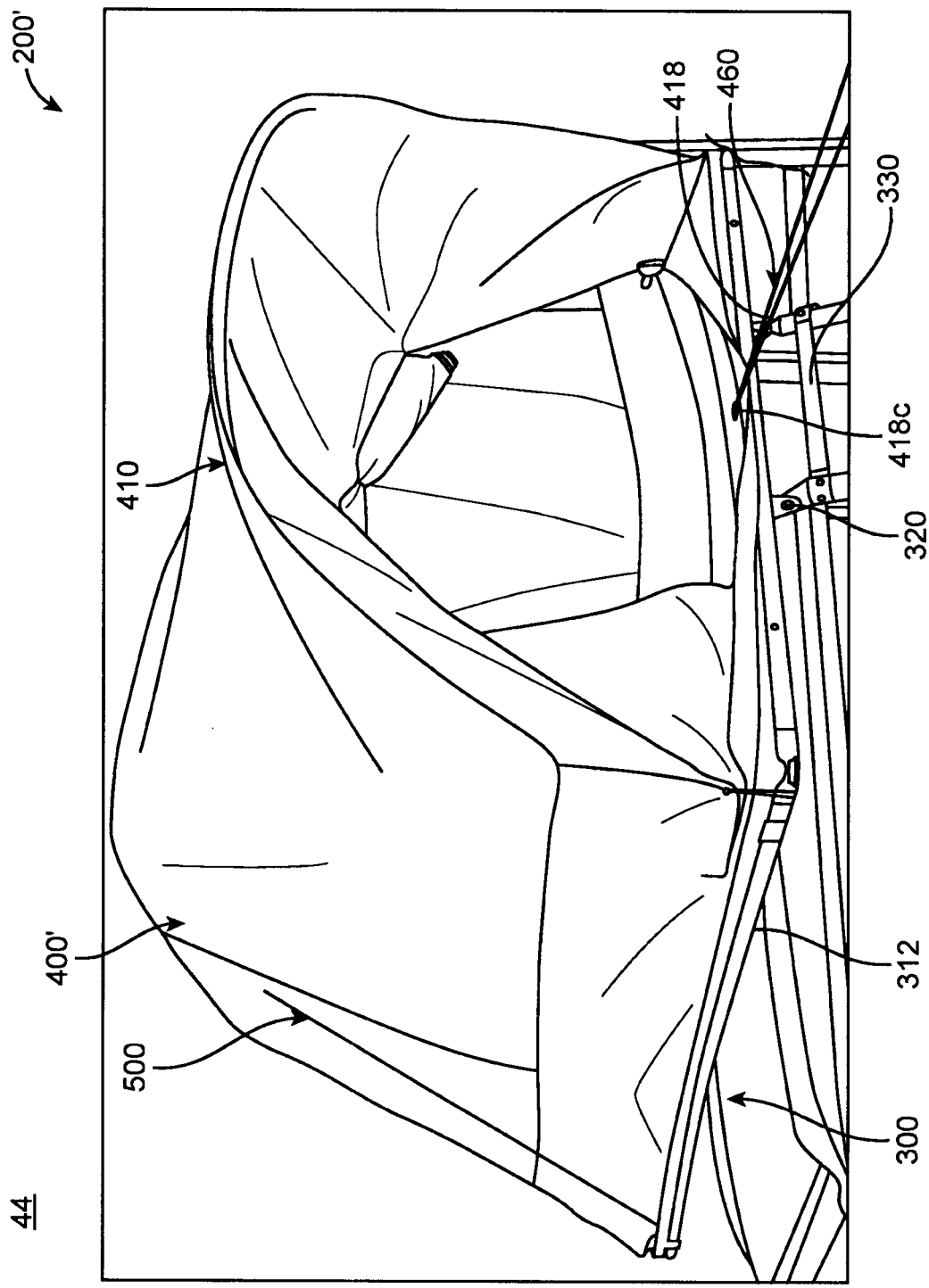
FIG. 49 illustrates a rear perspective view of the tent system shown in FIG. 37 in a knee expanded configuration, according to an aspect.

As shown in FIG. 48, first frame member 410 of manual frame system 400' can then be in knee collapsed configuration 42. As shown in FIG. 49, first frame member 410 of manual frame system 400' can then be expanded to knee expanded configuration 44, for example, by increasing a tension of first linkage 418 (e.g., a user can pull first linkage 418 to increase the tension and thereby expand first frame member 410 outward towards canopy system 500). As shown in FIG. 50, first frame member 410 of manual frame system 400' can then be secured (locked) in knee locked configuration 46, for example, by unlocking linkage lock 460 coupled to first linkage 418, adjusting (sliding) linkage lock 460 along first linkage 418 towards base system 300, and locking linkage lock 460 to secure the tension of first linkage 418. Similar to the procedure shown in FIG. 50 and described above, second frame member 420 of manual frame system 400' can then be secured (locked) in knee locked configuration 46. As shown in FIG. 52, manual tent system 200', with first and second frame members 410, 420 in knee locked configuration 46, is expanded to open configuration 10.

Similarly, in use, as shown in FIGS. 45-50 and 52, the procedure described above can be reversed and manual tent system 200' can be folded from open configuration 10 and collapsed to closed configuration 20. As shown in FIGS. 50 and 52, manual tent system 200' can be expanded and locked in open configuration 10, with first and second frame members 410, 420 in knee locked configuration 46. As shown in FIG. 49, first frame member 410 of manual frame system 400' can then be released (unlocked) to knee expanded configuration 44, for example, by unlocking linkage lock 460 to release the tension of first linkage 418, adjusting (sliding) linkage lock 460 along first linkage 418 away from base system 300, and locking linkage lock 460 coupled to first linkage 418. Similar to the procedure shown in FIG. 49 and described above, second frame member 420 of manual frame system 400' can then be released (unlocked) to knee expanded configuration 44.

As shown in FIG. 48, first and second frame members 410, 420 of manual frame system 400' can then be in knee collapsed configuration 42, for example, by releasing the tension of first linkage 418 and second linkage 428, respectively. As shown in FIG. 47, manual tent system 200' can then be folded to unfolded configuration 40 thereby collapsing canopy system 500 coupled to manual frame system 400' (e.g., collapsing canopy system 500 coupled to first and second frame members 410, 420). As shown in FIG. 46, manual tent system 200' can then be closed to semi-open configuration 30, for example, by moving (e.g., pivoting) first base member 312 relative to second base member 314 (e.g., by applying a pushing force to ladder 330 coupled to first base member 312). As shown in FIG. 45, manual tent system 200' can be stored in closed configuration 20.

Example Automatic (Self-Tensioned) Tent System

Figure 53:
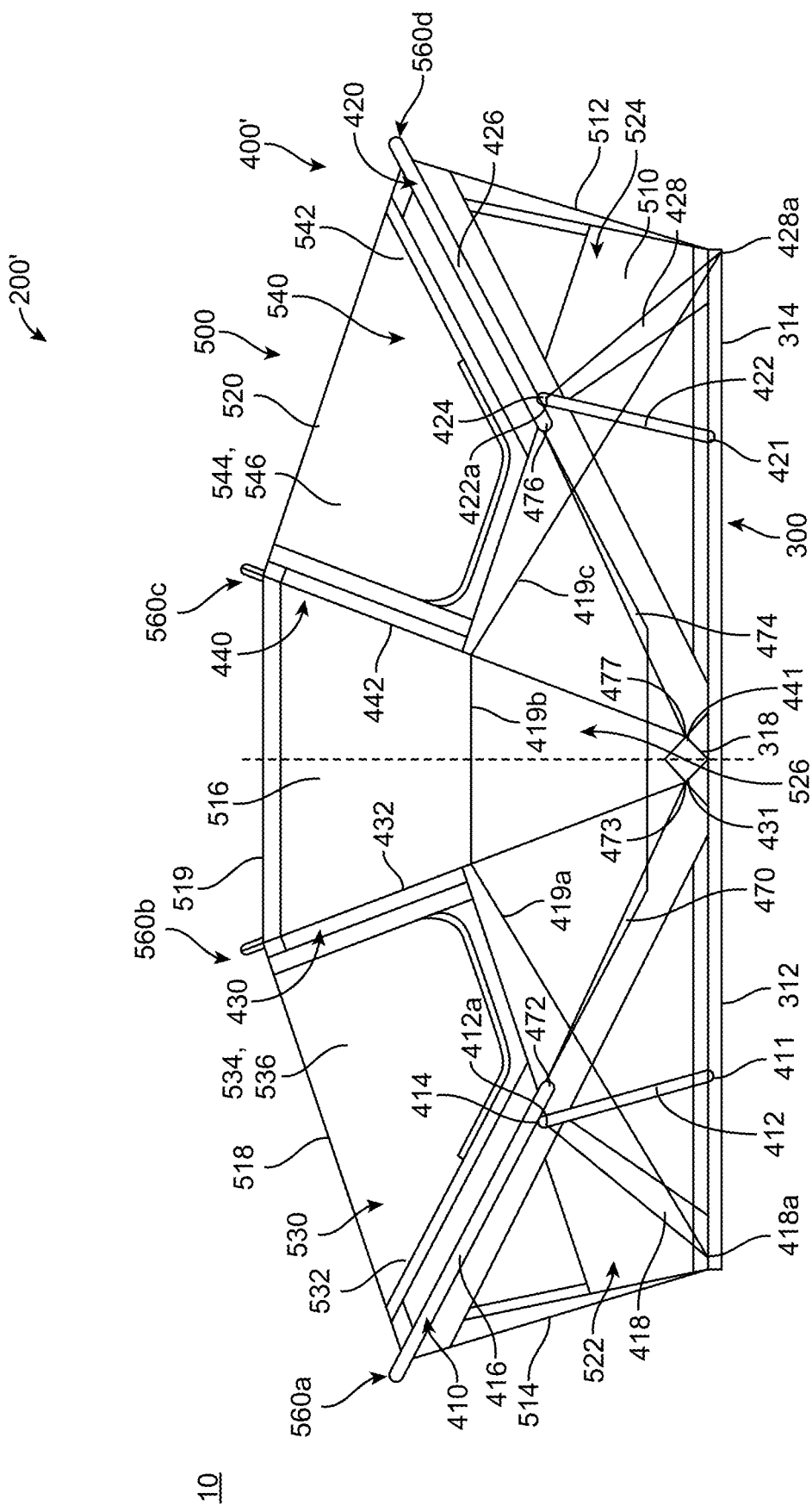
FIG. 53 illustrates a side view of a tent system with a base system and a self-folding frame system in an open configuration, according to an aspect.
Figure 54:
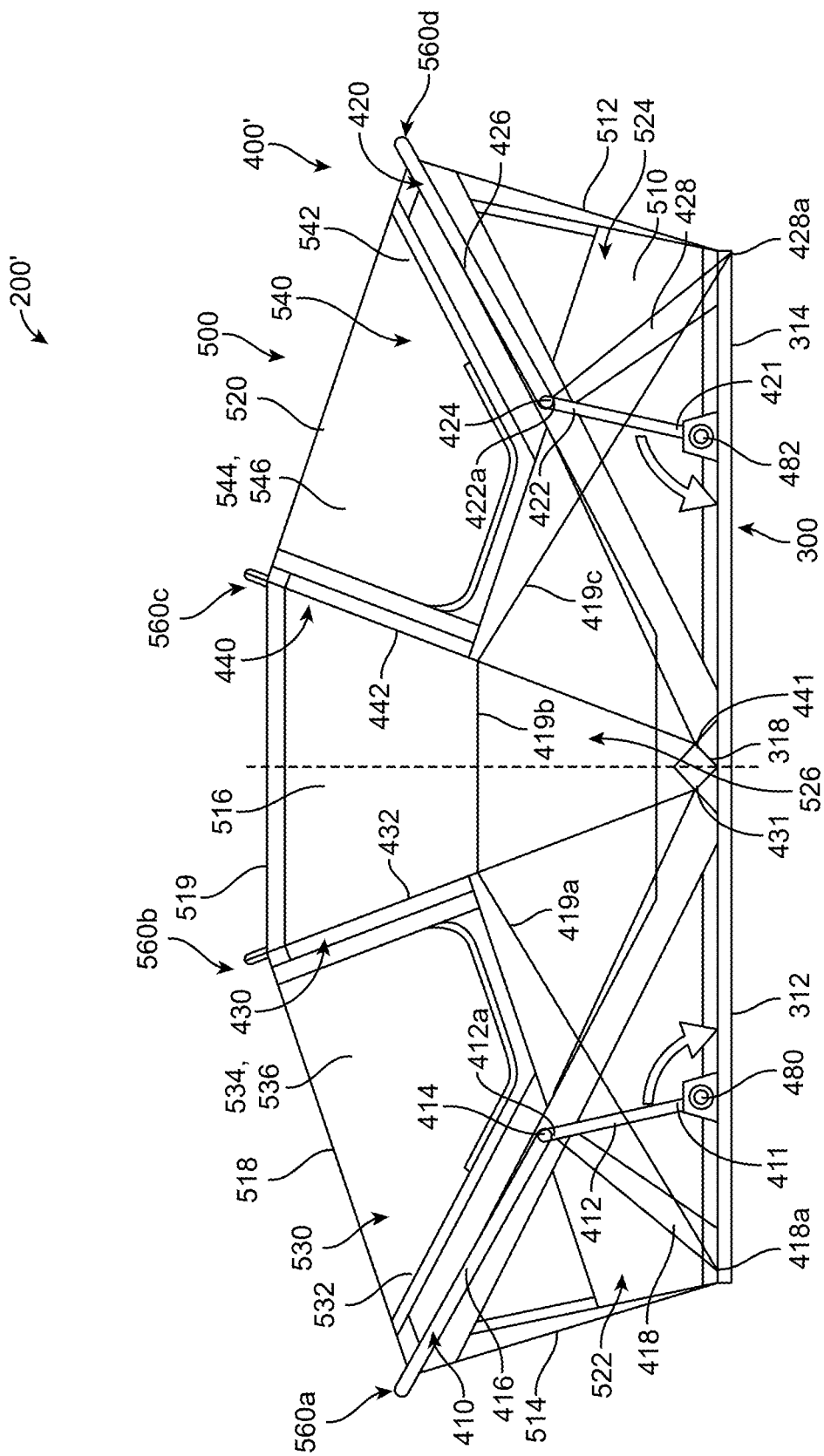
FIG. 54 illustrates a side view of a tent system with a base system and a self-folding frame system in an open configuration, according to an aspect.

FIGS. 53-60 illustrate automatic tent system 200", according to aspects. FIG. 53 is a side view of automatic tent system 200" with base system 300 and self-folding frame system 400" in open configuration 10, according to an aspect. FIG. 54 is a side view of automatic tent system 200" with base system 300 and self-folding frame system 400" in open configuration 10, according to an aspect.

Automatic tent system 200" can be configured to automatically (e.g., self-tensioned) expand and collapse a frame system (e.g., self-folding frame system 400" shown in FIG. 53) and a canopy (e.g., canopy system 500 shown in FIG. 53) coupled to the frame system. Automatic tent system 200" can be further configured to provide an automatic (e.g., self-tensioned) folding mechanism (e.g., self-folding frame system 400" shown in FIGS. 53 and 54) to easily and efficiently open and close the canopy. Automatic tent system 200" can be further configured to increase an internal volume of the canopy, insulation, and a rigidity of the canopy. Automatic tent system 200" can be further configured to decrease condensation and moisture. Automatic tent system 200" can be further configured to decrease setup time of the canopy. Automatic tent system 200" can be further configured to decrease weight and a height of base system 300. Although automatic tent system 200" is shown in FIGS. 53-60 as a stand-alone apparatus and/or system, the aspects of this disclosure can be used with other apparatuses, systems, and/or methods, such as, but not limited to, tent system 200, manual tent system 200', base system 300, frame system 400, manual frame system 400', self-folding frame system 400", canopy system 500, rain fly system 600, flow diagram 3600A, and/or flow diagram 3600B.

The aspects of manual tent system 200' with manual frame system 400' shown in FIGS. 37-52, for example, and the aspects of automatic tent system 200" with self-folding frame system 400" shown in FIGS. 53-60 may be similar. Similar reference numbers are used to indicate features of the aspects of manual tent system 200' shown in FIGS. 37-52 and the similar features of the aspects of automatic tent system 200" shown in FIGS. 53-60. Automatic tent system 200" shown in FIGS. 53-60 includes self-folding frame system 400" with one or more connecting members (e.g., first and second elastic linkages 470,474 shown in FIG. 53, first and second elastic connections 480,482 shown in FIG. 54) for automatically (e.g., self-tensioned) folding and/or unfolding automatic tent system 200". In some aspects, automatic tent system 200" can apply a self-tensioned force (e.g., restoring force) to self-folding frame system 400".

As shown in FIGS. 53-60, automatic tent system 200" can include base system 300, self-folding frame system 400", and/or canopy system 500. The aspects of manual frame system 400' shown in FIGS. 37-52, for example, and the aspects of self-folding frame system 400" shown in FIGS. 53-60 may be similar. Similar reference numbers are used to indicate features of the aspects of manual frame system 400' shown in FIGS. 37-52 and the similar features of the aspects of self-folding frame system 400" shown in FIGS. 53-60.

As shown in FIG. 53, self-folding frame system 400" can include first frame member 410, second frame member 420, third frame member 430, fourth frame member 440, first elastic linkage 470, and/or second elastic linkage 474. First and second elastic linkages 470, 474 can be configured to apply an inward force to self-folding frame system 400". In some aspects, as shown in FIG. 53, first elastic linkage 470 can be configured to apply an inward force between first frame member 410 and base system 300 (e.g., hinge 318). In some aspects, as shown in FIG. 53, second elastic linkage 474 can be configured to apply an inward force between second frame member 420 and base system 300 (e.g., hinge 318). In some aspects, first and second elastic linkages 470,474 can include an elastic material, for example, elastic cord, stretch cord, elastomer, polyester, rubber, silicone, and/or any other material providing a restoring force (e.g., inward force) to self-folding frame system 400".

In some aspects, as shown in FIG. 53, first elastic linkage 470 can include first elastic linkage first connection 472 to first leg 416 and first elastic linkage second connection 473 to hinge 318. In some aspects, as shown in FIG. 53, second elastic linkage 474 can include second elastic linkage first connection 476 to second leg 426 and second elastic linkage second connection 477 to hinge 318.

In some aspects, first elastic linkage 470 can be configured to apply an inward force to first frame member 410 toward a center of automatic tent system 200". In some aspects, first elastic linkage 470 can be coupled to distal end 416c of first leg 416 of first frame member 410 and hinge 318 of base system 300. In some aspects, first elastic linkage 470 can be coupled to distal end 412c of first support 412 of first frame member 410 and hinge 318 of base system 300.

In some aspects, second elastic linkage 474 can be configured to apply an inward force to second frame member 420 toward a center of automatic tent system 200". In some aspects, second elastic linkage 474 can be coupled to distal end 426c of second leg 426 of second frame member 420 and hinge 318 of base system 300. In some aspects, second elastic linkage 474 can be coupled to distal end 422c of second support 422 of second frame member 420 and hinge 318 of base system 300.

In some aspects, self-folding frame system 400" can include first and second elastic connections 480, 482 and omit first and second elastic linkages 470, 474. For example, as shown in FIG. 54, first and second elastic connections 480, 482 can be coupled to first and second supports 412, 422 at first and second connections 411, 421 to base system 300, respectively, and be configured to apply an inward force to self-folding frame system 400". For example, first elastic connection 480 can apply an inward force (e.g., clockwise) between first frame member 410 and base system 300 (e.g., pivoting first frame member 410 inward toward first base member 312). For example, second elastic connection 482 can apply an inward force (e.g., counterclockwise) between second frame member 420 and base system 300 (e.g., pivoting second frame member 420 inward toward second base member 314).

In some aspects, first and second elastic connections 480, 482 can include a torsion spring, torque spring, elastic fastener, torque fastener, and/or any other device providing a restoring force (e.g., inward force) to self-folding frame system 400". In some aspects, as shown in FIG. 54, first and second elastic connections 480, 482 can include a torsion spring.

In some aspects, first elastic connection 480 can be configured to apply an inward force to first frame member 410 toward a center of automatic tent system 200". In some aspects, first elastic connection 480 can be coupled to distal end 412c of first support 412 of first frame member 410 and first base member 312 of base system 300.

In some aspects, second elastic connection 482 can be configured to apply an inward force to second frame member 420 toward a center of automatic tent system 200". In some aspects, second elastic connection 482 can be coupled to distal end 422c of second support 422 of second frame member 420 and second base member 314 of base system 300.

The aspects of self-folding frame system 400" shown in FIG. 53, for example, and the aspects of self-folding frame system 400" shown in FIG. 54 may be similar. Similar reference numbers are used to indicate features of the aspects of self-folding frame system 400" shown in FIG. 53 and the similar features of the aspects of self-folding frame system 400" shown in FIGS. 54. Self-folding frame system 400" shown in FIG. 54 includes first and second elastic connections 480, 482 coupled to distal ends 412c, 422c of first and second supports 412, 422 and first and second base members 312, 314, respectively, rather than first and second elastic linkages 470, 474 of self-folding frame system 400" shown in FIG. 53.

Figure 55:
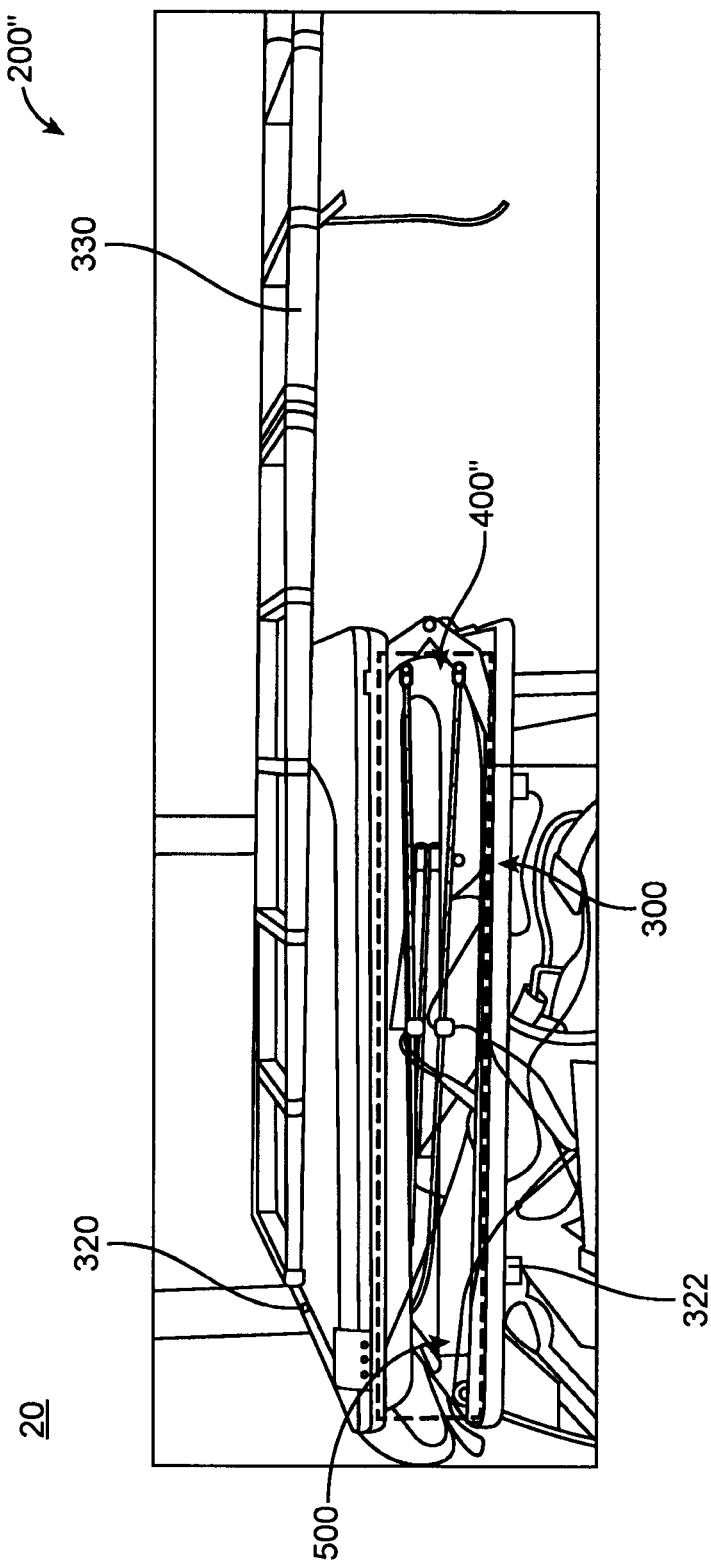
FIG. 55 illustrates a side perspective view of the tent system shown in FIG. 53 in a closed configuration, according to an aspect.
Figure 56:
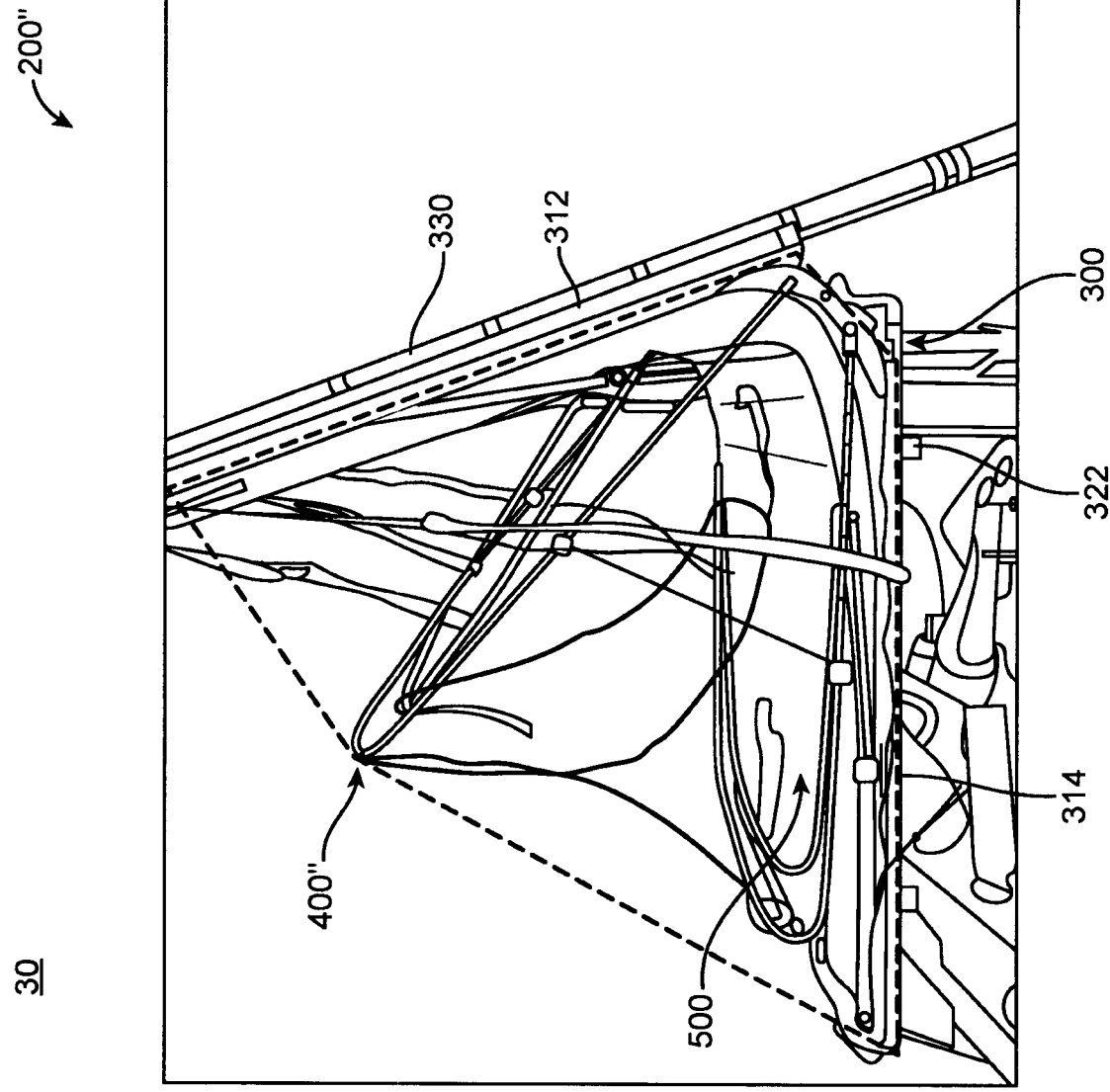
FIG. 56 illustrates a side perspective view of the tent system shown in FIG. 53 in a semi-open configuration, according to an aspect.
Figure 57:
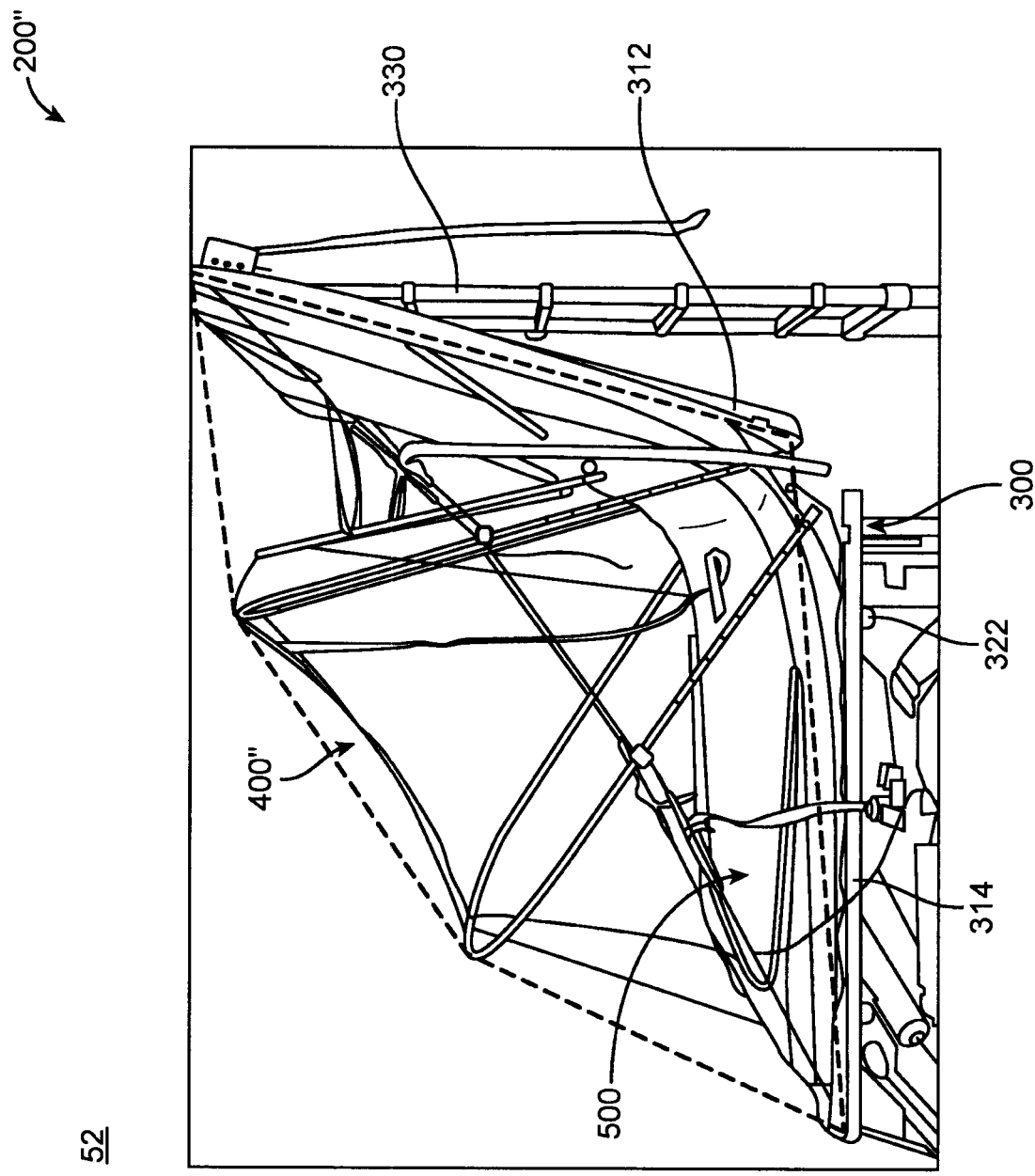
FIG. 57 illustrates a side perspective view of the tent system shown in FIG. 53 in a knee collapsed configuration, according to an aspect.

In use, as shown in FIGS. 53 and 55-60, automatic tent system 200" can be automatically (e.g., self-tensioned) unfolded from closed configuration 20 and expanded to open configuration 10. As shown in FIG. 55, automatic tent system 200" can be stored in closed configuration 20. As shown in FIG. 56, automatic tent system 200" can then be opened to semi-open configuration 30, for example, by moving (e.g., pivoting) first base member 312 relative to second base member 314 (e.g., by applying a pulling force to ladder 330 coupled to first base member 312). As shown in FIG. 57, automatic tent system 200" can then be unfolded to knee collapsed configuration 52 thereby expanding canopy system 500 coupled to self-folding frame system 400" (e.g., expanding canopy system 500 coupled to third and fourth frame members 430, 440).

Figure 58:
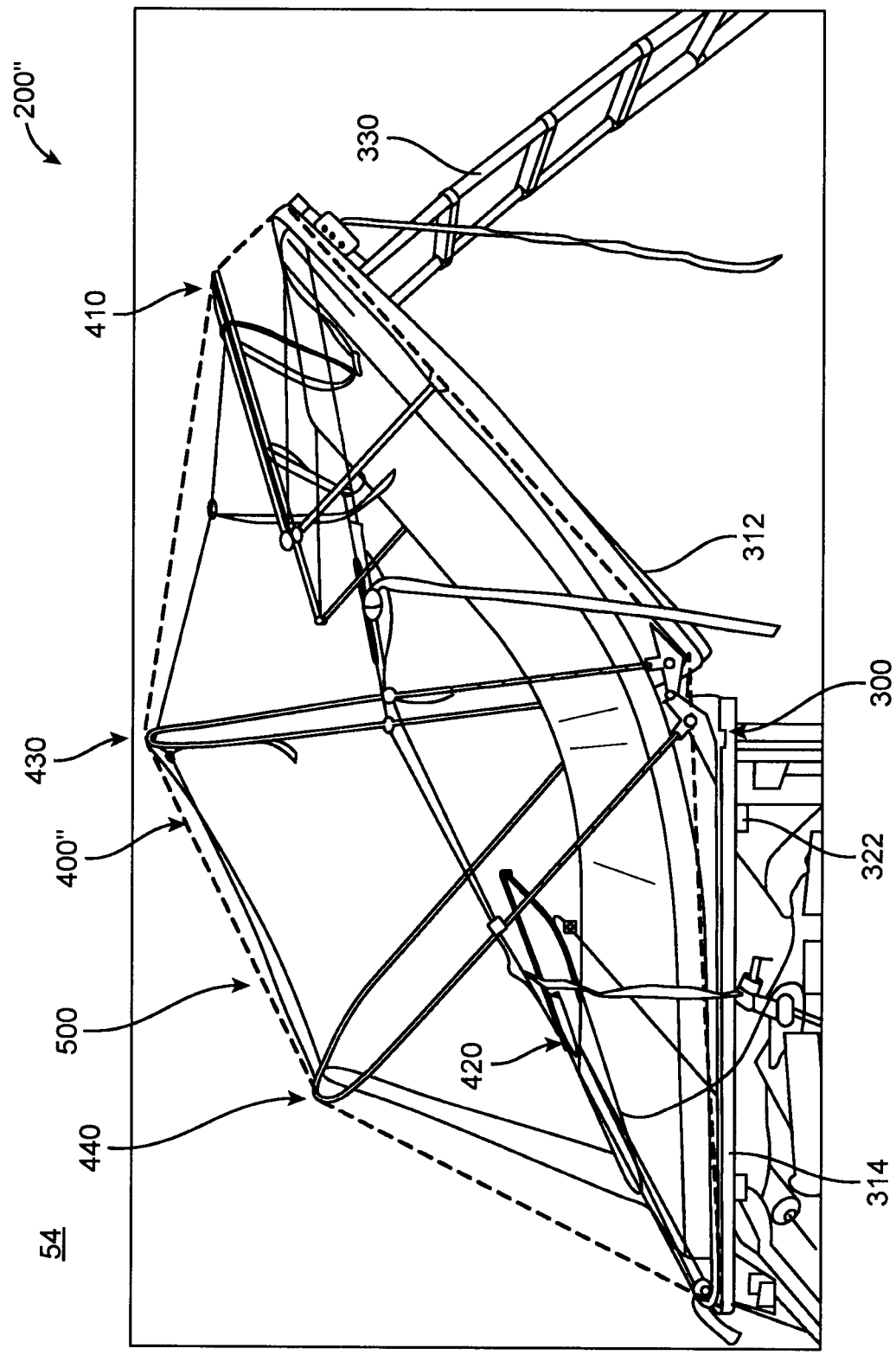
FIG. 58 illustrates a side perspective view of the tent system shown in FIG. 53 in a knee semi-expanded configuration, according to an aspect.
Figure 59:
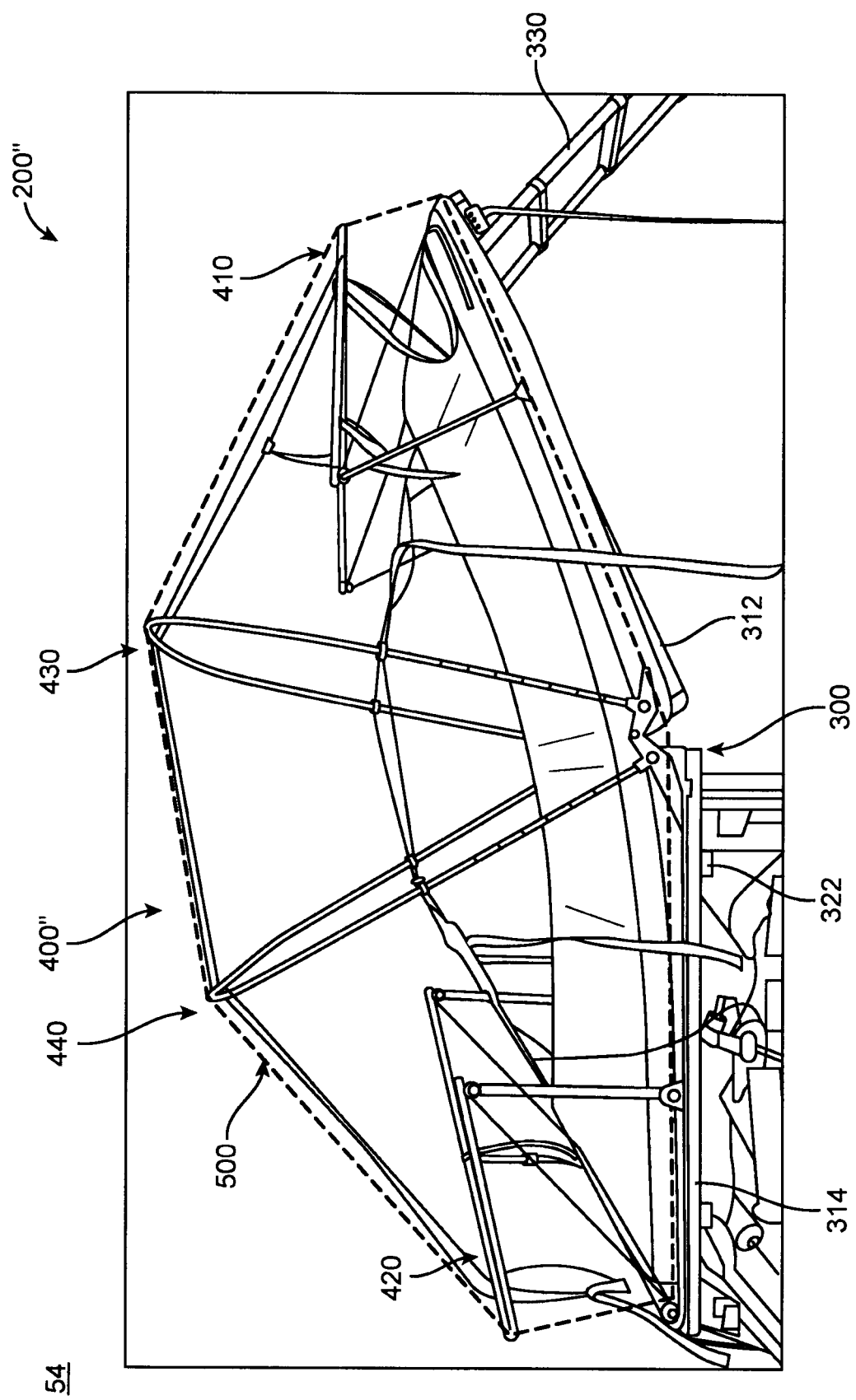
FIG. 59 illustrates a side perspective view of the tent system shown in FIG. 53 in the knee semi-expanded configuration, according to an aspect.
Figure 60:
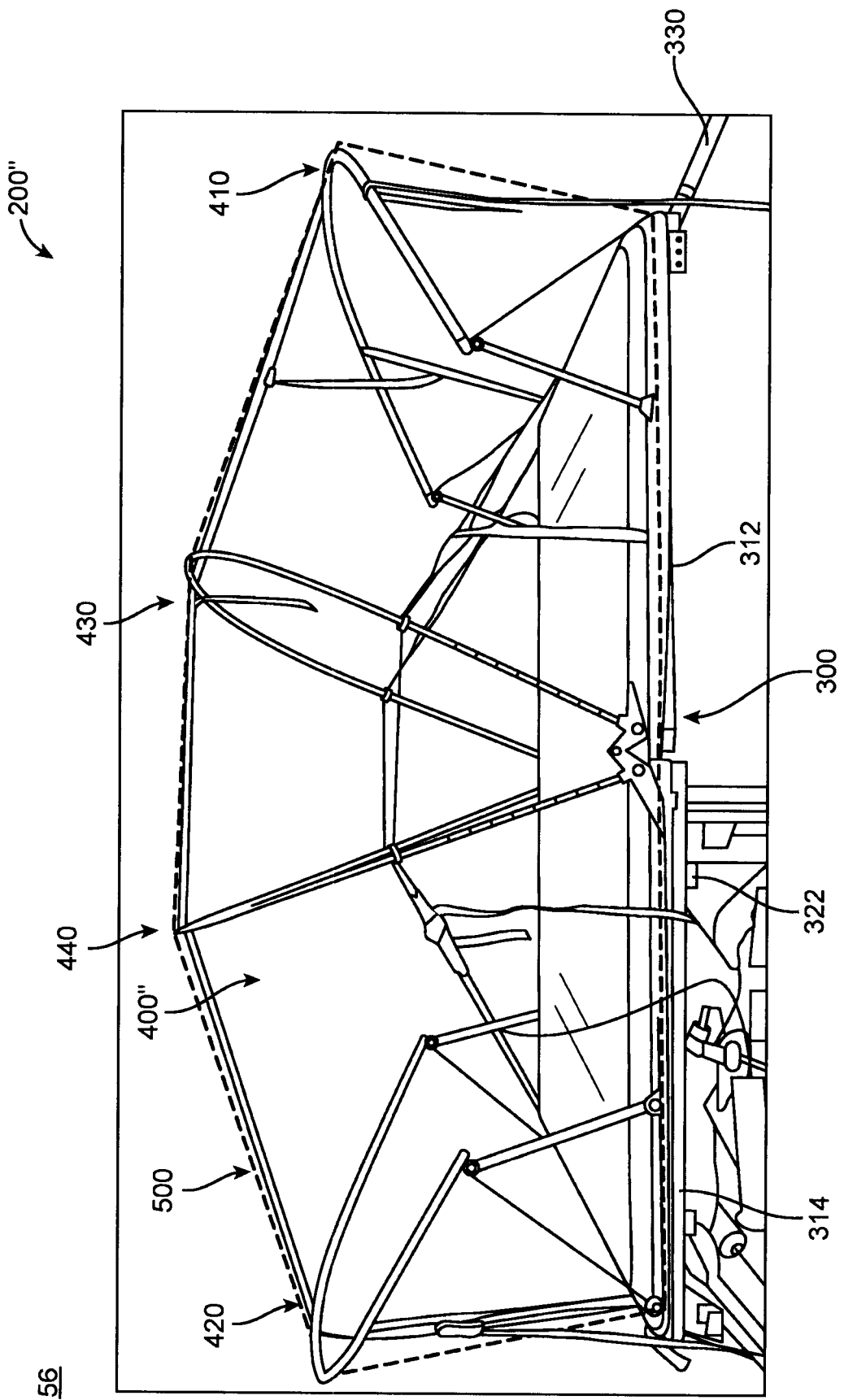
FIG. 60 illustrates a side perspective view of the tent system shown in FIG. 53 in a knee expanded configuration, according to an aspect.

As shown in FIGS. 58 and 59, first and second frame members 410, 420 of self-folding frame system 400" can then be expanded to knee semi-expanded configuration 54, for example, by further moving (e.g., pivoting) first base member 312 relative to second base member 314 (e.g., by applying a pulling force to first base member 312 or to ladder 330 coupled to first base member 312). As shown in FIG. 60, first and second frame members 410, 420 can then be expanded to knee expanded configuration 56, for example, further moving (e.g., pivoting) first base member 312 relative to second base member 314 (e.g., by applying a pulling force to first base member 312 or to ladder 330 coupled to first base member 312). As shown in FIG. 53, automatic tent system 200", with first and second frame members 410, 420 in knee expanded configuration 56, is expanded to open configuration 10.

Similarly, in use, as shown in FIGS. 53 and 55-60, the procedure described above can be reversed and automatic tent system 200" can be automatically (e.g., self-tensioned) folded from open configuration 10 and collapsed to closed configuration 20. As shown in FIGS. 53 and 60, automatic tent system 200" can be expanded in open configuration 10, with first and second frame members 410, 420 in knee expanded configuration 56. As shown in FIGS. 58 and 59, first and second frame members 410, 420 of self-folding frame system 400" can then be collapsed to knee semi-expanded configuration 54, for example, by further moving (e.g., pivoting) first base member 312 relative to second base member 314 (e.g., by applying a pushing force to first base member 312 or to ladder 330 coupled to first base member 312).

As shown in FIG. 57, automatic tent system 200" can then be folded to knee collapsed configuration 52 thereby collapsing canopy system 500 coupled to self-folding frame system 400" (e.g., collapsing canopy system 500 coupled to third and fourth frame members 430, 440). As shown in FIG. 56, automatic tent system 200" can then be closed to semi-open configuration 30, for example, by moving (e.g., pivoting) first base member 312 relative to second base member 314 (e.g., by applying a pushing force to first base member 312 or to ladder 330 coupled to first base member 312). As shown in FIG. 55, automatic tent system 200" can be stored in closed configuration 20.

Example Self-Tensioned Tent System with Folding Mechanism

Figure 61:
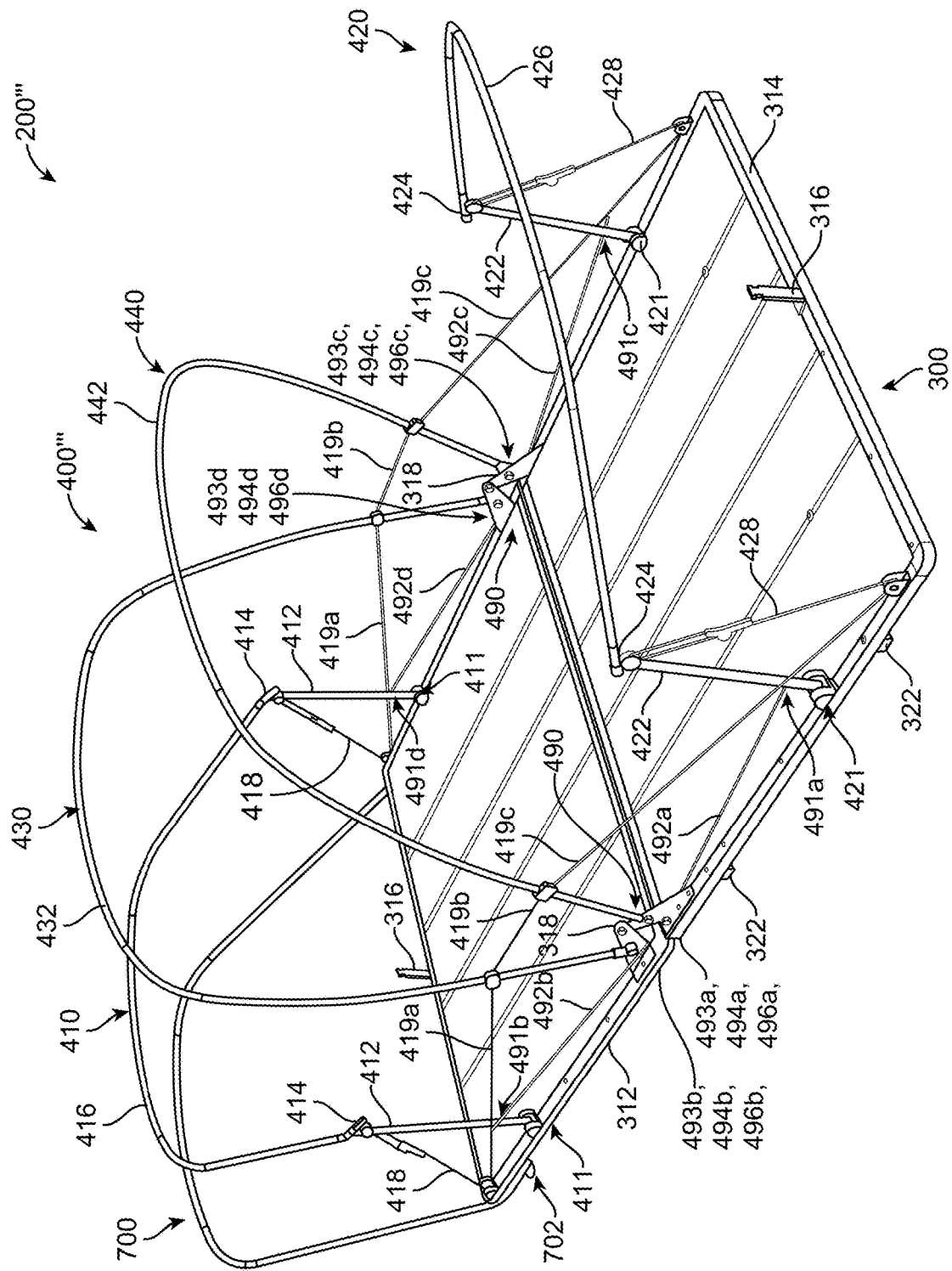
FIG. 61 illustrates a front perspective view of a tent system in an open configuration with a folding mechanism, according to an aspect.
Figure 62:
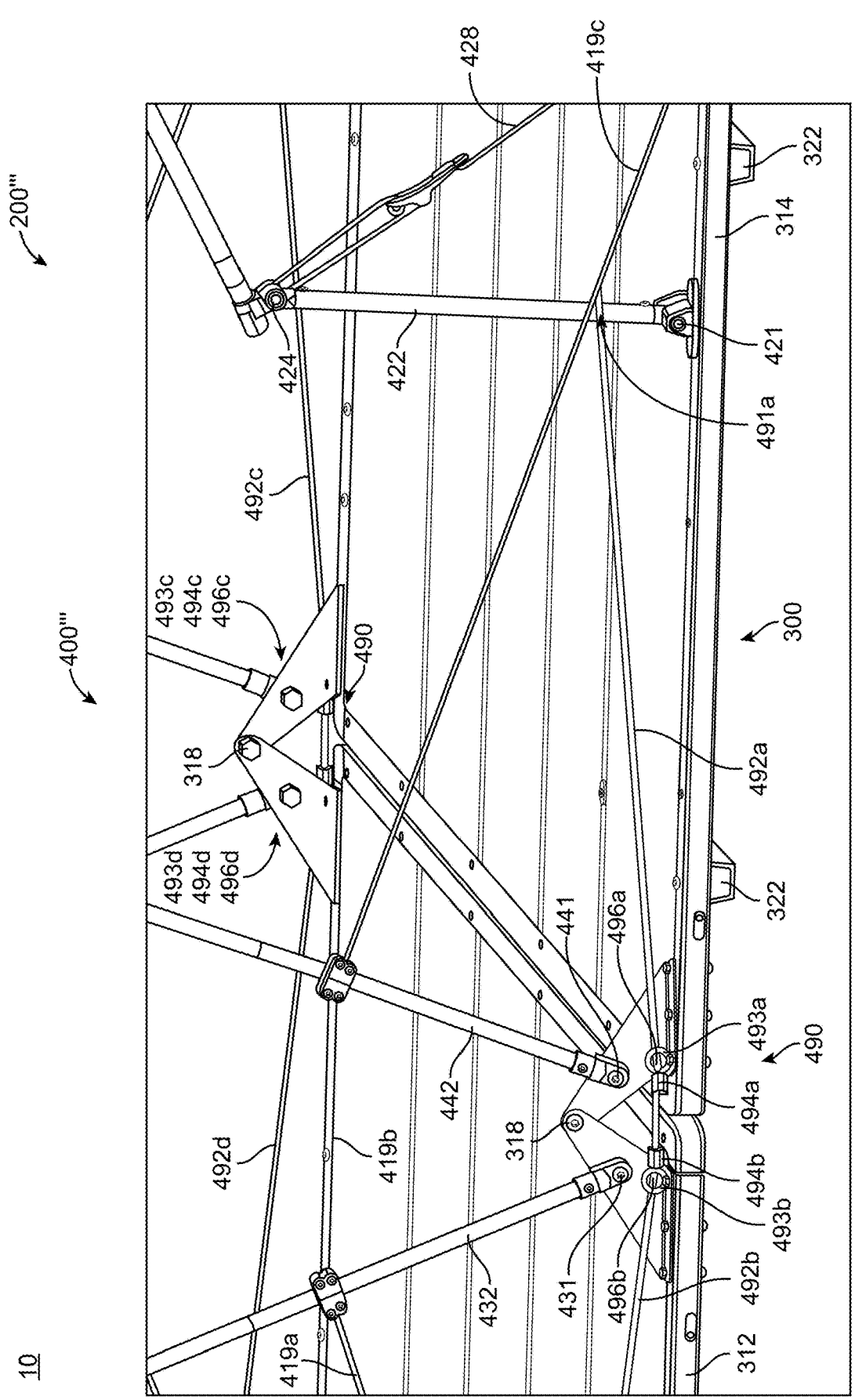
FIG. 62 illustrates a partial side perspective view of the tent system shown in FIG. 61, according to an aspect.
Figure 63:
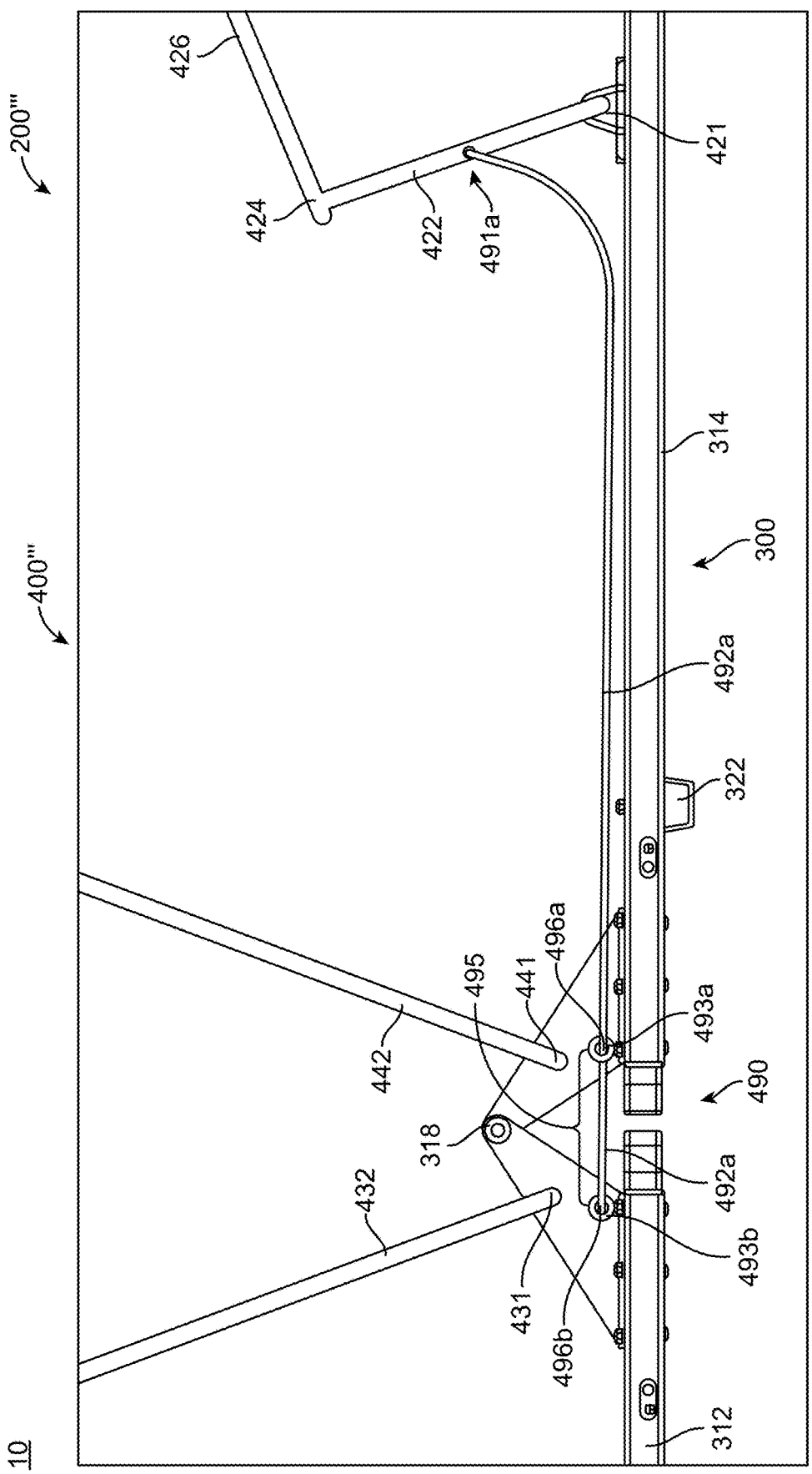
FIG. 63 illustrates a partial side view of the tent system shown in FIG. 61, according to an aspect.
Figure 64:
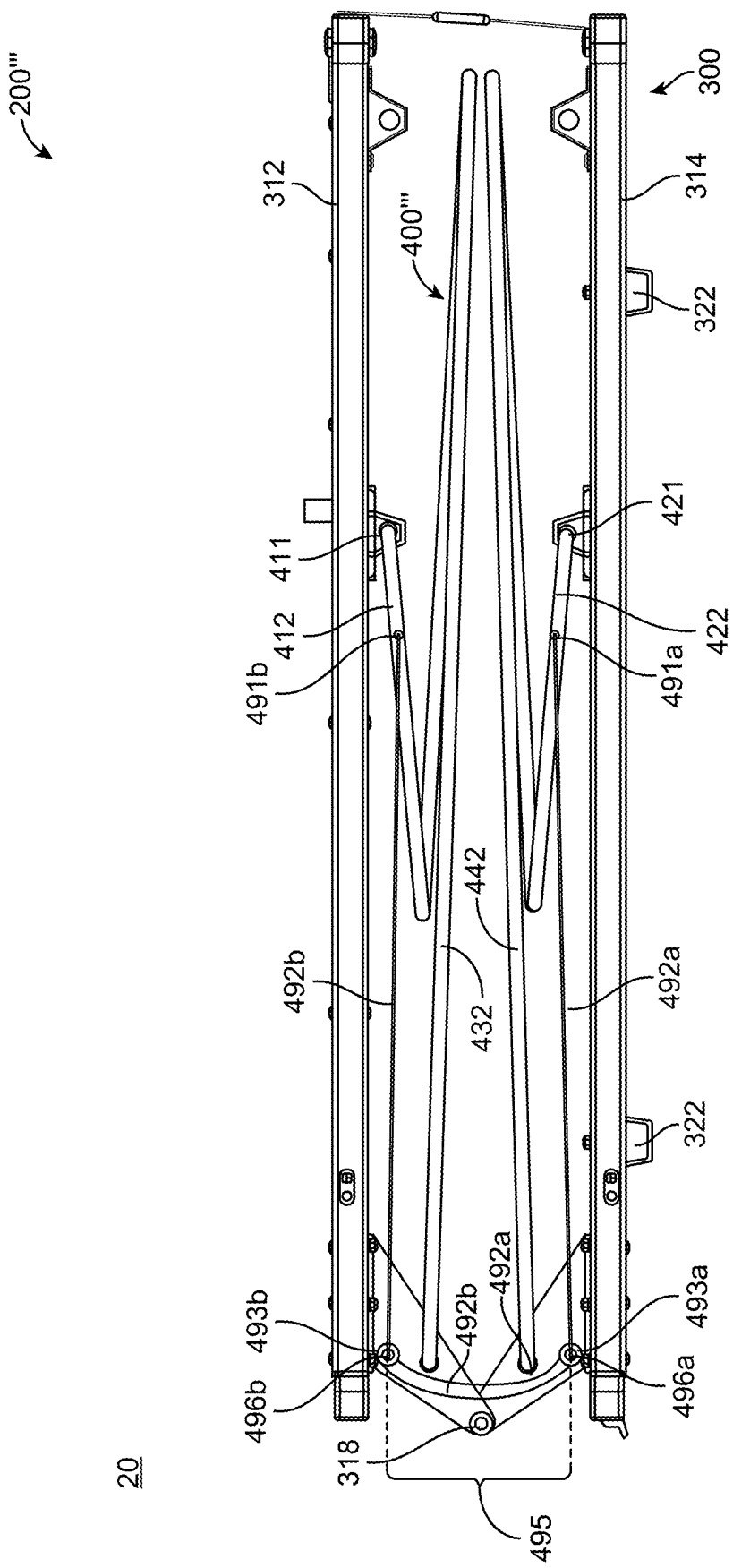
FIG. 64 illustrates a side view of the tent system shown in FIG. 61 in a closed configuration, according to an aspect.

FIGS. 61-64 illustrate self-tensioned tent system 200''' with folding mechanism 490, according to aspects. FIG. 61 is a front perspective view of self-tensioned tent system 200''' in open configuration 10 with folding mechanism 490, according to an aspect. FIG. 62 is a partial side perspective view of self-tensioned tent system 200''' shown in FIG. 61, according to an aspect. FIG. 63 is a partial side view of self-tensioned tent system 200''' shown in FIG. 61, according to an aspect. FIG. 64 is a side view of self-tensioned tent system 200''' shown in FIG. 61 in closed configuration 20, according to an aspect.

Self-tensioned tent system 200''' can be configured to automatically (e.g., self-tensioned) expand and collapse a frame system (e.g., self-folding frame system 400''' shown in FIG. 61) and a canopy (e.g., canopy system 500 shown in FIG. 53) coupled to the frame system. Self-tensioned tent system 200''' can be further configured to provide a self-tensioned folding mechanism (e.g., folding mechanism 490 shown in FIGS. 61-64) to easily and efficiently nest and close the canopy and the frame system. Although self-tensioned tent system 200''' is shown in FIGS. 61-64 as a stand-alone apparatus and/or system, the aspects of this disclosure can be used with other apparatuses, systems, and/or methods, such as, but not limited to, tent system 200, manual tent system 200', automatic tent system 200", base system 300, frame system 400, manual frame system 400', self-folding frame system 400", canopy system 500, rain fly system 600, flow diagram 3600A, and/or flow diagram 3600B.

The aspects of self-tensioned tent system 200''' with self-folding frame system 400''' shown in FIGS. 61-64, for example, and the aspects of automatic tent system 200" with self-folding frame system 400" shown in FIGS. 53-60 may be similar. Similar reference numbers are used to indicate features of the aspects of self-tensioned tent system 200''' shown in FIGS. 61-64 and the similar features of the aspects of automatic tent system 200" shown in FIGS. 53-60. Self-tensioned tent system 200''' shown in FIGS. 61-64 includes self-folding frame system 400''' with folding mechanism 490 for automatically (e.g., self-tensioned) folding and/or unfolding automatic tent system 200'''. In some aspects, self-tensioned tent system 200''' can apply a self-tensioned force (e.g., restoring force) to self-folding frame system 400''' via folding mechanism 490.

As shown in FIG. 61, self-folding frame system 400''' can include first frame member 410, second frame member 420, third frame member 430, fourth frame member 440, and folding mechanism 490. Folding mechanism 490 can be configured to apply an inward (pulling) force to self-folding frame system 400''', for example, when first base member 312 is rotated about second base member 314. Folding mechanism 490 can include linkage connections 491a-491d, linkages 492a-492d, linkage guides 493a-493d, and linkage fasteners 494a-494d. Linkages 492a-492d can be coupled to linkage connections 491a-491d, linkage guides 493a-493d, and linkage fasteners 494a-494d.

In some aspects, as shown in FIG. 61, linkages 492a, 492c can be configured to apply an inward (pulling) force to second supports 422 of second frame member 420 on second base member 314. For example, linkages 492a, 492c can be connected to linkage connections 491a, 491c on second supports 422, coupled to (e.g., passed through) linkage guides 493a, 493c, and connected to linkage fasteners 494b, 494d on first base member 312, respectively.

In some aspects, as shown in FIG. 61, linkages 492b, 492d can be configured to apply an inward (pulling) force to first supports 412 of first frame member 410 on first base member 312. For example, linkages 492b, 492d can be connected to linkage connections 491b, 491d on first supports 412, coupled to (e.g., passed through) linkage guides 493b, 493d, and connected to linkage fasteners 494a, 494c on second base member 314, respectively.

In some aspects, linkage connections 491a-491d can be disposed on first and second supports 412, 422 between a midpoint of first and second supports 412, 422 and first and second connections 411, 421 on first and second base members 312, 314, respectively. In some aspects, linkage connections 491a-491d can include fasteners, bolts, ties, snaps, or any other securement mechanism to attach a distal end of linkages 492a-492d to first and second supports 412, 422, respectively.

In some aspects, linkages 492a-492d can include a flexible material, for example, rope, cord, string, cable, line, chain, and/or any other flexible material providing a pulling force (e.g., inward force) to self-folding frame system 400'''. In some aspects, linkages 492a-492d can include an elastic material, for example, elastic cord, stretch cord, elastomer, polyester, rubber, silicone, and/or any other material providing a restoring force (e.g., inward force) to self-folding frame system 400'''.

In some aspects, linkage guides 493a-493d can include an aperture 496a-496d to pass linkages 492a-492d through linkage guides 493a-493d, respectively. For example, as shown in FIG. 62, linkage guides 493a-493d can include eye bolts or eye nuts with aperture 496a-496d (i.e., an eye) coupled to (e.g., bolted to) first and second base members 312, 314, respectively.

In some aspects, linkage fasteners 494a-494d can include clips, locks, crimping, welding, adhesives, bolts, ties, snaps, or any other securement mechanism to attach a distal end of linkages 492a-492d to adjacent linkage fasteners 494a-494d, respectively. For example, linkage 492a can be secured to adjacent linkage fastener 494b, linkage 492b can be secured to adjacent linkage fastener 494a, linkage 492c can be secured to adjacent linkage fastener 494d, and linkage 492d can be secured to adjacent linkage fastener 494c.

In some aspects, linkage fasteners 494a-494d can be coupled to linkage guides 493a-493d, respectively. For example, as shown in FIG. 62, linkage fastener 494b (e.g., corresponding to linkage 492a) can be fixed to linkage guide 493b (e.g., corresponding to linkage 492b), and linkage fastener 494a (e.g., corresponding to linkage 492a) can be fixed to linkage guide 493b (e.g., corresponding to linkage 492b).

In some aspects, linkages 492a-492d can be connected to first and second supports 412, 422 on first and second base members 312, 314 via linkage connections 491a-491d, coupled to (e.g., passed through) linkage guides 493a-493d, and connected to adjacent linkage fasteners 494a-494d on first and second base members 312, 314, respectively, such that each linkage 492a-492d forms a connection spanning between first and second base members 312, 314. For example, as shown in FIG. 62, linkage 492a can be connected to linkage connection 491a on second support 422, coupled to (e.g., passed through) linkage guides 493a, and connected to linkage fastener 494b on first base member 312.

In some aspects, in an open configuration, linkages 492a-492d can be loose such that no pulling force is applied to first and second supports 412, 422 based on a relative distance between corresponding linkage fasteners 494a-494d and linkage guides 493a-493d for each linkage 492a-492d, respectively. For example, as shown in FIG. 63, in open configuration 10, linkage 492a is loose and no pulling force is applied to second support 422 based on relative distance 495 (e.g., offset) between linkage guide 493a and linkage guide 493b (e.g., linkage fastener 494b shown in FIG. 62).

In some aspects, in a closed configuration, linkages 492a-492d can be taut such that a pulling (inward) force is applied to first and second supports 412, 422 based on a relative distance between corresponding linkage fasteners 494a-494d and linkage guides 493a-493d for each linkage 492a-492d, respectively. For example, as shown in FIG. 64, in closed configuration 20, linkage 492a is taut and a pulling (inward) force is applied to second support 422 based on relative distance 495 (e.g., offset) between linkage guide 493a and linkage guide 493b (e.g., linkage fastener 494b shown in FIG. 62), and linkage 492b is taut and a pulling (inward) force is applied to first support 412 based on relative distance 495 (e.g., offset) between linkage guide 493b and linkage guide 493a (e.g., linkage fastener 494a shown in FIG. 62). In some aspects, a pulling (inward) force of linkages 492a-492d to first and second supports 412, 422 increases as first base member 312 is folded (e.g., pivoted) over second base member 314.

In use, as shown in FIGS. 61-64, self-tensioned tent system 200''' can be automatically (e.g., self-tensioned) unfolded from closed configuration 20 and expanded to open configuration 10. As shown in FIGS. 61-63, self-tensioned tent system 200''' can be expanded in open configuration 10. As shown in FIG. 64, self-tensioned tent system 200''' can be stored in closed configuration 20, for example, by moving (e.g., pivoting) first base member 312 relative to second base member 314, thereby changing (e.g., increasing) relative distance 495 between respective linkage guides 493a-493d, including linkage fasteners 494a-494d coupled to linkage guides 493a-493d, and thereby tighten corresponding linkages 492a-492d and apply a pulling (inward) force to first and second supports 412, 422, respectively.

In some aspects, as shown in FIG. 64, closing first base member 312 of base system 300 applies a pulling (inward) force to linkage 492a coupled to linkage guide 493b (e.g., via linkage fastener 494b shown in FIG. 62) on first base member 312 and second support 422 on second base member 314. In some aspects, as shown in FIG. 64, closing first base member 312 of base system 300 applies a pulling (inward) force to linkage 492b coupled to linkage guide 493a (e.g., via linkage fastener 494a shown in FIG. 62) on second base member 314 and first support 412 on first base member 312.

In some aspects, as shown in FIGS. 63 and 64, applying the pulling (inward) force to linkage 492a includes increasing relative distance 495 (e.g., offset) between linkage guide 493b (e.g., via linkage fastener 494b shown in FIG. 62) on first base member 312 and linkage guide 493a on second base member 314, linkage guide 493a configured to pass linkage 492a through linkage guide 493a. In some aspects, as shown in FIGS. 63 and 64, applying the pulling (inward) force to linkage 492b includes increasing relative distance 495 (e.g., offset) between linkage guide 493a (e.g., via linkage fastener 494a shown in FIG. 62) on second base member 314 and linkage guide 493b on first base member 312, linkage guide 493b configured to pass linkage 492b through linkage guide 493b.

In some aspects, the aspects of linkage connection 491a, linkage 492a, linkage guide 493a, and linkage fastener 494a of folding mechanism 490 shown in FIGS. 61-64 may be similar to the aspects of linkage connection 491c, linkage 492c, linkage guide 493c, and linkage fastener 494c of folding mechanism 490 shown in FIG. 61. In some aspects, the aspects of linkage connection 491b, linkage 492b, linkage guide 493b, and linkage fastener 494b of folding mechanism 490 shown in FIGS. 61 and 64 may be similar to the aspects of linkage connection 491d, linkage 492d, linkage guide 493d, and linkage fastener 494d of folding mechanism 490 shown in FIG. 61.

It is to be appreciated that the Detailed Description section, and not the Brief Summary and Abstract sections, is intended to be used to interpret the claims. The Summary and Abstract sections may set forth one or more but not all aspects of the support assembly system and apparatus, and thus, are not intended to limit the present aspects and the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described aspects, but should be defined only in accordance with the following claims and their equivalents.

What is claimed is:

1. A tent system, comprising:
a base configured to mount to a vehicle;
a canopy comprising an interior surface and a plurality of canopy sleeves, each canopy sleeve of the plurality of canopy sleeves extending from an opening in the interior surface to form a sleeve recess;
a frame system coupled to the base and comprising a plurality of frame members configured to support the canopy, and
a rain fly coupled to the canopy,
wherein the frame members are disposed in the canopy sleeves such that the frame members are disposed interior to the canopy.

2. The tent system of claim 1, wherein the rain fly contacts at least one of the plurality of canopy sleeves.

3. The tent system of claim 1, wherein a gap is formed between the rain fly and an upper exterior surface of the canopy between each of the plurality of canopy sleeves.

4. The tent system of claim 3, wherein the gap is about 1 cm to about 15 cm.

5. The tent system of claim 1, wherein the rain fly comprises a plurality of windows.

6. The tent system of claim 1, wherein the canopy comprises a plurality of rain fly fasteners configured to couple the rain fly to the canopy.

7. The tent system of claim 6, wherein at least one of the plurality of rain fly fasteners is disposed on at least one of the plurality of canopy sleeves.

8. The tent system of claim 6, wherein the plurality of rain fly fasteners comprise a zipper.

9. The tent system of claim 6, wherein the plurality of rain fly fasteners comprise a hook-and-loop fastener.

10. The tent system of claim 1, further comprising spring rods coupled between the rain fly and the base, wherein the spring rods are configured to support a transverse panel of the rain fly.

11. The tent system of claim 1, wherein the plurality of canopy sleeves extend above an upper exterior surface of the canopy between each of the plurality of canopy sleeves.

12. The tent system of claim 1, wherein the canopy comprises a plurality of windows.

13. A tent system, comprising:
a base configured to mount to a vehicle;
a canopy comprising a plurality of canopy sleeves;
a frame system coupled to the base and comprising a plurality of frame members configured to support the canopy; and
a rain fly coupled to the canopy,
wherein the frame members are disposed in the canopy sleeves such that the frame members are disposed interior to the canopy, and
wherein each of the plurality of canopy sleeves comprises a frame fastener configured to secure a frame member within a recess of the canopy sleeve.

14. A tent system, comprising:
a base configured to mount to a vehicle;
a canopy comprising an interior surface, an exterior surface, and a plurality of canopy sleeves extending above the exterior surface, wherein each canopy sleeve of the plurality of canopy sleeves forms a sleeve recess in the interior surface;
a frame system coupled to the base and configured to support the canopy; and
a rain fly coupled to the canopy,
wherein, in an open configuration, the rain fly is supported by at least one of the plurality of canopy sleeves.

15. The tent system of claim 14, wherein, in a first configuration, the rain fly is fully deployed and supported by the plurality of canopy sleeves and a plurality of spring rods coupled to the base.

16. The tent system of claim 14, wherein, in a second configuration, the rain fly is semi-stowed and fixed by one or more rain fly fasteners on the canopy to expose a transverse section of the canopy.

17. The tent system of claim 14, wherein, in a third configuration, the rain fly is stowed and fixed by a plurality of rain fly fasteners on the canopy to expose a plurality of transverse sections of the canopy.

18. The tent system of claim 14, wherein, in a fourth configuration, the rain fly is semi-stowed and fixed by one or more rain fly fasteners on the canopy to expose a longitudinal section of the canopy.

19. The tent system of claim 14, wherein, in a fifth configuration, the rain fly is stowed and fixed by a plurality of rain fly fasteners on the canopy to expose a plurality of longitudinal sections of the canopy.

20. The tent system of claim 14, wherein, in a sixth configuration, the rain fly is fully deployed and supported by the plurality of canopy sleeves.

* * * * *